US007478129B1

(12) United States Patent
Chemtob

(10) Patent No.: US 7,478,129 B1
(45) **Date of Patent: *Jan. 13, 2009**

(54) METHOD AND APPARATUS FOR PROVIDING GROUP INTERACTION VIA COMMUNICATIONS NETWORKS

(76) Inventor: Helen Jeanne Chemtob, 10750 Kinloch Rd., Silver Spring, MD (US) 20903-1243

( * ) Notice: Subject to any disclaimer, the term of this patent is extended or adjusted under 35 U.S.C. 154(b) by 134 days.

This patent is subject to a terminal disclaimer.

(21) Appl. No.: 11/518,879

(22) Filed: Sep. 12, 2006

Related U.S. Application Data

(63) Continuation-in-part of application No. 09/836,512, filed on Apr. 17, 2001, now Pat. No. 7,124,164.

(60) Provisional application No. 60/221,213, filed on Jul. 27, 2000, provisional application No. 60/197,987, filed on Apr. 18, 2000.

(51) Int. Cl.
*G06F 15/16* (2006.01)
*G06F 3/00* (2006.01)

(52) U.S. Cl. ...................................... 709/204; 715/758

(58) Field of Classification Search ....................... None
See application file for complete search history.

(56) References Cited

U.S. PATENT DOCUMENTS

| | | | | |
|---|---|---|---|---|
| 5,796,393 | A | 8/1998 | MacNaughton et al. | |
| 6,151,621 | A | 11/2000 | Colyer et al. | |
| 7,346,654 | B1 * | 3/2008 | Weiss | 709/204 |
| 2001/0002831 | A1 | 6/2001 | Kato et al. | |

OTHER PUBLICATIONS

Notarius and Markum, *We Can Work It Out*, 1993, pp. 85-89.

* cited by examiner

*Primary Examiner*—Jason D Cardone
*Assistant Examiner*—Azizul Choudhury
(74) *Attorney, Agent, or Firm*—Swift Law Office; Stephen Christopher Swift

(57) ABSTRACT

Improvements to a system for enhancing the quality of group interaction, group activities, and group environments over computer networks. New features include the capacity for participants to form subgroups within a larger group, as well as to move about a virtual environment, interacting with other participants they come across in the environment as desired. Unique methods for creating and distributing structured group programs for use on the system, for playing computerized board games or card games on the system, and for building virtual social environments using the system are also disclosed. The system creates improved virtual environments for high-tech business meetings, on-line classrooms, conferences, group counseling sessions, internet trade shows, and private meeting places where family and friends can spend quality time together.

25 Claims, 57 Drawing Sheets

SCREEN PRINT OF STANDARD OPERATING SYSTEM 400

Interaction Block 402 below (includes 408, 412 & 420)

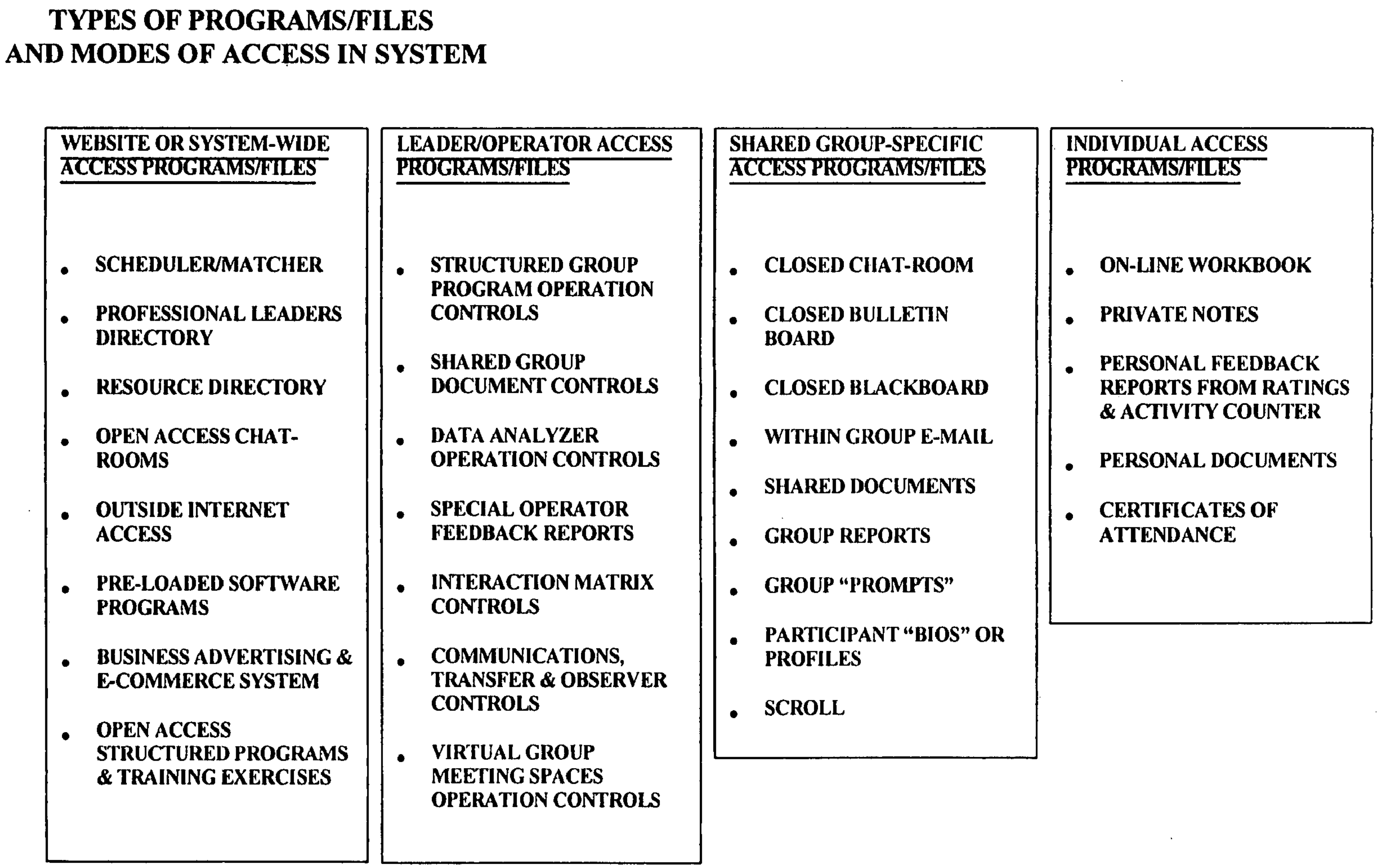

FIG. 13

TYPES OF PROGRAMS/FILES AND MODES OF ACCESS IN SYSTEM

| WEBSITE OR SYSTEM-WIDE ACCESS PROGRAMS/FILES | LEADER/OPERATOR ACCESS PROGRAMS/FILES | SHARED GROUP-SPECIFIC ACCESS PROGRAMS/FILES | INDIVIDUAL ACCESS PROGRAMS/FILES |
|---|---|---|---|
| • SCHEDULER/MATCHER | • STRUCTURED GROUP PROGRAM OPERATION CONTROLS | • CLOSED CHAT-ROOM | • ON-LINE WORKBOOK |
| • PROFESSIONAL LEADERS DIRECTORY | • SHARED GROUP DOCUMENT CONTROLS | • CLOSED BULLETIN BOARD | • PRIVATE NOTES |
| • RESOURCE DIRECTORY | • DATA ANALYZER OPERATION CONTROLS | • CLOSED BLACKBOARD | • PERSONAL FEEDBACK REPORTS FROM RATINGS & ACTIVITY COUNTER |
| • OPEN ACCESS CHAT-ROOMS | • SPECIAL OPERATOR FEEDBACK REPORTS | • WITHIN GROUP E-MAIL | • PERSONAL DOCUMENTS |
| • OUTSIDE INTERNET ACCESS | • INTERACTION MATRIX CONTROLS | • SHARED DOCUMENTS | • CERTIFICATES OF ATTENDANCE |
| • PRE-LOADED SOFTWARE PROGRAMS | • COMMUNICATIONS, TRANSFER & OBSERVER CONTROLS | • GROUP REPORTS | |
| • BUSINESS ADVERTISING & E-COMMERCE SYSTEM | • VIRTUAL GROUP MEETING SPACES OPERATION CONTROLS | • GROUP "PROMPTS" | |
| • OPEN ACCESS STRUCTURED PROGRAMS & TRAINING EXERCISES | | • PARTICIPANT "BIOS" OR PROFILES | |
| | | • SCROLL | |

FIG. 16C

LEADER'S POST-GROUP FEEDBACK REPORT

Question 1 (Rating Others) HOW HELPFUL WAS EACH GROUP MEMBER TODAY?
1 = not at all helpful, 7 = extremely helpful

Rating Grid — Average actor ratings

| XXXXX | Beth | Amy | Dave | Susan | XXXXXXXXX |
|---|---|---|---|---|---|
| Beth | X | 6 | 4 | 2 | 4 |
| Amy | 5 | X | 4 | 3 | 4 |
| Dave | 3 | 7 | X | 3 | 4.33 |
| Susan | 4 | 6 | 7 | X | 5.66 |

GM = 4.5

_4__ _6.33_ 5___ _2.66__ GM =4.5
Average partner ratings

Question 2 (Rating Self) HOW MUCH PROGRESS OVERALL DID YOU MAKE ON YOUR GOALS OVER THE PAST WEEK? 1 = almost none, 7 = great progress

Beth__7_____Amy___4____Dave____6___Susan__7____Average Rating____6_______

Question 3 (Rating Group) HOW SATISFIED ARE YOU WITH TODAY'S GROUP MEETING?
1 = not at all satisfied, 7 = extremely satisfied

Beth__6___,Amy___3___, Dave__6____, Susan__________6__, Average Rating____5.2____

Question 4: How much progress did you make on your homework over the past week?
1 = almost none, 7 = great progress

Beth_7____, Amy___5____, Dave___6____, Susan__5___, Average Rating 5.7

Question 5: Did you set some specific homework goals for this week? If so, what are they?

Beth Monitor my behaviors more carefully__________________________
Amy________________________________
Dave_______________________________
Susan______________________________

Question 6: Do you have anything you want to let the leaders know before the next group meeting?_______________

Beth___________________________________
Amy I don't feel like I'm getting much out of the group lately.___________________________________
Dave___________________________________
Susan___________________________________

FIG. 22

| STRUCTURED GROUP PROGRAM COMPONENT BELOW. | PROGRAM #1: *(DEFAULT PROGRAM)* GROUP-SUPPORTED GOAL ATTAINMENT PROGRAM | PROGRAM #2: *(SAMPLE NEW STRUCTURED GROUP PROGRAM)* GROUP-SUPPORTED SOCIAL SKILLS TRAINING PROGRAM |
|---|---|---|
| PRESENTATION MATERIALS (e.g. VIDEOS, TEXT, SLIDES, PHOTOS, LECTURE MATERIAL) | e.g. LECTURE MATERIAL ABOUT THE WHOLE PERSON MODEL AND HOW TO FIGURE OUT WHAT GOALS WOULD MEET THE NEEDS OF THE "WHOLE PERSON" | e.g. LECTURE MATERIAL ABOUT DIFFERENT TYPES OF SOCIAL SKILLS, INCLUDING MAKING A REQUEST, SAYING "NO", MEETING SOMEONE NEW, AND ACTIVE LISTENING SKILLS. |
| TRAINING EXERCISE PACKAGE (e.g. ROLE-PLAYING EXERICES, ETC.) | e.g. EXERCISES PRACTICING DIFFERENT WAYS OF RESPONDING IN A GROUP | e.g. PRESENTING DIFFERENT SOCIAL SITUATIONS AND MODELING APPROPRIATE BEHAVIOR. |
| PROMPTS | e.g. PROMPTS CONSISTING OF STATEMENTS FOCUSSED ON GROUP PROCESS AND GETTING A PARTICIPANT "UNSTUCK" | e.g. STATEMENTS THAT MAKE SUGGESTIONS TO A PARTICIPANT IN A ROLE-PLAY EXERICE TO FACILITATE AN EFFECTIVE RESPONSE. |
| ASSESSMENTS & FEEDBACK REPORTS | e.g. POST-GROUP QUESTIONNAIRE | e.g. SOCIAL ANXIETY INVENTORY WHICH ASSESSES LEVEL OF ANXIETY IN SOCIAL SITUATIONS |
| RESPONSE MATRIX VOCABULARIES | e.g. FACIAL EXPRESSION ICONS, RESPONSE STYLE ICONS, SOUND ICONS, REPLY ICONS | e.g. TERMS ADDRESSING FACATORS TO CONSIDER WHEN RESPONDING ASSERTIVELY, LIKE "OBJECTIVES", "RIGHTS", "RESPECT", ETC. |
| WORKBOOK | e.g. GOAL ATTAINMENT SCALING TOOLS THAT HELP PEOPLE CHOOSE WHAT GOALS THEY WANT TO PURSUE & BREAK THE GOALS DOWN INTO STEPS | e.g. HOMEWORK ASSIGNMENTS THAT INSTRUCT PARTICIPANTS TO SEEK OUT A PARTICULAR SITUATION IN THE "REAL WORLD", PRACTICE NEWLY LEARNED SKILLS, & SELF-RATE PERFORMANCE |

FIG. 23A

Sample Sections from Goal Attainment Strategies Workbook For Three Group Members—Section #1

| | AMY | MARY | SUSAN |
|---|---|---|---|
| **STATED GOAL** | Lose weight | Find better job. | Help child with ADHD |
| **Steps for reaching goal** | 1st—write down all foods eaten for one week.<br>2nd—write out diet for the following week.<br>3rd—Plan an exciting outing at the end of successful dieting week. | 1st—Read several books on the topic of changing jobs.<br>2nd—Send out at least two resumes per week on jobs that look good.<br>3rd—Make telephone calls to companies that are interesting and inquire about possible position openings. | 1st—Make appt with child's teacher to discuss school problems.<br>2nd—Come up with mutual plan for getting homework under control (e.g. set time, place, rewards for homework completion)<br>3rd—Find some activity that can be done as family to reinforce child's strengths. |

FIG. 23B

Sample Sections from Goal Attainment Strategies Workbook For Three Group Members—Section #2

| | AMY | MARY | SUSAN |
|---|---|---|---|
| STATED GOAL | Lose weight | Find better job. | Help child with ADHD |
| **Changes that will be required to different aspects of my "whole self" in order to accomplish my goal** | **Physical**: I will have to get my mind in more control, less unconscious eating. **Emotional**: I will have to stop eating when I'm feeling anxious & find other ways to deal with anxiety. **Cognitive**: I will have to stop thinking negative thoughts about myself. **Interpersonal**: I will have to find friends who will support me in my desire to stop eating junk food. **Motivational**: I will have to think of other rewards besides eating the wrong kinds of foods. **Spiritual**: I will have to meditate more and ask for strength and guidance if I am ever gone to reach my goal. | **Physical**: It's stressful looking for a good job. I need to do regular exercise to keep anxiety under control. **Emotional**: I need to practice meditation and systematic relaxation in order to keep the tension from building up. **Cognitive**: I need to avoid negative thinking. **Interpersonal**: I need to meet new friends and do some "networking" to find out what else is out there. **Motivational**: I need to think of ways to reward myself when I make myself do uncomfortable things. **Meaning**: I need to accept that finding a new job is very important to me, but not overdo it with feelings of worthlessness if it doesn't happen quickly. | **Physical**: I need to take care of myself, because if I don't I just get frazzled and irritable and that doesn't help. Good diet, exercise, and sleep are essential. **Emotional**: I will have to stop ruminating all the time about this problem. I need to have a life outside of this problem. **Cognitive**: Only allow myself to think about this problem at predetermined times. **Interpersonal**: Stop talking to friends and family about problem, as it doesn't help. **Motivational**: I'm already very motivated to work on this problem. Probably too much so. I need to CHILL. **Philosophical**: I know that I will look back on this sometime and realize I was making way too much of a big deal about it. Get some perspective. |

FIG. 24A

STEPS OF SAMPLE GROUP INTERACTION TRAINING MODULE—PAGE 1

| Lesson One: Types of Responses |
|---|
| **Step One**: The "Professor" explains that there are different ways people can respond to the statements or requests of others. Each of these types of responses can be represented by a different "character" to aid in understanding, according to Gazda, George M., Asbury, Frank R., Balzer, Fred J., Childers, William C., and Walters, Richard P., *Human Relations Development: A Manual for Educators, Second Edition,* Published by Allyn and Bacon, Inc., Boston, Massachusetts, 1977, pp. 47-53. The Professor directs the participants to review Page 2 (FIG. 24B) of training module which describes different characters and their ways of responding. |
| **Step Two**: A videotape of the Professor interviewing several people who make an initial statement about a goal or problem or experience is presented to the participants. Then a response grid appears showing the characters depicted in FIG. 24B. The participants can click on each character on the grid to see what type of response each character would make to the initial statement of the person being interviewed in the videotaped presentation. |
| **Step Three**: After several demonstrations, participants will be asked to take turns being the "speaker" and other people will be asked to take turns responding according to the different response types. Other participants will guess the response type that is being portrayed. The participants will be given a list of potential initial statements, or they may choose one of their own. Participants may choose to carry on with one conversation line for a while, stopping to determine what types of responses are being made.<br>**Sample Initial Statement:** **"I spent all that time interviewing and negotiating for that job, and now they say there isn't even a position any more. I can't go back to square one!"** |
| **Step Four**: Participants practice making all types of responses. They will also be encouraged to think about what types of responses they prefer to get from others (when they are the speaker) and what types of responses they feel most comfortable making. Participants are encouraged to ask each other questions about how it feels to give and receive different types of responses. |

FIG. 24B

SAMPLE GROUP INTERACTION TRAINING MODULE—PAGE 2

| | | | |
|---|---|---|---|
| DETECTIVE<br>**Icon**: Inspector Gadget Type Character<br>**M.O.**: Eager to track down the facts of the case—grills for details.<br>**Response**: "At what point did you suspect that something was wrong? Did they tell you this after you told them how much you wanted?" | MAGICIAN<br>**Icon:** Classic magician<br>**M.O.**Tries to make the problem disappear by telling the speaker it isn't there.<br>**Response**: "You've been saying that you weren't even sure that you wanted a new job, things are going so much better at work now." | FOREMAN<br>**Icon**: Hardhat guy<br>**M.O.** Tries to keep the speaker too busy to think about a problem, assigning busy-work<br>**Response**: "I think you should get on that phone and call every person you interviewed with and then send them each a letter telling them how much you would like to work with their company." | JUDGE<br>**Icon**: Robed with gavel<br>**M.O.** Gives rational explanations to show the speaker that his/her own actions have cause the present situation.<br>**Response**: "You know better than to put so much energy into one thing. You should have been interviewing at other places at the same time, not setting yourself up for failure." |
| Swami | Sign Painter | Drill Sergeant | Guru |
| Florist | Kick-in-the-Pants Guy | Shrink (Interpreter) | Advice-Giver |
| Empathy-Giver | Self-Discloser | Feedback-Giver | Process Analyzer |

FIG. 25A

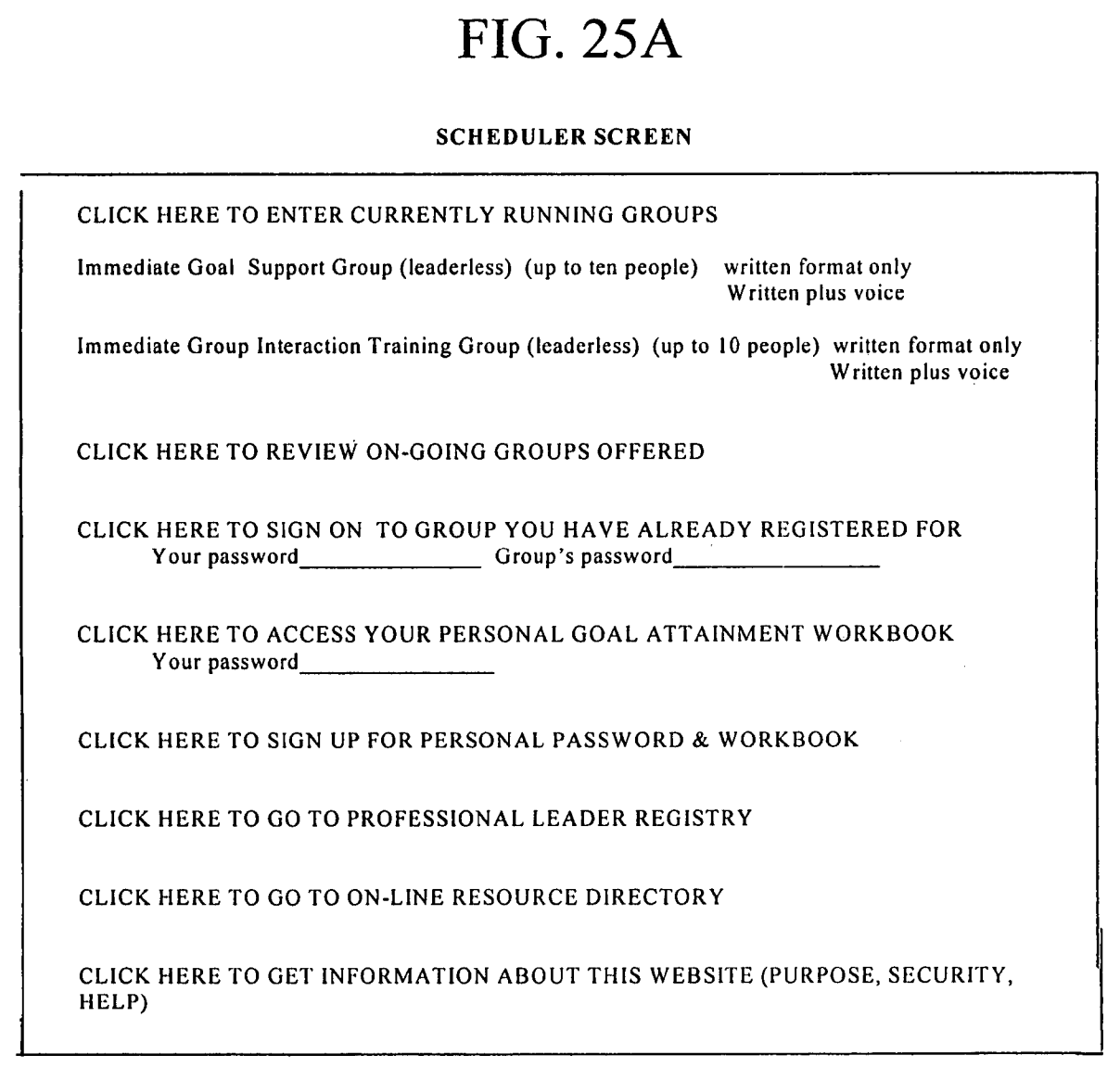

SCHEDULER SCREEN

CLICK HERE TO ENTER CURRENTLY RUNNING GROUPS

Immediate Goal Support Group (leaderless) (up to ten people) written format only
Written plus voice Immediate Group Interaction Training Group (leaderless) (up to 10 people) written format only
Written plus voice

CLICK HERE TO REVIEW ON-GOING GROUPS OFFERED

CLICK HERE TO SIGN ON TO GROUP YOU HAVE ALREADY REGISTERED FOR
Your password______________ Group's password________________

CLICK HERE TO ACCESS YOUR PERSONAL GOAL ATTAINMENT WORKBOOK
Your password_______________

CLICK HERE TO SIGN UP FOR PERSONAL PASSWORD & WORKBOOK

CLICK HERE TO GO TO PROFESSIONAL LEADER REGISTRY

CLICK HERE TO GO TO ON-LINE RESOURCE DIRECTORY

CLICK HERE TO GET INFORMATION ABOUT THIS WEBSITE (PURPOSE, SECURITY, HELP)

FIG. 25B

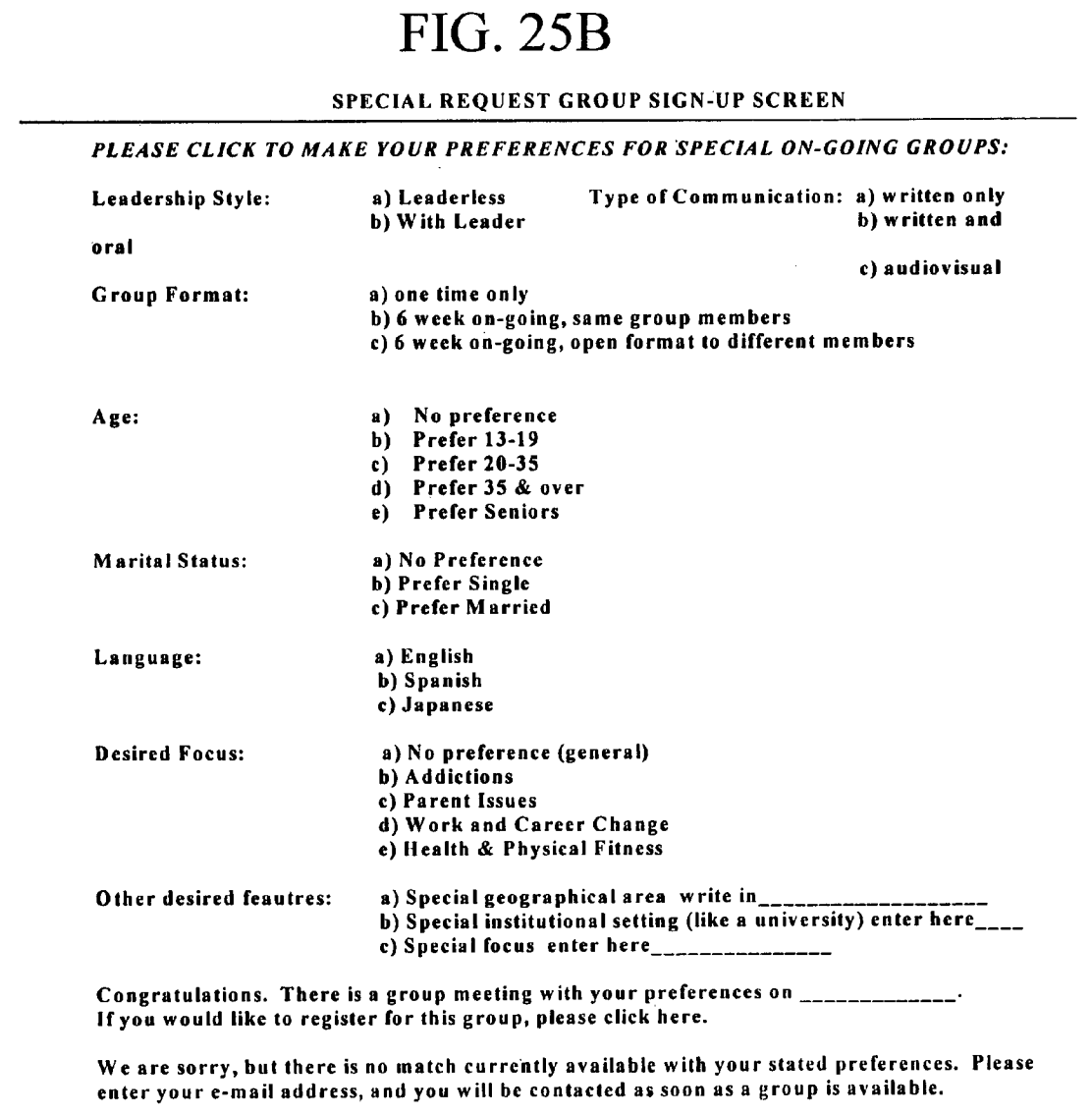

SPECIAL REQUEST GROUP SIGN-UP SCREEN

*PLEASE CLICK TO MAKE YOUR PREFERENCES FOR SPECIAL ON-GOING GROUPS:*

Leadership Style: a) Leaderless b) With Leader

Type of Communication: a) written only b) written and oral c) audiovisual

Group Format:
a) one time only
b) 6 week on-going, same group members
c) 6 week on-going, open format to different members

Age:
a) No preference
b) Prefer 13-19
c) Prefer 20-35
d) Prefer 35 & over
e) Prefer Seniors

Marital Status:
a) No Preference
b) Prefer Single
c) Prefer Married

Language:
a) English
b) Spanish
c) Japanese

Desired Focus:
a) No preference (general)
b) Addictions
c) Parent Issues
d) Work and Career Change
e) Health & Physical Fitness

Other desired feautres:
a) Special geographical area write in___________________
b) Special institutional setting (like a university) enter here____
c) Special focus enter here_______________

**Congratulations. There is a group meeting with your preferences on _____________.
If you would like to register for this group, please click here.**

We are sorry, but there is no match currently available with your stated preferences. Please enter your e-mail address, and you will be contacted as soon as a group is available.

FIG. 25C

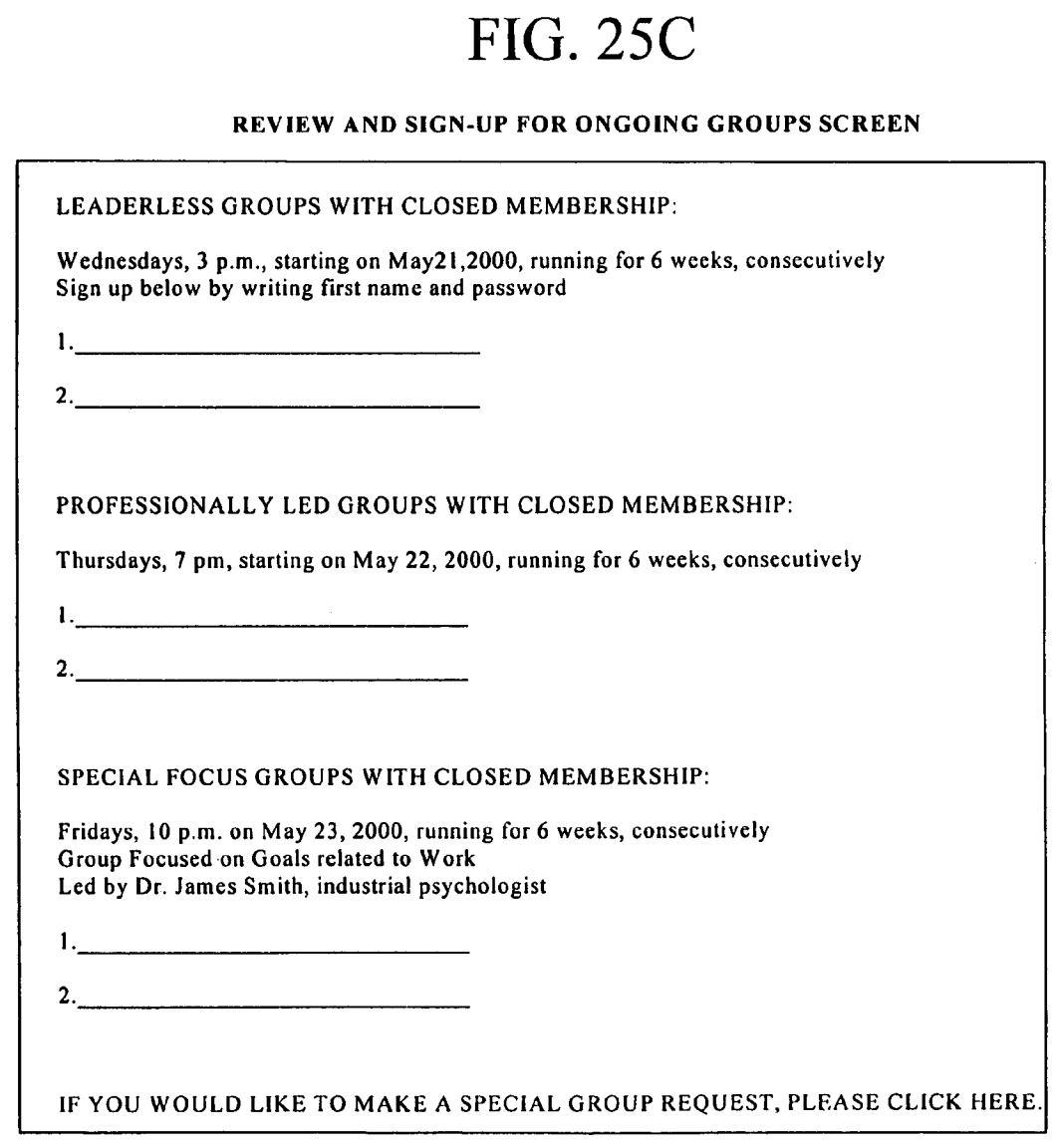

REVIEW AND SIGN-UP FOR ONGOING GROUPS SCREEN

LEADERLESS GROUPS WITH CLOSED MEMBERSHIP:

Wednesdays, 3 p.m., starting on May21,2000, running for 6 weeks, consecutively
Sign up below by writing first name and password

1.____________________

2.____________________

PROFESSIONALLY LED GROUPS WITH CLOSED MEMBERSHIP:

Thursdays, 7 pm, starting on May 22, 2000, running for 6 weeks, consecutively

1.____________________

2.____________________

SPECIAL FOCUS GROUPS WITH CLOSED MEMBERSHIP:

Fridays, 10 p.m. on May 23, 2000, running for 6 weeks, consecutively
Group Focused on Goals related to Work
Led by Dr. James Smith, industrial psychologist

1.____________________

2.____________________

IF YOU WOULD LIKE TO MAKE A SPECIAL GROUP REQUEST, PLEASE CLICK HERE.

FIG. 27A

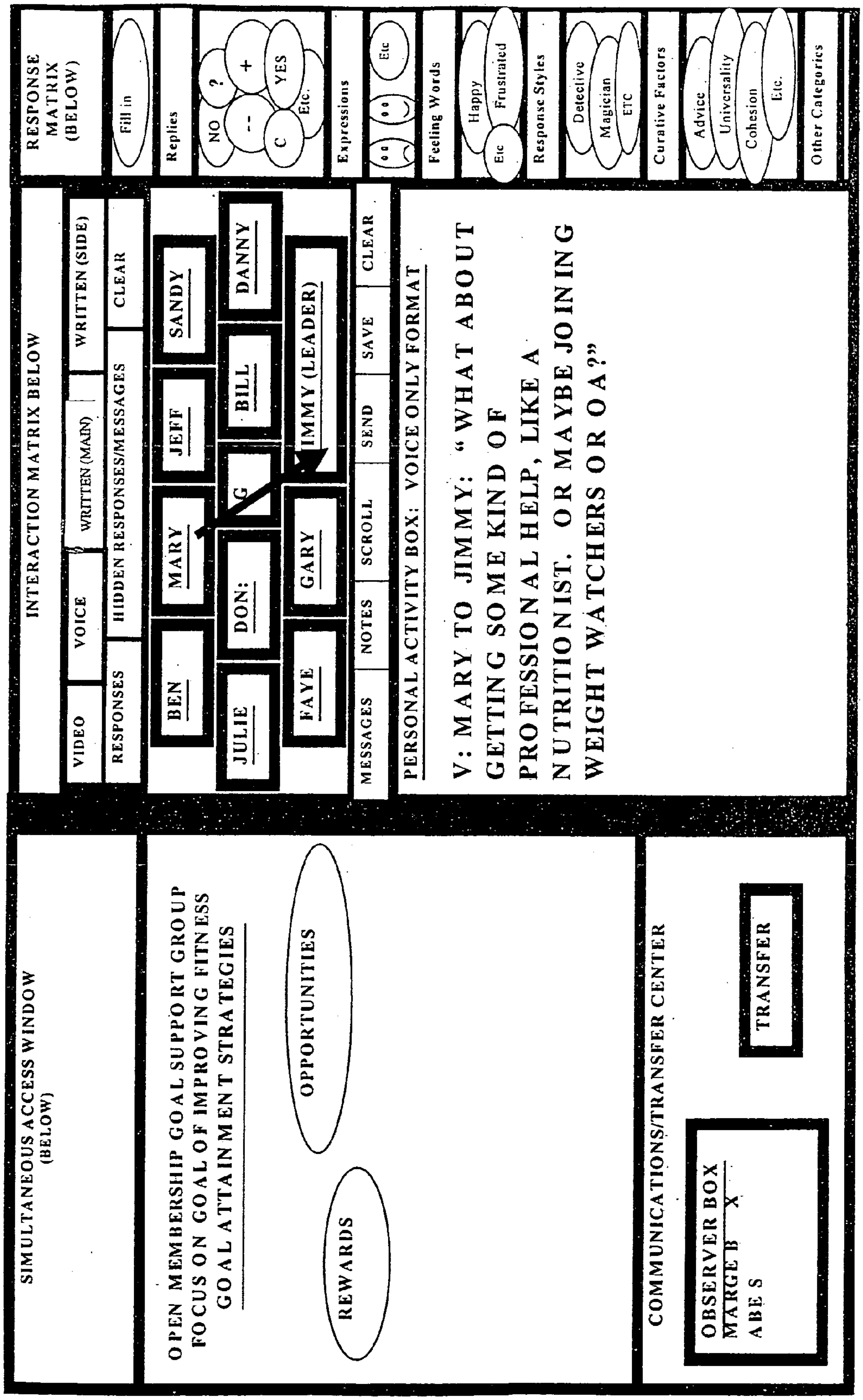

| INTERACTION MATRIX BELOW | | | | | RESPONSE MATRIX (BELOW) |
|---|---|---|---|---|---|
| VIDEO | VOICE | WRITTEN (MAIN) | WRITTEN (SIDE) | | Fill in |
| RESPONSES | HIDDEN RESPONSES/MESSAGES | | CLEAR | | Replies |
| BEN | MARY | JEFF | SANDY | | NO ? YES — C + Etc. |
| JULIE | DON: | BILL | DANNY | | Expressions (o o) |
| | FAYE | GARY | JIMMY (LEADER) | | Feeling Words Happy Frustrated Etc |
| MESSAGES | NOTES | SCROLL | SEND | SAVE | CLEAR | Response Styles Detective Magician ETC |
| PERSONAL ACTIVITY BOX: VOICE ONLY FORMAT | | | | | Curative Factors Advice Universality Cohesion Etc. |
| V: MARY TO JIMMY: "WHAT ABOUT GETTING SOME KIND OF PROFESSIONAL HELP, LIKE A NUTRITIONIST. OR MAYBE JOINING WEIGHT WATCHERS OR OA?" | | | | | Other Categories |

SIMULTANEOUS ACCESS WINDOW
(BELOW)

OPEN MEMBERSHIP GOAL SUPPORT GROUP
FOCUS ON GOAL OF IMPROVING FITNESS
GOAL ATTAINMENT STRATEGIES

OPPORTUNITIES

REWARDS

COMMUNICATIONS/TRANSFER CENTER

OBSERVER BOX
MARGE B  X
ABE S

TRANSFER

TEXT-COLUMN DISPLAY FORMAT OF FIG. 5A

TEXT-COLUMN DISPLAY FORMAT OF FIG. 5B

FIG. 29A

TEXT-GRID DISPLAY FORMAT OF FIG. 5A

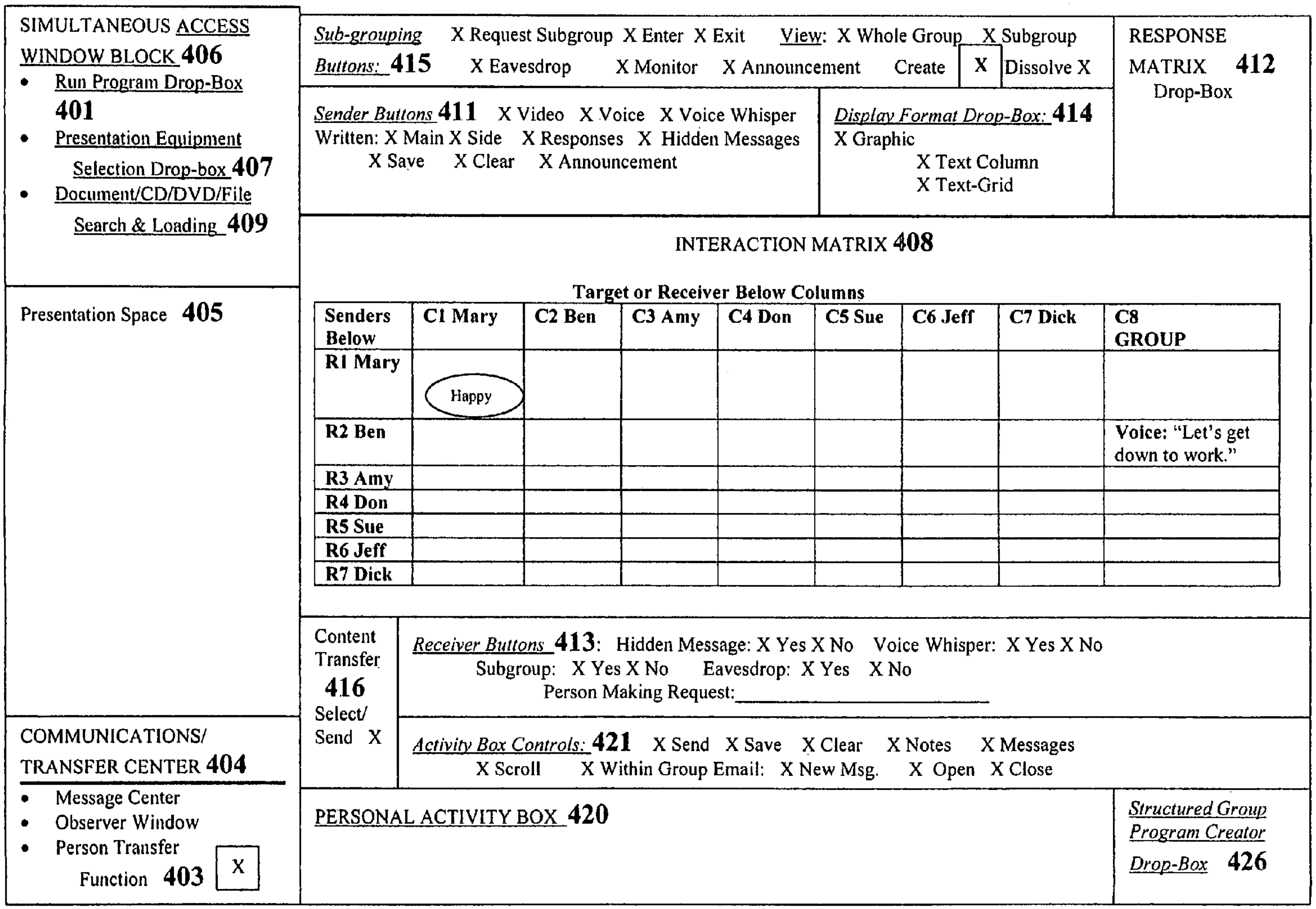

FIG. 29A    TEXT-GRID DISPLAY FORMAT OF FIG. 5A

SIMULTANEOUS ACCESS WINDOW BLOCK 406
- Run Program Drop-Box 401
- Presentation Equipment
  Selection Drop-box 407
  Document/CD/DVD/File
  Search & Loading 409

Presentation Space 405

COMMUNICATIONS/ TRANSFER CENTER 404
- Message Center
- Observer Window
- Person Transfer
  Function 403  [X]

*Sub-grouping* — X Request Subgroup   X Enter   X Exit   *View:* X Yes X No   X Subgroup   RESPONSE
*Buttons:* 415   X Eavesdrop   X Monitor   X Announcement   Create   [X]  Dissolve X   MATRIX 412
Drop-Box

*Sender Buttons* 411   X Video   X Voice   X Voice Whisper
Written: X Main X Side   X Responses   X Hidden Messages       *Display Format Drop-Box:* 414
    X Save   X Clear   X Announcement                           X Graphic
                                                                X Text Column
                                                                X Text-Grid

INTERACTION MATRIX 408

Target or Receiver Below Columns

| Senders Below | C1 Mary | C2 Ben | C3 Amy | C4 Don | C5 Sue | C6 Jeff | C7 Dick | C8 GROUP |
|---|---|---|---|---|---|---|---|---|
| R1 Mary | Happy |  |  |  |  |  |  | Voice: "Let's get down to work." |
| R2 Ben |  |  |  |  |  |  |  |  |
| R3 Amy |  |  |  |  |  |  |  |  |
| R4 Don |  |  |  |  |  |  |  |  |
| R5 Sue |  |  |  |  |  |  |  |  |
| R6 Jeff |  |  |  |  |  |  |  |  |
| R7 Dick |  |  |  |  |  |  |  |  |

Content Transfer 416   *Receiver Buttons:* 413: Hidden Message: X Yes X No   Voice Whisper: X Yes X No
Select/                    Subgroup: X Yes X No   Eavesdrop: X Yes   X No
Send  X                    Person Making Request: _____

*Activity Box Controls:* 421   X Send   X Save   X Clear   X Notes   X Messages
X Scroll   X Within Group Email:   X New Msg.   X Open   X Close

PERSONAL ACTIVITY BOX 420

*Structured Group Program Creator Drop-Box* 426

FIG. 29B

TEXT-GRID DISPLAY FORMAT OF FIG. 5B

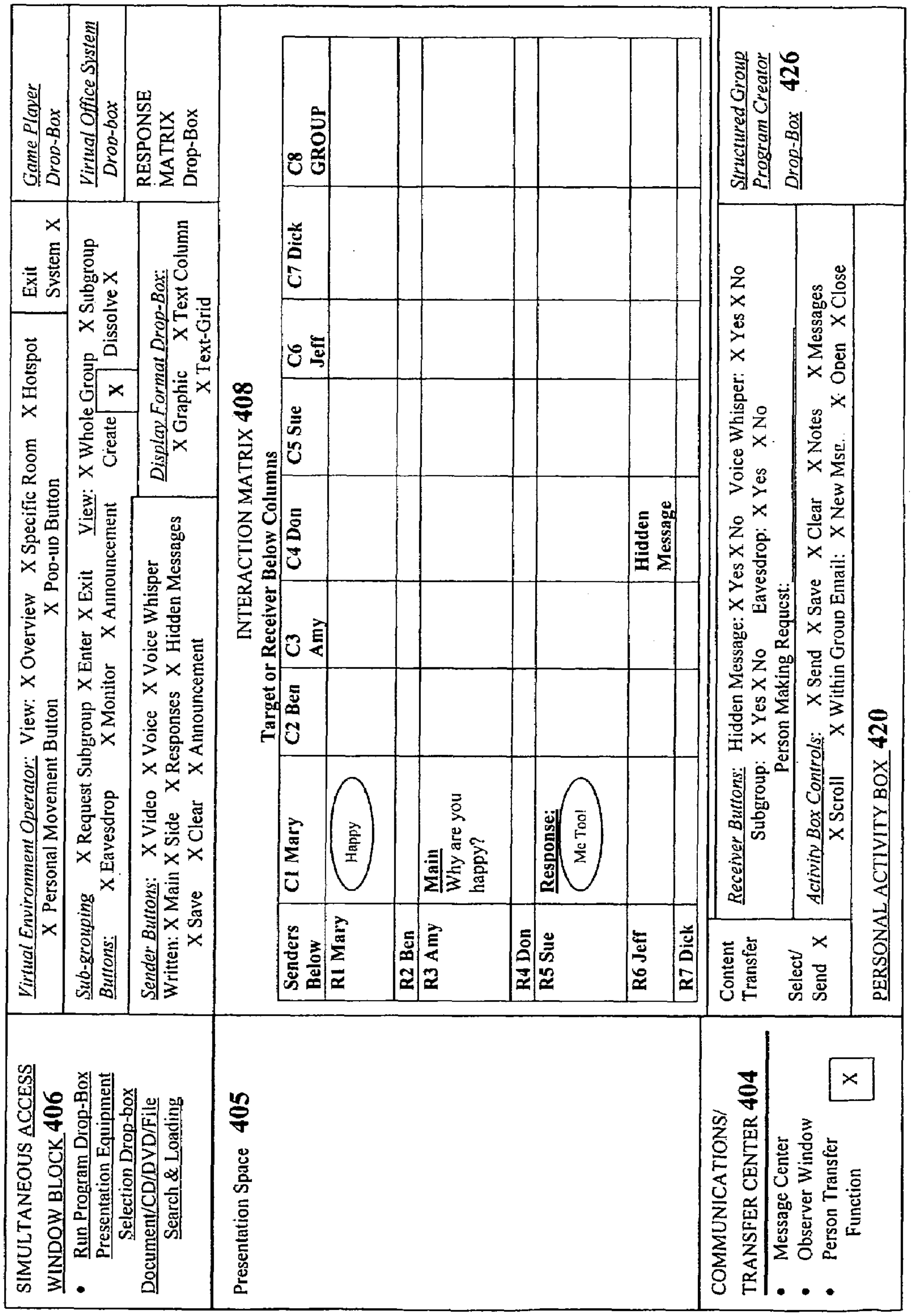

FIG. 29B    TEXT-GRID DISPLAY FORMAT OF FIG. 5B

| SIMULTANEOUS ACCESS WINDOW BLOCK 406 | *Virtual Environment Operator:* View: X Overview  X Specific Room  X Hotspot<br>X Personal Movement Button                            X Pop-up Button | | | | | | | *Exit*<br>System X | *Game Player*<br>*Drop-Box* |
|---|---|---|---|---|---|---|---|---|---|
| • Run Program Drop-Box<br>  Presentation Equipment<br>  Selection Drop-box | *Sub-grouping*  X Request Subgroup X Enter X Exit   View: X Whole Group  X Subgroup<br>*Buttons:*        X Eavesdrop       X Monitor    X Announcement        Create  [ X ]   Dissolve X | | | | | | | | *Virtual Office System*<br>*Drop-box* |
| Document/CD/DVD/File<br>Search & Loading | *Sender Buttons:*  X Video  X Voice  X Voice Whisper<br>Written: X Main X Side  X Responses  X Hidden Messages<br>         X Save   X Clear  X Announcement | | | | | *Display Format Drop-Box:*<br>X Graphic     X Text Column<br>                       X Text-Grid | | | RESPONSE<br>MATRIX<br>Drop-Box |
| Presentation Space 405 | INTERACTION MATRIX 408 | | | | | | | | |
| | Target or Receiver Below Columns | | | | | | | | |
| | Senders<br>Below | C1 Mary | C2 Ben | C3<br>Amy | C4 Don | C5 Sue | C6<br>Jeff | C7 Dick | C8<br>GROUP |
| | R1 Mary | ( Happy ) | | | | | | | |
| | R2 Ben | | | | | | | | |
| | R3 Amy | Main<br>Why are you<br>happy? | | | | | | | |
| | R4 Don | | | | | | | | |
| | R5 Sue | Response:<br>( Me Too! ) | | | | | | | |
| | R6 Jeff | | | | Hidden<br>Message | | | | |
| | R7 Dick | | | | | | | | |
| Content<br>Transfer | *Receiver Buttons:*  Hidden Message: X Yes X No   Voice Whisper:  X Yes X No<br>                    Subgroup: X Yes X No    Eavesdrop: X Yes  X No<br>                    Person Making Request: | | | | | | | | *Structured Group*<br>*Program Creator*<br>*Drop-Box*  426 |
| Select/<br>Send  X | *Activity Box Controls:*   X Send  X Save   X Clear  X Notes    X Messages<br>                   X Scroll   X Within Group Email:  X New Msr.   X: Open  X Close | | | | | | | | |
| COMMUNICATIONS/<br>TRANSFER CENTER 404 | PERSONAL ACTIVITY BOX 420 | | | | | | | | |
| • Message Center<br>• Observer Window<br>• Person Transfer<br>  Function  [ X ] | | | | | | | | | |

SUB-GROUPING DEMONSTRATION WITH GRAPHIC DISPLAY FORMAT

FIG. 30B SUB-GROUPING DEMONSTRATION WITH TEXT-COLUMN DISPLAY OF INTERACTION MATRIX
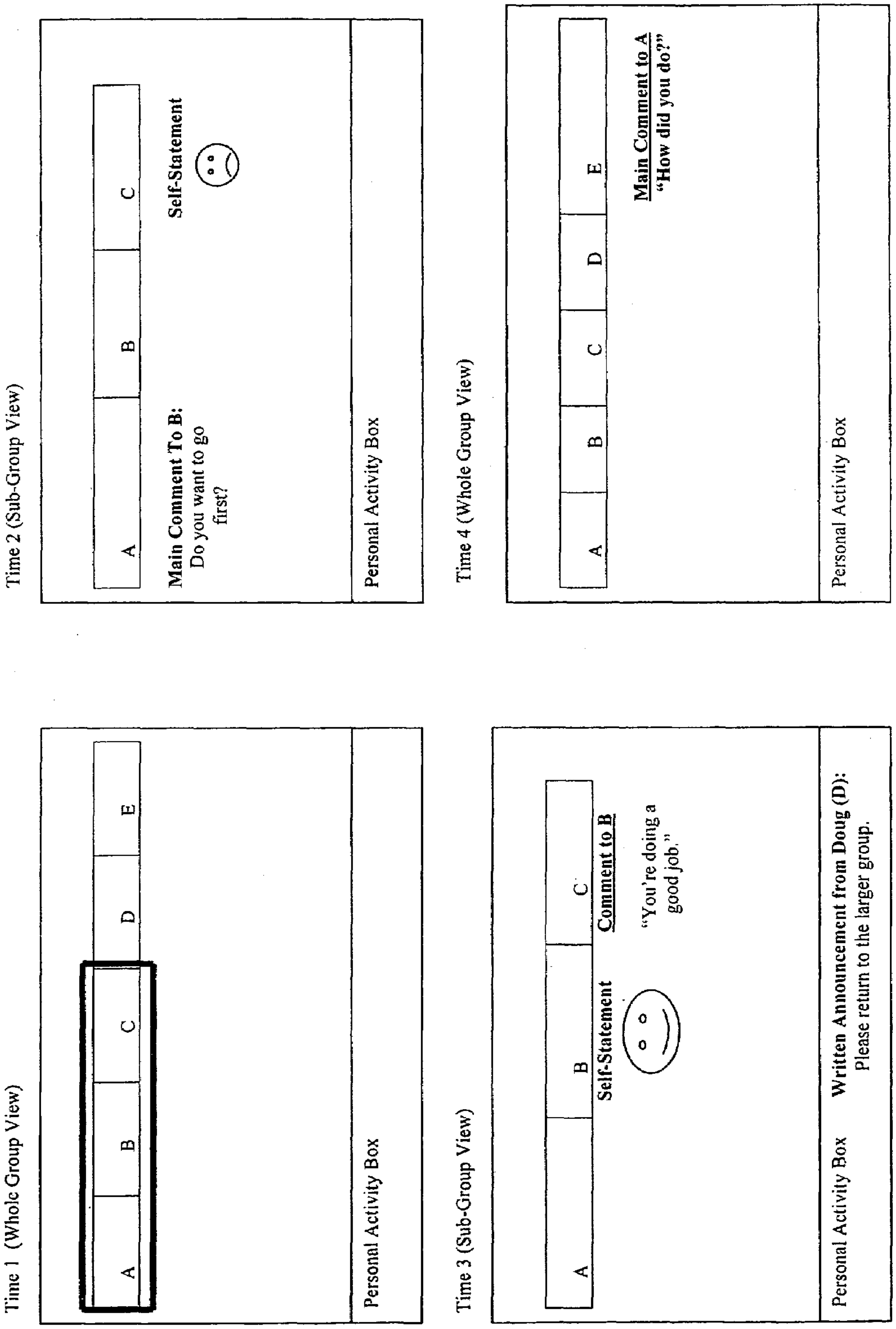

FIG. 30C

SUB-GROUPING DEMONSTRATION WITH TEXT-GRID DISPLAY OF INTERACTION MATRIX

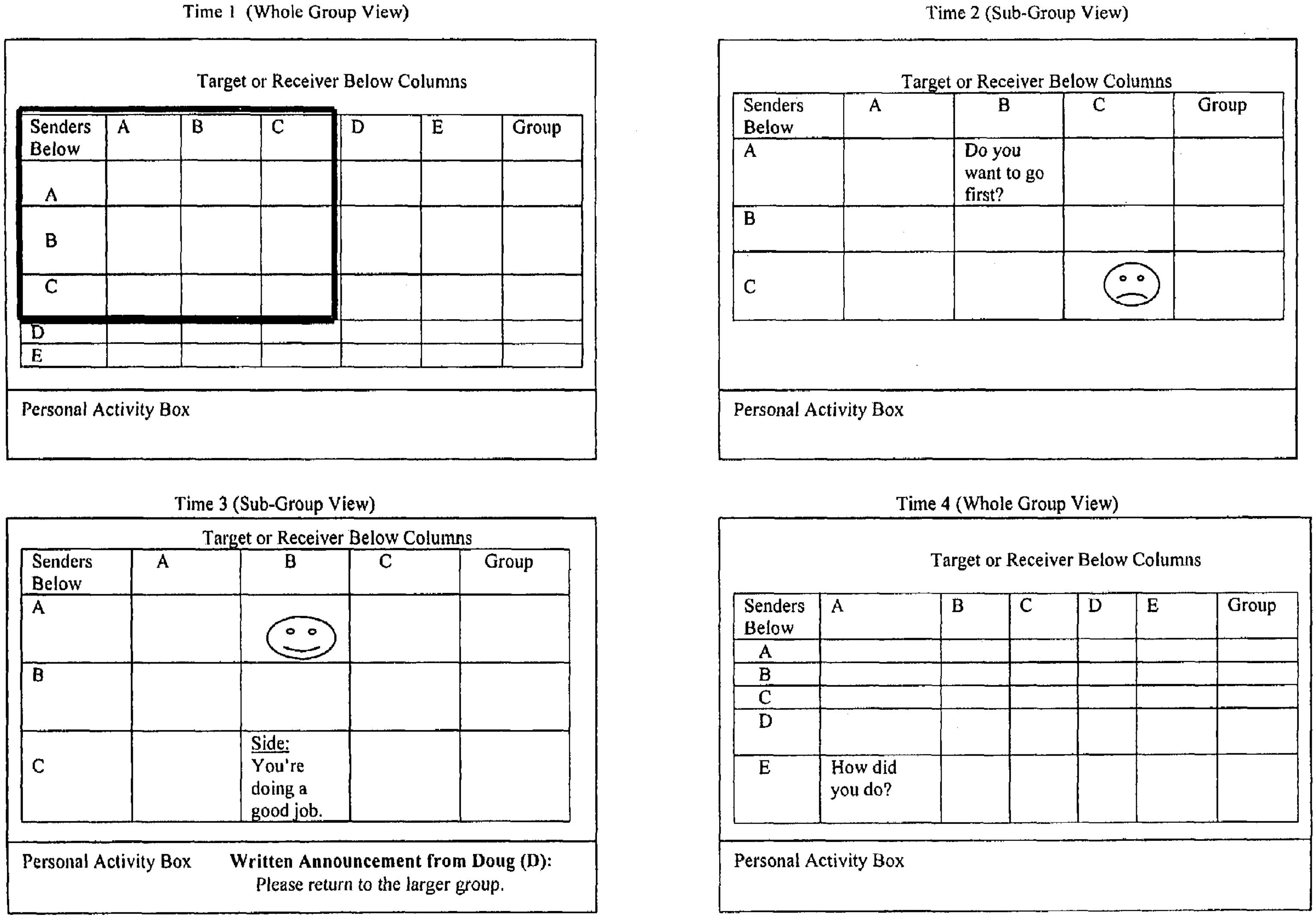

FIG. 30C  SUB-GROUPING DEMONSTRATION WITH TEXT-GRID DISPLAY OF INTERACTION MATRIX

Time 1 (Whole Group View)

Target or Receiver Below Columns

| Senders Below | A | B | C | D | E | Group |
|---|---|---|---|---|---|---|
| A | | | | | | |
| B | | | | | | |
| C | | | | | | |
| D | | | | | | |
| E | | | | | | |

Personal Activity Box

Time 2 (Sub-Group View)

Target or Receiver Below Columns

| Senders Below | A | B | C | Group |
|---|---|---|---|---|
| A | | Do you want to go first? | | |
| B | | | | |
| C | | | :-) | |

Personal Activity Box

Time 3 (Sub-Group View)

Target or Receiver Below Columns

| Senders Below | A | B | C | Group |
|---|---|---|---|---|
| A | | | | |
| B | | :-) | | |
| C | | Side: You're doing a good job. | | |

Personal Activity Box    Written Announcement from Doug (D): Please return to the larger group.

Time 4 (Whole Group View)

Target or Receiver Below Columns

| Senders Below | A | B | C | D | E | Group |
|---|---|---|---|---|---|---|
| A | | | | | | |
| B | | | | | | |
| C | | | | | | |
| D | | | | | | |
| E | How did you do? | | | | | |

Personal Activity Box

FIG. 31 Double-Decker Game Player

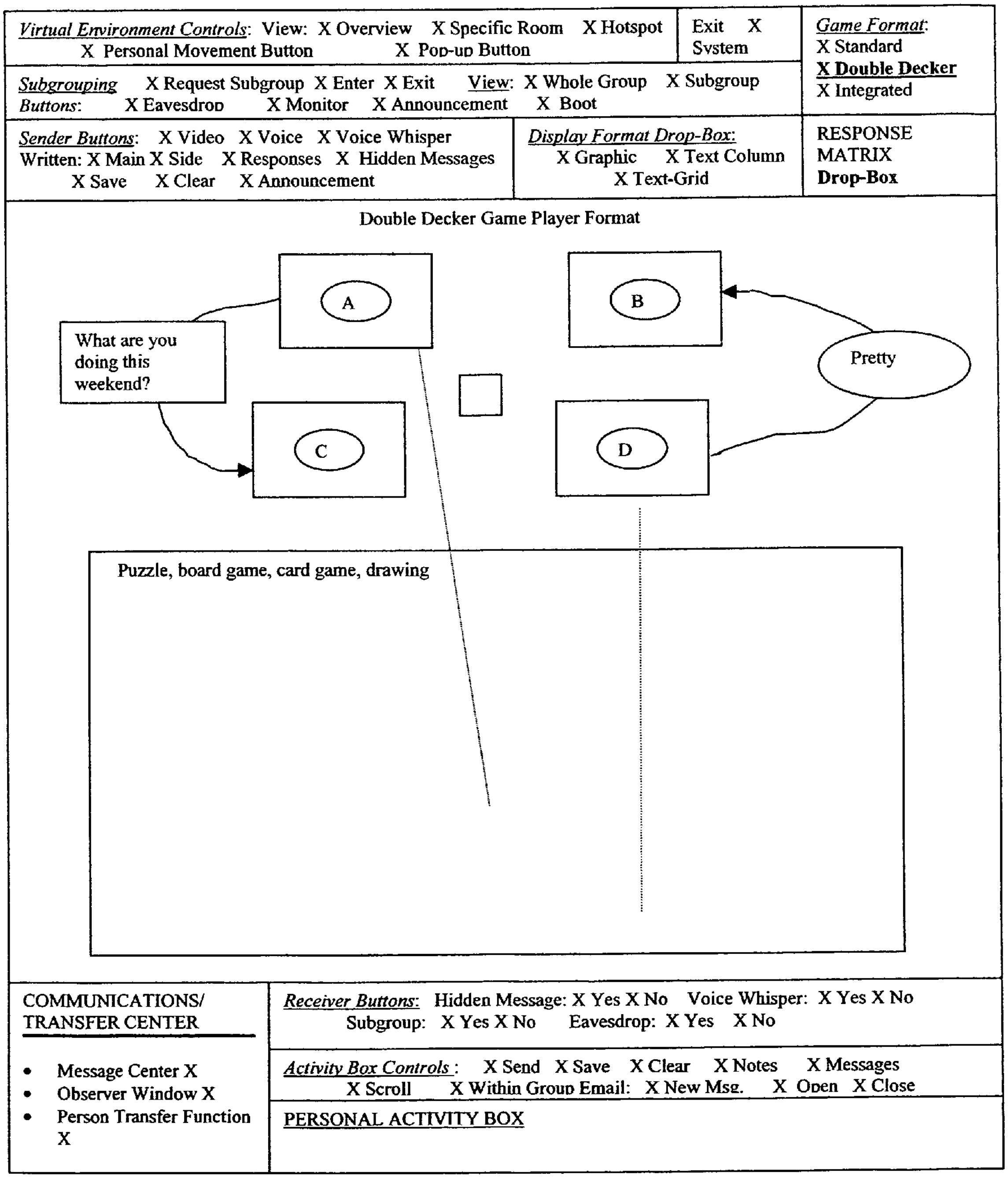

| Virtual Environment Controls: View: X Overview  X Specific Room  X Hotspot  X Personal Movement Button  X Pop-up Button | | Exit X System | Game Format: X Standard |
|---|---|---|---|
| Subgrouping Buttons: | X Request Subgroup  X Enter  X Exit  View: X Whole Group  X Subgroup  X Eavesdrop  X Monitor  X Announcement  X Boot | | **X Double Decker** X Integrated |
| Sender Buttons:  X Video  X Voice  X Voice Whisper Written: X Main X Side  X Responses  X Hidden Messages  X Save  X Clear  X Announcement | | Display Format Drop-Box: X Graphic  X Text Column  X Text-Grid | RESPONSE MATRIX **Drop-Box** |

Double Decker Game Player Format

A    B
What are you doing this weekend?           Pretty
C    D

Puzzle, board game, card game, drawing

| COMMUNICATIONS/ TRANSFER CENTER | Receiver Buttons: Hidden Message: X Yes X No   Voice Whisper: X Yes X No Subgroup: X Yes X No   Eavesdrop: X Yes X No |
|---|---|
| • Message Center X  • Observer Window X  • Person Transfer Function X | Activity Box Controls:   X Send  X Save  X Clear  X Notes  X Messages X Scroll  X Within Group Email: X New Msg.  X Open X Close |
| | PERSONAL ACTIVITY BOX |

FIG. 32 Integrated Game Player

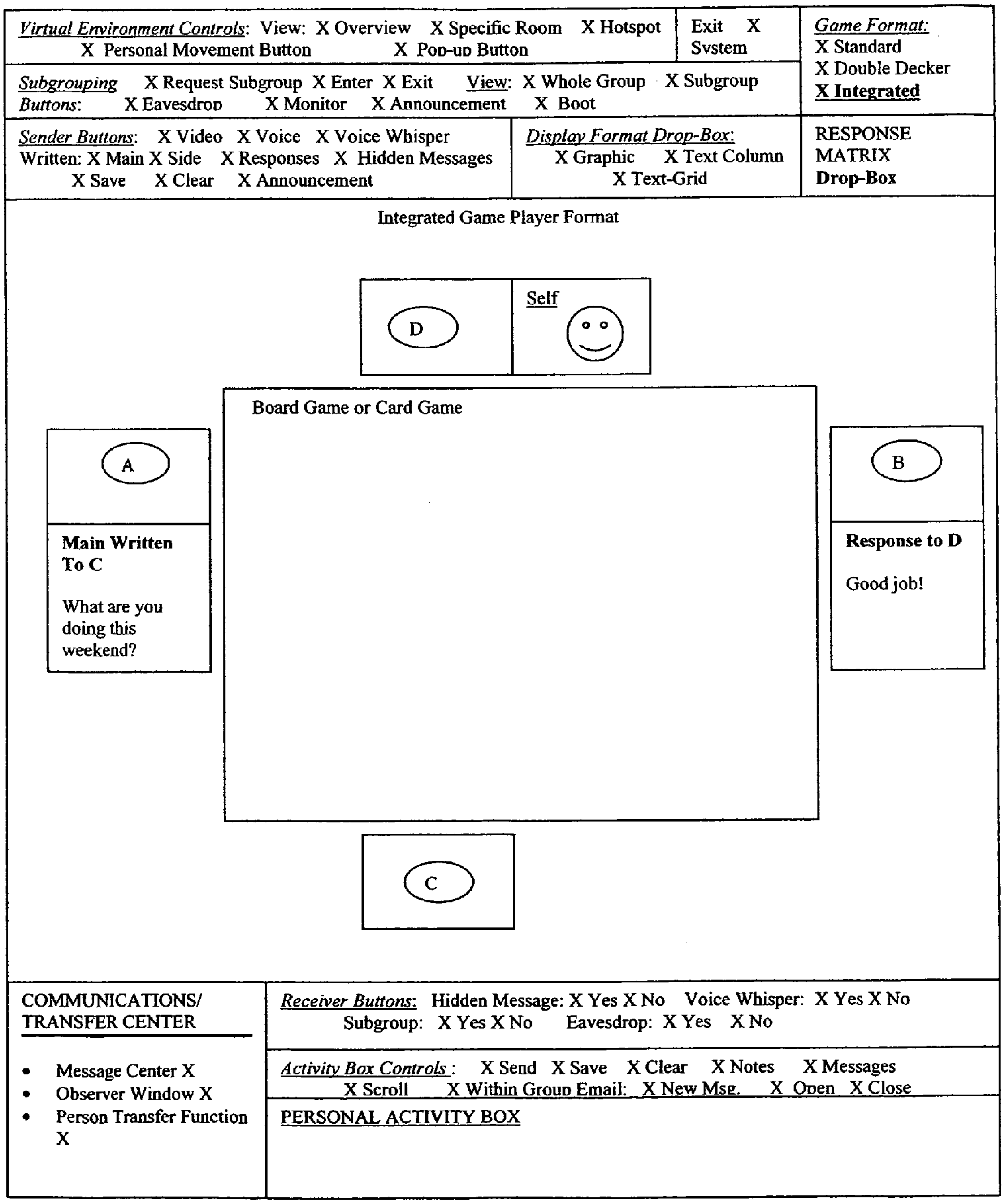

| Virtual Environment Controls: View: X Overview  X Specific Room  X Hotspot<br>X Personal Movement Button   X Pop-up Button | Exit X<br>System | Game Format:<br>X Standard |
|---|---|---|
| Subgrouping   X Request Subgroup  X Enter  X Exit   View: X Whole Group  X Subgroup<br>Buttons:    X Eavesdrop    X Monitor   X Announcement   X Boot | | X Double Decker<br>**X Integrated** |
| Sender Buttons:  X Video  X Voice  X Voice Whisper<br>Written: X Main X Side  X Responses  X Hidden Messages<br>X Save   X Clear  X Announcement | Display Format Drop-Box:<br>X Graphic   X Text Column<br>X Text-Grid | RESPONSE<br>MATRIX<br>Drop-Box |

Integrated Game Player Format

[Self — D, smiley face]

Board Game or Card Game

A — Main Written To C  What are you doing this weekend?

B — Response to D  Good job!

C

| COMMUNICATIONS/<br>TRANSFER CENTER | Receiver Buttons:  Hidden Message: X Yes X No   Voice Whisper: X Yes X No<br>Subgroup:  X Yes X No    Eavesdrop: X Yes  X No | |
|---|---|---|
| • Message Center X<br>• Observer Window X<br>• Person Transfer Function X | Activity Box Controls :   X Send  X Save  X Clear   X Notes   X Messages<br>X Scroll    X Within Group Email:  X New Msg.   X Open  X Close | |
| | PERSONAL ACTIVITY BOX | |

VIRTUAL TRADESHOW ENVIRONMENT BUILDER DEMONSTRATION

VIRTUAL TRADE SHOW ENVIRONMENT IN OPERATION

FIG. 33C SPECIFIC ROOM FROM TRADE SHOW ENVIRONMENT IN FIG. 33B
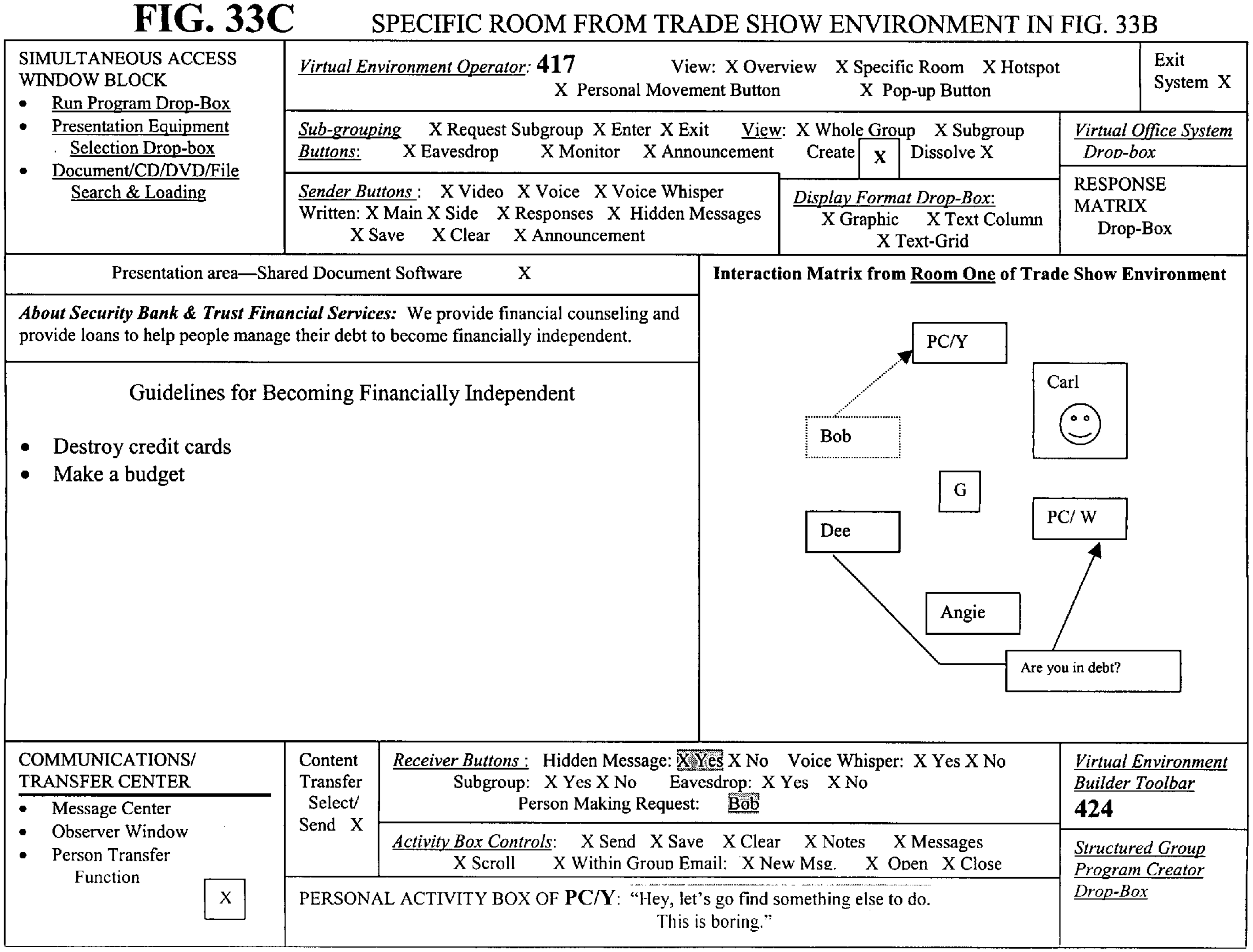

VIRTUAL HOUSE PARTY SHOW ENVIRONMENT IN OPERATION

FIG. 34B TEXT-ROW INTERACTION DISPLAY FORMAT OF ROOM FROM FIG. 34A

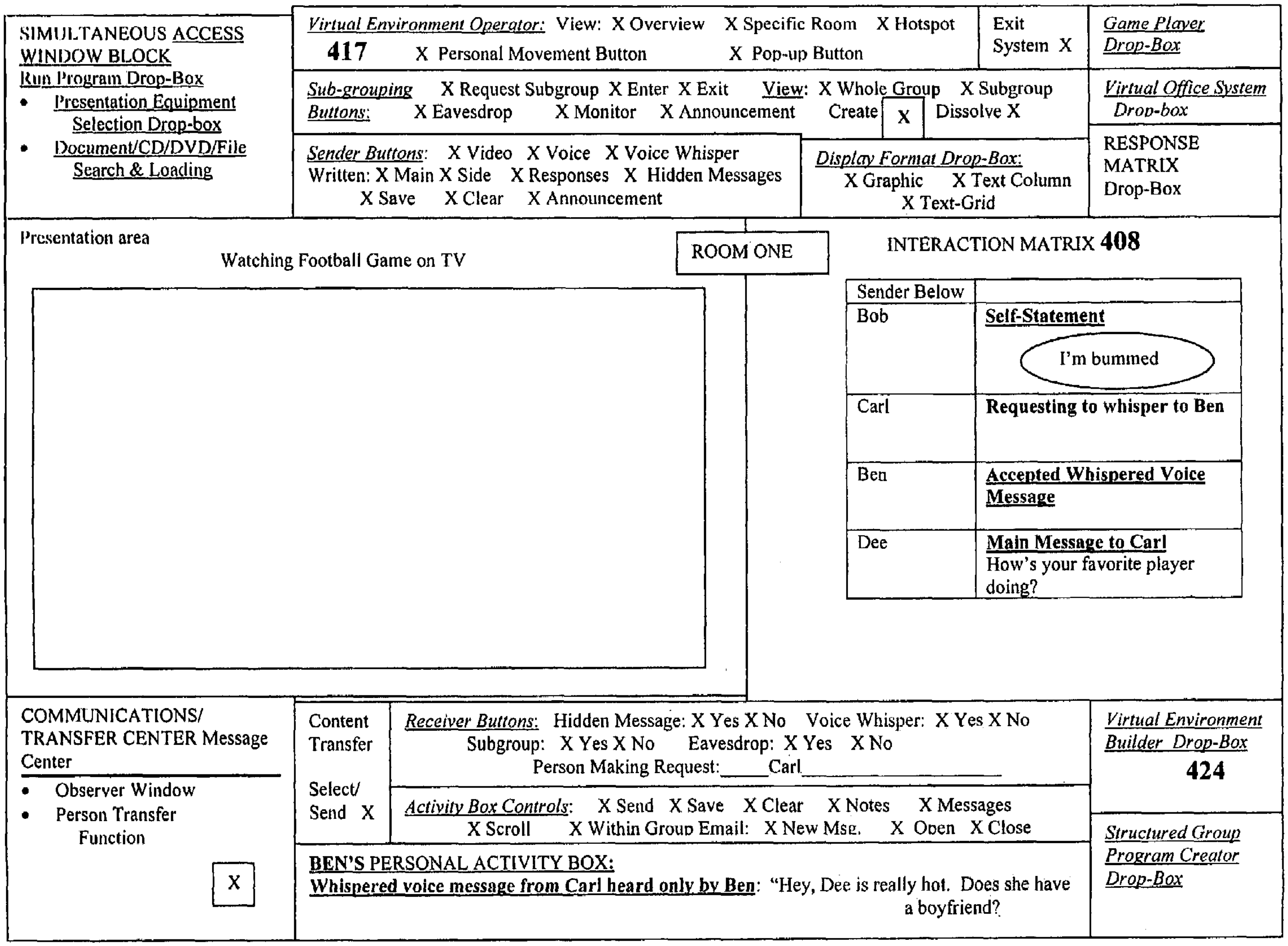

SIMULTANEOUS ACCESS WINDOW BLOCK
- Run Program Drop-Box
- Presentation Equipment Selection Drop-box
- Document/CD/DVD/File Search & Loading

Virtual Environment Operator: View: X Overview  X Specific Room  X Hotspot  Exit System X  *Game Player Drop-Box*
417  X Personal Movement Button  X Pop-up Button

Sub-grouping Buttons: X Request Subgroup  X Enter  X Exit  View: X Whole Group  X Subgroup  *Virtual Office System Drop-box*
X Eavesdrop  X Monitor  X Announcement  Create [x] Dissolve X

Sender Buttons: X Video  X Voice  X Voice Whisper  *Display Format Drop-Box:*  RESPONSE MATRIX Drop-Box
Written: X Main  X Side  X Responses  X Hidden Messages  X Graphic  X Text Column
X Save  X Clear  X Announcement  X Text-Grid

ROOM ONE

Presentation area — Watching Football Game on TV

INTERACTION MATRIX 408

| Sender Below | Self-Statement | Requesting to whisper to Ben | Accepted Whispered Voice Message | Main Message to Carl How's your favorite player doing? |
|---|---|---|---|---|
| Bob | I'm bummed | | | |
| Carl | | | | |
| Ben | | | | |
| Dee | | | | |

Content Transfer — Receiver Buttons: Hidden Message: X Yes X No  Voice Whisper: X Yes X No
Subgroup: X Yes X No  Eavesdrop: X Yes X No  *Virtual Environment Builder Drop-Box* 424
Select/ Send X  Person Making Request: Carl

Activity Box Controls: X Send  X Save  X Clear  X Notes  X Messages  *Structured Group Program Creator Drop-Box*
X Scroll  X Within Group Email:  X New Msg.  X Open  X Close

BEN'S PERSONAL ACTIVITY BOX:
Whispered voice message from Carl heard only by Ben: "Hey, Dee is really hot. Does she have a boyfriend?"

COMMUNICATIONS/ TRANSFER CENTER Message Center
- Observer Window
- Person Transfer Function  [x]

FIG. 35 STRUCTURED GROUP PROGRAM CREATOR

Program Name: (Fill In) ______________________

Lesson Number Or Name: ______________

- Content Materials: Upload CDs, DVDs, Documents, Live Presentations, Photos, etc.
  Enter file name(s) here [ ]
- Equipment: Select equipment required to present content materials (e.g. slide show projector, television, internet content, shared document program, chalkboard, karaoke machine, etc.) Select equipment here [ ]
- Interaction Matrix Components: Settings for Interaction Matrix, Response Matrix selection, Prompts and Ratings, etc. (Select from Drop-Boxes Below)

| Interaction Matrix Settings Drop-Box | Response Matrix Settings Drop-Box | Prompts & Ratings Drop-Box |
|---|---|---|

- Personal Materials: Includes selection of workbooks, homework assignments, journals and other personal documents, etc.
  Enter file name(s) here [ ]
- Assessment Measures: Includes tests, feedback reports, evaluation forms, standard assessment tools, etc.
  Enter file name(s) here [ ]
- External Connections: Internet, Bulletin Boards, Registry, Group Bios, Within Group Email, etc.
  Select desired connections here [ ]

Click here to bring up existing page for revision or to create new lesson

[Revise Existing Lesson]

[Create New Lesson]

FIG. 36

OUTLINE OF PROGRAMS ACCESSED BY RUN PROGRAM DROP-BOX 401 (FIG. 4)

| |
|---|
| **Standard System Drop-Box**<br>Presentation Equipment Selection<br>Document/CD/DVD/File Search & Loading |
| **File Access/Storage Drop-Box**<br>File Search/Browsing/Uploading/Transferring/Downloading/Storing |
| **Structured Group Program Player Drop-Box**<br>Upload files for playing/List of Programs for playing/Selection of equipment for playing program |
| **Virtual Game Player Drop-Box**<br>Upload specific games to be played/List of available games/Selection of game playing format (Standard, Double-Decker and Integrated) |
| **Virtual Environment Operator Toolbar**<br>Includes Selection of View (including Overview, specific room or Hotspot); Pop-Up Selection; and Personal Movement Options |
| **Virtual Office System Drop-Box**<br>Includes selection of View (overview of offices with scheduler, overview of location of all employee users, specific meeting room); access to external communications systems (like the internet and bulletin boards); and selection of content materials and presentation equipment |
| **Virtual Environment Builder Toolbar**<br>Includes selection of layouts (including tradeshow, conference, house, etc); selection of room for loading with presentation equipment and files; selection of furniture and tools to arrange in desired combinations inside each room; selection of "hotspots" where natural social groupings can occur; and editing of pop-ups which provide brief introductions of people and activities in virtual environment |
| **Structured Group Program Creator Program**<br>Includes blank program with prompts to select content materials, presentation equipment, interaction matrix components (like response matrix additions, prompts and ratings); personal materials (like workbooks and homework assignments); assessment measures (like tests, feedback reports and other assessment tools); and external connections (such as the internet, bulletin boards, and within group email). |

METHOD AND APPARATUS FOR PROVIDING GROUP INTERACTION VIA COMMUNICATIONS NETWORKS

CROSS REFERENCE TO RELATED APPLICATION

This application is a Continuation-In-Part of Regular Utility patent application Ser. No. 09/836,512, filed on Apr. 17, 2001 now U.S. Pat. No. 7,124,134, is based on and claims the benefit of Provisional Patent Application Ser. No. 60/221,213, filed Jul. 27, 2000, and is based on and claims the benefit of Provisional Patent Application Ser. No. 60/197,987, filed Apr. 18, 2000. All of the aforementioned regular utility and provisional patent applications are incorporated herein by reference.

BACKGROUND OF THE INVENTION

1. Field of the Invention

The present invention relates to systems, methods and software for applying psychological approaches to enhancing the quality of group interaction, group activities and group environments over computer networks.

2. Description of the Prior Art

I: Problems with Providing Computerized Group Interaction; Prior Art; how Present Invention with Improvements Addresses these Problems Problems with Existing Systems of Computerized Group Interaction:

There are many problems associated with currently available systems of computerized group interaction. Generally speaking, conventional systems for virtual group interaction (e.g. chat-rooms) are poor replicas of actual communication in the real world. They are even poorer imitations of the operation of real-life task-oriented work groups. A detailed look at the specific problems associated with currently available systems of computerized group interaction follows.

One major problem with currently available systems of group interaction is that they do not provide a way of visualizing all members of the group with whom one is interacting (including all verbal and nonverbal communications between members) as they are occurring simultaneously in real-time. For example, when a person attends a real-life staff meeting at work, she is usually able to see the speakers and the other staff members present at the meeting. When she hears somebody speaking, she can connect the voice with the speaker, and can usually determine to whom the speaker is directing his/her comments, as well as how the speaker is feeling and how the listener(s) are reacting to the message. In existing systems of computerized group interaction (like chat-rooms and virtual office meeting rooms), it is difficult to ascertain these things because a great deal of what is going on in the meeting (like simultaneous group activities and nonverbal communication) cannot be conveyed.

Another problem with these computerized systems is that communication must usually occur in a serial manner, one entry or message at a time, even though this is not the way natural communication in the real world occurs. To the contrary, many times people in real-life meetings have side conversations going on, or they make short comments while the main speaker continues to talk, or they send hand-written notes back and forth while someone else has the floor, or they whisper to each other while a main speaker continues to talk to the group. In existing systems of computerized group interaction, different types of simultaneous communication (like voice, text and iconic displays) between members of a group are not possible. In addition, there is no way for participants in a group to choose to engage in different types of communication (like speaking, whispering, or sending a written note) nor to indicate the intended receiver or target of each chosen communication. Finally, there is no way for these "communication flows" (including the type of communication, the content of the communication, and the originators and intended targets of each communication) to be displayed so that all members of the virtual group can "see" what is going on.

Another problem with existing computerized systems is that some specially developed clinical methods for teaching group communication skills cannot be utilized during the course of the meeting. One clinical method for teaching group communication skills in real-life group settings is using training exercises. One such exercise used in marital counseling developed by Clifford Notarius and Howard Markman (Notarius, Clifford and Markman, Howard, *We Can Work It Out*, Berkley Publishing Group, New York, N.Y., 1993, pp. 85-89) involves having each partner hold three cards, one having a plus sign (+), one having a minus sign (−) and one having a neutral sign (0) written on it. In practice, the partner holds up the card that best describes how he or she is feeling as the other person is speaking. This exercise provides a tremendous amount of feedback to the speaker. This exercise can be adapted for use with real-life groups by having each group member make a set of similar cards. Then the group members can hold up the card that best expresses their reaction to the person who is speaking in the group. This exercise can be highly effective in helping the speaker to pay attention to the reaction of others when speaking. Despite the effectiveness of various types of exercises as aids to improving group skills, existing computerized discussion groups are currently unable to employ these methods.

Another important method for teaching group communication skills is ensuring that all group members receive appropriate feedback about how they are doing. One type of ongoing feedback that can be given in real-life groups is nonverbal communication. This includes perceiving the emotional states and body language of other group members, listening to members' utterances expressing support or disagreement (like ugh! or uh-huh), and noting group process variables (like who takes the lead, who sits next to the leader, who whispers during a presentation). Also, in some training or counseling groups, members can fill out rating scales to give feedback in the group. For example, group members may rate how close they feel to every other group member. Or they may rate how satisfied they are with the group progress. This type of feedback can be used to inform each group member about how he/she is coming across in the group and to steer the group in a desired direction. Additionally, information about one's activity level during a group meeting (like how much he/she speaks or is spoken to) can also provide essential feedback to the group members and leaders. However, there is no currently available system of group interaction that allows for obtaining these types of ratings, retrieving activity level data, and or giving and receiving nonverbal feedback in ongoing groups meeting over global communication networks.

Another serious problem with existing systems of computerized group interaction is that they do not generally allow for the intended target or recipient of each communication to be represented to the participants in the group. Kenny and LaVoie have argued in their description of the Social Relations Model that target or "partner" effects (e.g. how much someone is spoken to or "elicits" from others) are just as important as actor effects (e.g. how much one person talks to others) in understanding social interaction. (Kenny, D. A. and LaVoie, L., The Social Relations Model, in L. Berkowitz (Ed.) *Advances in Experimental Social Psychology*, pp. 141-182, 1984, Academic Press, New York.) Additionally, in order to follow relational adjustments in social interaction (e.g. how someone may elicit much more talking from one person than another or how someone may talk much more to one person than to another), both the originator and recipient of each communication must be represented. In real-life groups it is usually clear to whom a speaker is directing his/her comments or attentions, but in computerized group interaction it can be difficult to follow the group discussion because information about the target of communications is usually not readily available. Because existing systems of computerized group interaction do not encode information about both the originator and recipient (or target) or each communication, they cannot provide data about actor, partner and relationship effects in the Social Relations Model for feedback, training or research purposes.

Another problem with existing systems of computerized group interaction is that it is not possible for a large group of people to break up into smaller groups or dyads with the potential to be called back by an announcement to rejoin the larger group again. In real-life group situations, we have the ability to talk to someone who is sitting next to us in a larger group, to "tune out" all the other conversations going on in the room, and then to attend only to the person sitting next to us for a while. There are many situations in real-life where people may choose to break up into smaller groups while having the potential to return to the larger group when desired, including during academic classes, office meetings, conferences, counseling sessions and other social settings.

Discussion of Prior Art Related to Computerized Group Interaction:

The above-described limitations of existing systems of computerized group interaction can be most clearly demonstrated by examining the system disclosed in U.S. Patent Application Publication No. 2001/0002831, published on Jun. 7, 2001, inventors Masami Kato, Ken Sakakibara and Yoshihisa Tadokoro ("the Kato system"). In this system, coworkers meeting in a computerized "Refresh Room" sit down at the same table. The participants can communicate using any one of three "rest" tools: a voice tool, a character (text chat) tool or a multi-user game tool. The Kato system is limited in its ability to deliver a real-life social interaction experience over computer networks because participants can only engage in one type of communication at a time (voice, text or game interaction). In addition, there is no way in the Kato system for participants to identify the target or intended receiver of each message or communication. Participants in the Kato system can only communicate in serial order, one entry or message at a time. Because participants in the Kato system cannot engage in different types of simultaneous communication, it is impossible for them to provide the different types of feedback described above. Neither is it possible to utilize the clinical exercises for teaching communication skills. Neither is it possible to obtain information related to the Social Relations Model, since the Kato system does not encode both the originator and target of each communication exchanged. And finally, there is no way in the Kato system for participants in a larger group gathering to break up into smaller groups or dyads with the potential of rejoining the larger group when desired.

How the Present Invention Addresses Problems with Existing Systems of Computerized Group Interaction:

The present invention corrects for the problems with existing systems of computerized group interaction, as well as the limitations of the Kato system outlined above. The present system accomplishes this by giving group participants the capacity to engage in different types of communication—including voice, written, or iconic expressions—simultaneously in real-time; to choose the type, content and the intended target of each communication; and to have these "communication flows" displayed so that all members of the group can "see" what is going on in the group. The parent of the present patent application described how participants using the system of the present invention could engage in different communication types (e.g., open and hidden voice and text messages, main and side communications, and iconic messages). It also described how the participants could choose the intended receiver or target of each communication (including the ability to indicate the group as a whole as the intended target). In addition, the parent patent application described how the "communication flows" occurring within the group are graphically displayed so that all participants can "see" what is happening in much the same way as they are able to "see" what is happening in a real-life group meeting. The parent patent application described how participants using the system of the present invention could give and receive different types of feedback as well as how participants could engage in specialized exercises for teaching communication skills. And finally, the parent application explained how the system of the present invention was able to retrieve data related to the Social Relations Model from the ongoing group process for training and research purposes.

Improvements Over Parent Patent Application in Addressing Problems with Existing Systems of Computerized Group Interaction:

There are several major improvements in this continuation in part that address problems with existing systems of computerized group interaction. First of all, a voice-whispering feature has been added to the communication system of the present invention, allowing one member "A" of a virtual group to signal to another member "B" that he/she wants to whisper something to "B". The system allows the intended receiver of the whispered message to choose whether or not he wishes to hear it. The system graphically demonstrates the communication flow of the whispered message originating from member A and flowing to member B, but only member B is actually able to hear the whispered message. This feature is an improvement in the present system because it allows for a whispered communication to occur much like is possible in real-life group interaction.

A second major improvement in this continuation in part application involves a subgrouping capability. In real-life group interaction, people sometimes break off into smaller groups or dyads to converse while a larger group activity is going on. For example, students in a classroom may talk quietly together while a lecture is being given, or people in a training seminar may be asked to break up into smaller groups to practice specific exercises. Usually in these types of situations there is a way for someone to announce that it is time for everyone to turn their attention back to the larger group as a whole. In the real world, people can break off into smaller groups or dyads, blocking out the conversation and noise around them from the larger group and attending only to the smaller group or dyad they wish to speak to. They are able to do this because our sensory apparatus allows us to "tune in" to one conversation while blocking out others. Also in the real world, people are able to approach a smaller subgroup of people at a conference or party and ask if they can join in the conversation. The improvement in the present invention allows people interacting in a large group to break off into subgroups or dyads to converse. When people select to break off into a smaller group, the subgroup only "hears" what is being communicated within that subgroup. It is possible for someone outside of a specific subgroup to be allowed to join into the conversation if requested. It is also possible within the improved system for anyone within the larger group to make an announcement that can be "heard" by everyone, including those people conversing in subgroups. For example, a member of the larger group may announce that it is time to come to order and return attention to the lecturer at the podium. This is a significant improvement because it allows greater flexibility and authenticity to computerized group interaction using the system of the present invention.

A third major area of improvement is in the apparatus for selecting different types of communication in the system. Specifically, in the improved system, if a member of a virtual group starts typing but does not click on a specific target of the intended message, a text box will appear near the member's place box and the written message will be visible to all. This allows for the situation in which a person may want to make a remark or comment but is not sure whom the intended recipient of the remark is. Also, if a person in a virtual group begins speaking, the system can be configured to let the voice be heard even if the person has not selected a specific target for the voice communication. This is a significant improvement because sometimes people in real life group situations begin talking even though they have not really selected a specific person as the recipient of what they are saying. These improvements allow for greater flexibility and authenticity of the system.

A fourth major improvement of the present invention for improving group interaction involves providing a means to display in a textual format all of the communications flows occurring between members of a virtual group in addition to a graphical display format. This is a significant improvement in the present invention because it allows for the communications flows between members of a virtual group to be depicted in a more compact area on the computer screen, which is especially helpful when group members are engaged in another group activity (like viewing presentation materials or playing a board game) and computer screen space is at a premium.

In summary, the present invention with improvements provides a unique and useful system of group interaction over computer networks in several ways. The system provides (1) the capacity for group participants to choose to engage in one of the same or a different type of communication (including whispered or normal voice, open or hidden written messages or iconic expressions) simultaneously in real time; (2) the capacity to subgroup into a smaller group or dyad within a larger group while being able to rejoin the larger group when desired; (3) the capacity for group participants to choose to indicate (if desired) who the target of each communication is intended to be; and (4) the capacity for "communication flows" occurring in the group to be displayed either graphically or textually by the system for all participants to see.

II: Problems with Providing Computerized Group Interaction In Combination with Group Activities Over Computer Networks; Discussion of the Prior Art; and Disclosure of Improvements in Addressing These Problems Problems with Existing Systems of Computerized Group Interaction Combined with Group Activity:

The major problem with currently available computerized systems of group interaction is that they do not provide the capacity to engage in a group activity (e.g. view presentation materials together) while at the same time observing the participants interacting in the ongoing group. This is a problem because most real-life work groups, academic groups, and support groups have content materials that are presented and discussed during meetings of the group. Another problem with these systems is that they make no provision for taking notes or "minutes" while participating in the meeting. This is a serious limitation, as in real-life meetings someone is usually asked to take notes during meetings and then is required to type them out for later dissemination or record keeping. The ability to take notes is also important for students in a classroom setting, or people attending professional education seminars.

Another problem is that current systems do not provide a satisfactory method for creating and delivering structured group programs over computer networks. Structured programs in real-life provide a common focus, method and setting for teaching everything from job skills to the "History of Modern Civilization". Academic courses, business skills training manuals, self-improvement books, "how to" manuals of any kind, business meetings, bridge clubs, chat rooms, behavior therapy groups and community organizations can all be viewed as providing structured programming. Most structured programs have a common focus, purpose or goal; a method or procedure for accomplishing that purpose; and a setting (time and place) for working through the program. In structured group programs, the participants go through at least some of the steps of the program in a group setting. Most structured programs require the use of specially prepared materials like workbooks, lecture notes written on blackboards, texts, video presentations, and other printed materials. Many programs also utilize special teaching techniques (like lectures, role-playing, live demonstrations and/or special exercises for practice). Many programs require that participants take notes, fill out various forms, turn in homework or work products, and take tests or other assessments. There are no existing systems of computerized group interaction that provide a means to engage in all of these processes for working through a structured group program over computer networks.

Discussion of Prior Art Related to Providing Computerized Group Interaction in Combination with Group Activities:

The above-described limitations of existing systems of computerized group interaction combined with group activities are clearly evident in the patents cited during the examination of the present patent application. In the Kato system, co-workers meeting in a computerized "Refresh Room" can communicate using one of three tools: a voice tool, text tool or multi-user game tool. In the Kato system, the users interacting together have only one display before them and can only use one tool at a time. At no time is the user able to view the ongoing interactions between co-workers at a table in the Refresh Room at the same time that they are viewing presentation materials together.

U.S. Pat. No. 6,151,621, issued on Nov. 21, 2000, to Adrian Mark Colyer, Andrew Key and Vince Sethi ("the Colyer system"), discloses a system in which a set of users can access a chalkboard or shared document program together. However, the Colyer system cannot allow the users operating the shared document program to engage in ongoing communication at the same time, as is possible in the present invention. The Colyer system allows for communication by email between members of a group. However, users are not able to send emails while they are at the same time participating in an ongoing discussion and viewing presentation materials together.

U.S. Pat. No. 5,796,393, issued on Aug. 18, 1998, to Bruce A. MacNaughton and Leigh R. Turner, discloses a system in which a group of people with similar interests can view a specific website together (a group activity). However, this group of people cannot engage in a conversation together about the website they are viewing, as would be possible in the system of the present invention.

How Present Invention Addresses Problems with Computerized Group Interaction in Combination with Group Activities:

The present invention addresses all of the problems outlined above in providing group interaction in combination with group activities over computer networks as well as the limitations of the prior art. Specifically, the system allows people to engage in group activities at the same time that they can continue to engage in communications with other group members and continue to "see" all of the interactions in the group. These activities can include accessing and sharing files/documents/workbooks; completing assessment measures, working on shared documents; visiting internet sites together; showing slide presentations; playing computerized games, etc. The system of the present invention allows these group activities to be accessed via a website that combines all of the necessary components for the successful operation of a large-scale group services delivery system which addresses all of the identified problems of computerized group interaction discussed above. The system of the present invention also provides an effective way to work through structured group programs in a virtual environment.

Major Improvement in This Continuation in Part Related to Computerized Group Interaction Combined with Group Activities:

A major improvement in the present invention disclosed in this continuation in part is a method for creating structured group programs that can then be distributed for use over multiple computer systems in compact disk format. The essential components of the structured group program of the present invention include the following: 1) the means for accessing and delivering content materials specific to the subject of the structured program; 2) a setting where presentation of the content materials can be viewed together by the group participating in the specific program; 3) the means to discuss and practice the skills presented in the program while viewing the presentation materials together; and 4) the means to assess progress or learning of the skills/content materials throughout the ongoing group. Once a new structured group program is created, the program can be distributed via compact disk where it can be played on multiple computer systems and venues providing for uniform use of the program.

One object of the present invention is to provide an Internet site offering a specific structured group program focused on reaching personal goals to the general public via a host Internet site. To overcome all of the previously outlined problems with computerized group communication, such a program would have to be offered in conjunction with the system of computerized group communication embodied in this invention in order to be effective.

There are many limitations associated with the kinds of groups that are offered to the general public both in the "real world" and on the Internet. One main limitation is that there is no group program, either in the real world or on the Internet, that is focused specifically on helping the general population get support for reaching their personal goals. There are many groups that focus on people who have serious emotional problems or addictions. But many people are averse to participating in those types of groups because of the stigma attached or because they feel they do not "fit" into that type of group. Many others do not view themselves as "emotionally disturbed" or needing "therapy" and therefore do not wish to get involved in the kinds of groups that are available in the community or on the Internet. Still others do not have the finances to go to professional group therapy sessions, nor the time or the transportation to commit to community support groups. But the fact remains that most people could benefit greatly from participating in community support groups focused on helping people reach their personal goals.

There are many reasons why focusing on one's personal goals is important. Psychological research has found that working toward goals has a positive effect on health, self-esteem, and psychological well-being. Probably every person from every ethnic group and age group has some goal he/she would like to accomplish. Some people may not know what they want to accomplish; others may want to accomplish unrealistic feats. Some people may not know how to go about attaining their goals, while others know exactly what they need to do, but cannot bring themselves to take action. Still other people have a solid understanding of what they would like to accomplish, but are unable to locate the resources needed to actualize their goals. Probably everyone has been in each of these places at different points in their lives. Struggling to accomplish one's goals is clearly a universal experience both for relatively "healthy" people as well as for people who suffer from emotional problems or addictive behaviors. But there is currently no place where people can meet together to get and give the support that is needed to help each other reach their personal goals.

What is needed is a structure for providing goal attainment supporters ("GAS") groups over the Internet and throughout our communities, much like Alcoholics Anonymous or the like. Workbooks, group process guidelines and special tools for attaining personal goals developed for use by groups on the Internet could also be made available for use in real-life groups in the community. People could choose whether they wanted to attend "real-life" or Internet-based "GAS Anonymous" style groups or whether they wanted to attend goal attainment supporters groups led by professional counselors or coaches over the Internet or face-to-face group meetings in their communities. People could also combine participation in goal attainment supporters groups with other intervention strategies or therapies as desired.

Another Major Improvement in this Continuation in Part Related to Providing Group Interaction in Combination with Group Activities:

Another major improvement in the present invention is a method for providing real-life group interaction while playing a card game or board game using the system. The original patent application did allow for a game to be played in the simultaneous access window while participants continued to observe each other communicating in the interaction matrix of the present system. The improvement in this continuation in part is a specific computerized game player system that allows computerized games to be played in a much more enjoyable and satisfying way than previously possible. The improved game player system will play games in one of three formats: 1) standard format (game is played in simultaneous access window of the system while people communicate in the interaction matrix); 2) double-decker game player format that allows the communication flows of the game players to be exhibited in an upper level interaction matrix while each player's moves on the card or board game are visible on a lower level; and 3) integrated format where the place boxes of each player surround a game board or card table and game players can talk and play a game simultaneously much like would occur when playing a card or board game in real life. Game CD's can be specially developed for playing on the computerized game player system of the present invention. There are already games available for playing over computers—like video games and card games and board games (e.g. chess or SCRABBLE). But they do not allow participants to continue talking while playing the game as people do in "real-life" game playing situations. The game player system of the present invention with improvements provides several options for enjoying computerized card games or board games in an authentic and satisfying way not otherwise available.

Section III. Problems with Computerized Group Environments; Discussion of the Prior Art; and Disclosure of Improvements in System of the Present Invention:

Problems with Existing Systems of Computerized Group Interaction, Group Activity & Virtual Group Environments for Business:

Recent increases in the productivity of American workers have been attributed to a focus on teamwork. The emphasis on improving communication between teams of designers, production workers, marketing staff, suppliers, and customers has led to an increased necessity for meetings. The greater frequency of meetings involving more and more people has led to higher travel and office space costs (to allow for conference rooms), as well as decreased productivity of some workers. Who hasn't heard employees (and even managers) complain that all they do all day long is go to meetings, so they never get any work done during normal business hours? In addition to increasing necessity for meeting space, virtually all businesses, agencies, and organizations have the need at one time or another to present a structured set of materials to their employees or clients in the form of training manuals, workbooks or structured group programs. Sometimes special seminar presenters are involved in presenting structured materials in a lecture or seminar format, but usually some written materials are disseminated as well.

Many businesses and individuals would like to be able to attend meetings, seminars, get-togethers, and classes via their computers. If better methods for holding meetings over computer networks existed, businesses would reap big rewards. Virtual meeting spaces would allow users to stay at their workstations when attending meetings, thereby saving time, travel costs, and office expenses. Attending meetings while remaining at their workstations (or from a job site) would also improve worker productivity and company efficiency, as phones would not have to be left unanswered and employees would not be left without supervisory presence while managers attended meetings. In addition, persons who have to attend consecutive meetings in disparate locations would be able to attend both meetings without a problem.

While there are sites for groups to meet over the Internet (e.g., e-groups.com and voice chat systems), these sites suffer from many of the limitations of computerized group interaction systems outlined in previous sections. Specifically, these systems do not allow users to "see" the participants with whom they are interacting or to share on-line program materials with them. While some team-ware and virtual office systems are available for use over computerized networks, these systems also suffer from many of the limitations of computerized group interaction outlined above. Existing web-conferencing systems can provide an enhanced way for some meetings to occur electronically, but they do not allow for sharing documents while at the same time viewing all of the participants as they are engaged in discussion during the meeting, as does the present invention.

Other problems with existing computerized virtual office systems include the following. Currently available systems of electronic group interaction do not allow people outside of the participants interacting in a virtual room to observe the meeting. The ability to broadcast a work team meeting or a staff meeting to many other employees who were unable to attend would be very useful. A feature that allowed for observation by outsiders would also be extremely useful when teaching group dynamics and running structured group programs because people learn a lot via "observational learning" and because space may not always be available for the numbers of people who want to participate in a given virtual group. Another problem is that it is not possible to reserve a meeting room for on-going work on a large project that requires intermittent attention from different participants over an extended period of time. For example, in real-life, a certain meeting room could be reserved for a large project where different employees would come and go as time permitted throughout the week to continue work on the project.

Another problem with currently available systems is that they do not allow for a new person to join a closed membership meeting that is already in progress (at the discretion of the "gatekeeper") as often happens in real-life situations. For example, a manager from another office making an unexpected visit may be invited to join an on-going management meeting to discuss a specific project, and then leave when that discussion is completed. Nor do these systems allow people to move around the virtual environment or to choose which equipment they want to have in different virtual meeting rooms. A final problem with currently available virtual office systems is that the external sources of communication (including telephone, intercom, office "door", and email access) are not integrated with the ongoing interaction and activity of the group.

Discussion of Prior Art Related to Providing Computerized Group Interaction, Activities & Environments:

The above-described limitations of existing systems for providing computerized virtual environments are clearly evident in the Kato et al. patent cited during the examination of the original application for the present invention. The Kato et al. model describes a Refresh Room where workers can take a rest while interacting with others. Workers are able to "sit" around a table and talk. But the Kato system is very limited in the kinds of environments it provides (e.g., there is no choice of different types of equipment such as video projectors, karaoke machines, chalkboards, etc.). Neither can the participants engage in a discussion at the table provided while at the same time viewing presentation materials together.

In the Kato system, it is possible to show all the connected computers within a system, indicating which meeting rooms are occupied or not. However, there is no way in the Kato system to view a floor plan of all of the meeting rooms (as if one was looking into each room through the window of the door of the room), as is possible in the virtual office system of the present invention.

How the Present Invention Addresses Problems with Providing Virtual Environments:

The virtual meeting system of the present invention addresses all of the problems with virtual environments outlined above, especially those related to the Kato virtual office system. Participants in a business meeting using the system of the present invention can view all of the meeting participants as if they were sitting around a big conference table. They can participate in the ongoing discussion while they are at the same time watching a slide presentation or reviewing a shared document. Participants can also access personal or web documents and transfer them to the simultaneous activity block window on the virtual meeting room viewing screen for all to see. Participants can take notes on what is happening in the meeting as they continue to participate in the discussion and view any materials being presented. And finally, participants can interact with others outside the meeting room through email and telephone connections as well as through operation of the meeting room "door" (through which people can enter and exit the meeting room) while continuing to participate in the ongoing meeting.

In addition to creating the perfect high-tech environment for business meetings, the system of the present invention can also provide the ideal setting for an on-line classroom. Students can "sit" together, sharing reactions, exchanging notes, and asking questions (by voice or text) while a lecturer uses a chalkboard to assist in her explanation of the didactic material. Group counseling sessions using the system enable the counselor or leader to take participants through structured group training programs (e.g. assertiveness training, substance abuse treatment programs, parenting skills development) using the same specialized methods as are available in real-life counseling groups. The group participants and counselor can exchange written assessment materials throughout the group session while they continue to interact in the discussion and view the entire group process while it unfolds before them. Finally, private meeting rooms and chat rooms using the system can provide a unique environment for individuals to socialize with friends and family. They can spend time talking together while they are at the same time watching a movie, listening to music, putting a puzzle together, playing a computerized board game, or arranging family photos into an album.

Major Improvement in this Continuation in Part Related to Providing Virtual Group Environments:

The main improvement in the area of providing virtual group environments is a virtual environment builder and operations system that combines the ability to choose a basic floor plan (e.g. office suites, home, trade show or conference layout); the ability to select type of furniture and equipment for each room in the created virtual environment (e.g., shared document software, slide presentation, movie, chalkboard, video game, television program, Internet sites; tables and couches and booths); the capacity to set up "interaction hot spots" where desired (e.g. places that would create their own subgroup of people who could communicate via an interaction matrix); and the capacity for participants to move around the created virtual environment and choose to interact with others they come into contact with or to go from one interaction hot spot to another, or to create different subgroups of people. This unique improvement to the system of the present invention would allow a person to have a virtual "house party" and have different activities set up in different rooms, and the guests could wander about the house interacting with different subgroups of people and participating in different activities as desired. This feature would also allow for a business organization to put on a trade show consisting of different booths where visitors could stroll from booth to booth, asking the person in each booth questions about the product and viewing selected presentation materials together. Finally, this feature could allow an organization to hold a duplicate bridge tournament providing separate rooms for each group of players to play (and converse) as allowed.

SUMMARY OF THE INVENTION

According to a first aspect of the invention a server is provided for communicating content between a group of networked client computers over a communications medium and displaying communications flows identifying a content originator and a content receiver. The server includes a memory, a processor storing and retrieving instructions from the memory, and a network interface operably connecting the processor to the communications medium. A communications module receives content from an originating computer and transmits the content to at least one target computer connected to the specific group. Also provided is a graphical communication flow module integrated with the communications module and providing to each of the client computers one of a graphical or textual representation of the group of networked computers, the graphical communication flow module graphically (or textually) depicting communication flows showing the originating and target computer(s) corresponding to each content transmission by the communications interface.

According to one aspect of the invention, the communications module transmits content selected from the group including voice, video and text.

According to another aspect of the invention, a voice communications monitor having a plurality of voice communication flags is provided, with one flag corresponding to each client computer, and only one flag being active at any given time. The communications module verifies a status of the plurality of voice communication flags in response to a voice content transmission request for a given client computer, and activates the corresponding voice communication flag if none of the voice communication flags is active, the communications interface processing voice content transmission requests only from a client computer whose corresponding voice communication flag is active.

According to another aspect of the invention, a communications subgrouping module is provided which allows a selected subset of networked computer users connected to a specific virtual group to break off into a smaller group or dyad for purposes of interacting via the communications system of the present invention. While interacting in the smaller group or dyad, the graphical communications flow module displays the communication flows occurring within the subgroup to those computer users in the subgroup or dyad only and not to the computer users connected to the larger virtual group. An announcement capacity is provided which allows any computer user connected to the larger virtual group to make an announcement that can be sent to all the computer users connected to the virtual group, including those computer users who have broken off into subgroups or dyads. The computer subgrouping module provides the capacity for subgrouped computer users to rejoin the larger group when desired.

According to another aspect of the invention, a virtual office system is disclosed including a server computer having a nonvolatile storage medium, a plurality of client computers connected to the server computer via a communications medium. A graphical interface displays data to the client computers, and a virtual floor plan is stored on the nonvolatile storage medium and defines a plurality of virtual offices. The virtual floor plan is displayed to the client computers by the graphical interface. A scheduler is provided which stores scheduling information on the nonvolatile storage medium. The scheduling information is used for scheduling the plurality of virtual offices, and includes a directory identifying a time, meeting identification information, and virtual office information uniquely identifying a given virtual office. The scheduling information is displayed to the client computers by the graphical interface. A communications interface transmits content from an originating client computer to at least one destination client computer, a graphical communication flow module graphically depicting to each client computer a representation of each of the participants of the meeting, the graphical communication flow module graphically (or textually) depicting communication flows to all of the client computers connected to a virtual group showing the originating and destination client of content transmitted by the communications interface.

According to yet another aspect of the invention, a method is disclosed for conducting on-line training using a server connected to a plurality of client computers. The method includes a step of providing a virtual meeting room on the server computer which is accessible to the client computers, graphically depicting a representation of the virtual meeting room and each of the client computer users accessing the virtual meeting room, communicating content from an originating client computer to at least one target client computer using a messaging interface, graphically (or textually) depicting to each of the client computers a communications flow showing the originating and target client computer(s) of content transmitted by the messaging interface; and providing a simultaneous access window for displaying presentation materials to each of the client computers accessing the virtual room. The above-described method is used to facilitate a structured discussion using the messaging system and the presentation materials displayed in the simultaneous access window.

According to yet another aspect of the invention, a system is disclosed for delivering a structured group program using a server connected to a plurality of client computers. The method includes a step of creating a structured program consisting of content presentation materials, discussion exercises and assessment instruments, and providing a virtual meeting room to play the structured program on the server computer which is accessible to the client computer users, graphically depicting a representation of the virtual meeting room and each of the client computer users accessing the virtual meeting room, communicating content from an originating client computer to at least one target client computer using a messaging interface, graphically (or textually) depicting to each of the client computers a communications flow showing the originating and target client computer(s) of content transmitted by the messaging interface; and providing a simultaneous access window for displaying presentation materials to each of the client computers accessing the virtual room. The above-described method is used to facilitate a structured discussion of the presentation materials using the communications system of the present invention and providing assessment instruments presented in the simultaneous access window to be completed by the computer users connected to the virtual group completing the structured group program. Each uniquely created structured group program can be distributed on compact disk for use on multiple computer systems and venues.

According to another aspect of the invention, a system is disclosed for playing one of a computerized board game or card game while simultaneously engaging in social conversation using a server connected to a plurality of client computers. The method includes a step of providing a virtual meeting room on the server computer which is accessible to the client computers connected to the virtual meeting room, graphically depicting a representation of the meeting room and each of the client computer users accessing the virtual meeting room, communicating content from an originating client computer to at least one target client computer using a messaging interface, graphically (or textually) depicting to each of the client computers a communications flow showing the originating and target client computer(s) of content transmitted by the messaging interface; and playing one of a board game or card game via the simultaneous game player window. The above-described method is used to provide a simultaneous game player window for computer users connected to a virtual meeting room to play a board game or a card game together while simultaneously engaging in social interaction using the communications system of the present invention.

According to another aspect of the invention, a system is disclosed for building a virtual social environment using a server connected to a plurality of client computers. The method includes a step of using a catalogue of building components to build at least one virtual meeting room consisting of interaction areas and simultaneous access windows with presentation delivery equipment; and then a step of making the social environment accessible to the client computers connected to the virtual meeting room(s), graphically depicting a representation of the meeting room(s) and each of the client computer users accessing the virtual meeting room(s), communicating content from an originating client computer to at least one target client computer using a messaging interface, graphically (or textually) depicting to each of the client computers a communications flow showing the originating and target client computer(s) of content transmitted by the messaging interface, and allowing the computer users to move about the virtual social environment as desired.

A further aspect of the invention relates to an Internet web site residing on a host and providing a structured communications environment for a plurality of client computers. The Internet web site includes a graphical interface displaying a plurality of virtual meeting rooms, a given virtual meeting room simultaneously accessible to selected ones of the client computers, and a communications interface receiving content from an originating client computer and displaying the content to at least one destination client computer connected to the virtual group. The graphical interface displays within each virtual meeting room a representation of the client computers accessing the corresponding virtual meeting room, and graphically depicts communication flows showing the originating and destination client computer(s) corresponding to each content transmission by the communication interface. The meeting rooms can be equipped with a simultaneous access window for showing videos or slide presentations, accessing Internet sites or shared document software, or for playing computerized games while continuing to interact via the communications medium.

Yet another aspect of the invention relates to a memory medium storing software for a communications system, including a graphical interface for displaying a plurality of virtual meeting rooms, a given virtual meeting room being simultaneously accessible to selected ones of the client computers. The software further includes a communications interface for receiving content from an originating client computer and displaying the content to at least one destination client computer. The graphical interface displays within each virtual meeting room a representation of the client computers accessing the corresponding virtual meeting room, and graphically or textually depicts communication flows showing the originating and destination client computer(s) corresponding to each content transmission by the communications interface. The software further includes a virtual social environment builder interface which provides one or more virtual meeting rooms equipped with simultaneous access windows, equipment for presentation material delivery, interaction areas for operation of the communications interface, and a personal movement interface which allows computer users connected to the virtual social environment to move about the space.

These and other aspects of the invention are described below in the detailed description of the preferred embodiments.

BRIEF DESCRIPTION OF THE DRAWINGS

FIG. 13 is a screen print showing sample drop-boxes used to access the different types of files/programs in the system.

FIG. 16C is an example of the Leader's Professional Report of the Post-Group Assessment Questionnaire.

FIG. 22 is a chart showing examples of how components of the system may be customized.

FIGS. 23A and 23B show sample on-line workbooks according to the present invention.

FIGS. 24A and 24B show sample on-line training materials according to the present invention.

FIGS. 25A-25C show sample screen prints of the scheduler used to schedule meeting rooms and on-line training sessions.

FIGS. 27A and 27B show sample screen prints of a group using a chalkboard during a group meeting.

FIGS. 29A and 29B shows the text grid format of the interactions depicted in FIGS. 5A and 5B.

FIG. 30B shows the subgrouping process using the text-column display format.

FIG. 30C shows the subgrouping process using the text-grid display format.

FIG. 31 illustrates the double-decker computerized game player system using the graphic display format.

FIG. 32 illustrates the integrated game player system using the text column display.

FIG. 33C shows a screen print of a specific room within the trade show environment depicted in FIG. 33A.

FIG. 34B provides a screen print of a specific room from the house party virtual environment depicted in FIG. 34A.

FIG. 35 shows a screen print of the Structured Group Program Creator/Player list of selected components.

FIG. 36 shows selections from the Run Program Drop-Box 401 (FIG. 4) and outlines the components of each.

Similar reference characters denote corresponding features consistently throughout the attached drawings.

DETAILED DESCRIPTION OF THE PREFERRED EMBODIMENTS

The present invention is an innovative system for enhancing the quality of group interaction, activities and environments over computer networks. The system can be used in the operation of chat rooms, support groups, business meetings, academic classes, counseling groups, training seminars, and other customized consumer and business purposes. The system can be engineered to operate over the Internet, on internal business networks, and on personal computers in the home. The system may comprise a server and client computers, with the server managing the communications module and the graphical communication flow module (as explained below). Alternatively, there may be no separate server computer, and the computers manage the communications module and the graphical communication flow module on a peer-to-peer basis. The computers may be connected through the Internet, or through a private network. The invention may be embodied in a website. The invention may be embodied in software that is stored and made available on tangible media, such as diskettes, CDs or DVDs, or it may be made available for download over a network.

The system is designed to overcome the problems with existing systems of computerized group communication outlined in the background section of this application. In general terms, the system allows for the simultaneous exchange of voice, written, and iconographic messages in real-time; and it allows for viewing and working on structured group programs and shared group activities (i.e., a common document) while continuing to "see" all of the interactions between members of the group.

Figure 1:
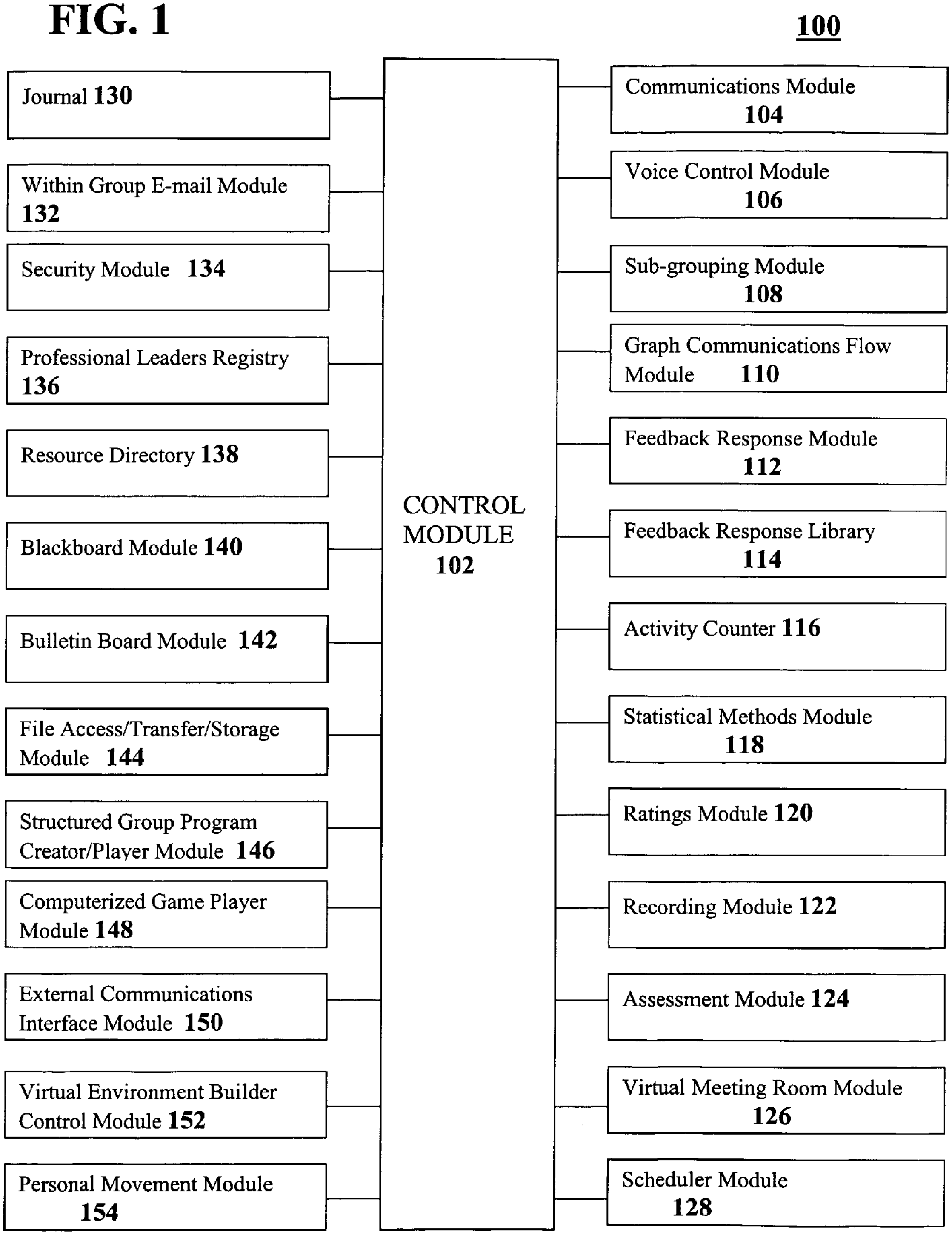
FIG. 1 is a block diagram showing the functional aspects of the software used to implement the group communications system of the present invention.

FIG. 1 is a block diagram showing the functional aspects of the software used to implement the group communications system of the present invention, generally designated 100. The group communications system 100 consists of a control module 102, a communications module 104 (text, voice, video), and a graphical communications flow module 110. Each of the respective functional modules depicted in FIG. 1 will be discussed in detail below.

As explained above, one of the shortcomings of existing Internet groups relates to the difficulties in visualizing the group communications, and in particular a difficulty in determining the target of a particular comment or message.

In contrast, the system 100 enables group members to quickly ascertain who the current speaker is and who the target recipients are. As will be explained below, the graphical communications module 110 provides a graphical representation of each of the participants in a conversation, and graphically depicts the communications flows between the participants. Alternatively, the graphical communications module 110 can provide a text representation of the communication flows between the participants. For the purposes of this patent application, graphical depictions of communication flows are defined to possibly include text communications. The system provides participants with the ability to give and receive ongoing feedback during the group meeting without interrupting the group process.

The communications module 104 supports at least one of text, voice and visual (video) communication, including combinations thereof. The system 100 may optionally include a feedback module 112 and a library 114 that facilitates participants to provide ongoing feedback. The library 114 may contain a variety of feedback expressions including graphical icons (emoticons, text expressions, and sound clips). In use, the user selects a feedback expression from the library 114 using the feedback module 112 and sending it to one or more desired members participating in the group. For example, if Sally is talking, and Mary wants to ask her a question, Mary can indicate this by sending Sally a question mark "?" or the like.

As will further be described below, the feedback module 112 enables group members to give/receive feedback regarding the group process and to express specific reactions to group members. For example, group members may send positive (+), negative (−), or neutral (0) reactions to other group members during the ongoing group meeting.

Moreover, the system 100 provides a way for members to pass notes during the meeting. The notes may be either public notes with content visible to all members of the virtual group or private notes visible only to the intended recipient. Moreover, the system 100 provides a way for members to whisper to one another. The whispered voice message is heard only by the intended recipient and not by the group as a whole.

The feedback module 112 includes an editor for creating customized feedback expressions including graphical icons (emoticons, text expressions, and sound clips). The newly created (custom) feedback expressions may be stored in the library 114 or other storage medium.

Figure 2:
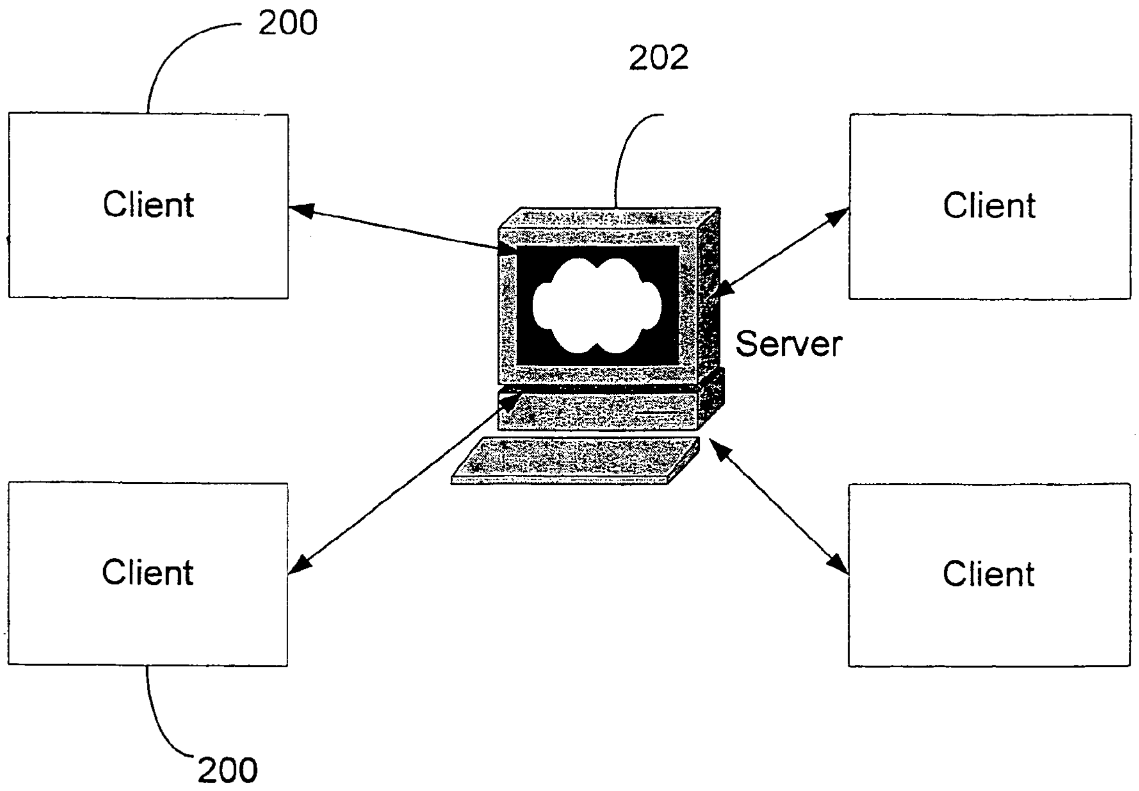
FIG. 2 is a block diagram showing the group communications system of the present invention interface implemented in a client-server model.

FIG. 2 shows the group communications system 100 implemented as a web site or web portal, including plural personal computers 200 that communicate with a server 202 over a communications medium such as the Internet. One of ordinary skill in the art will appreciate that the configuration illustrated in FIG. 2 is applicable to any networked environment, such as a local area or wide area network or the like.

Figure 3A:
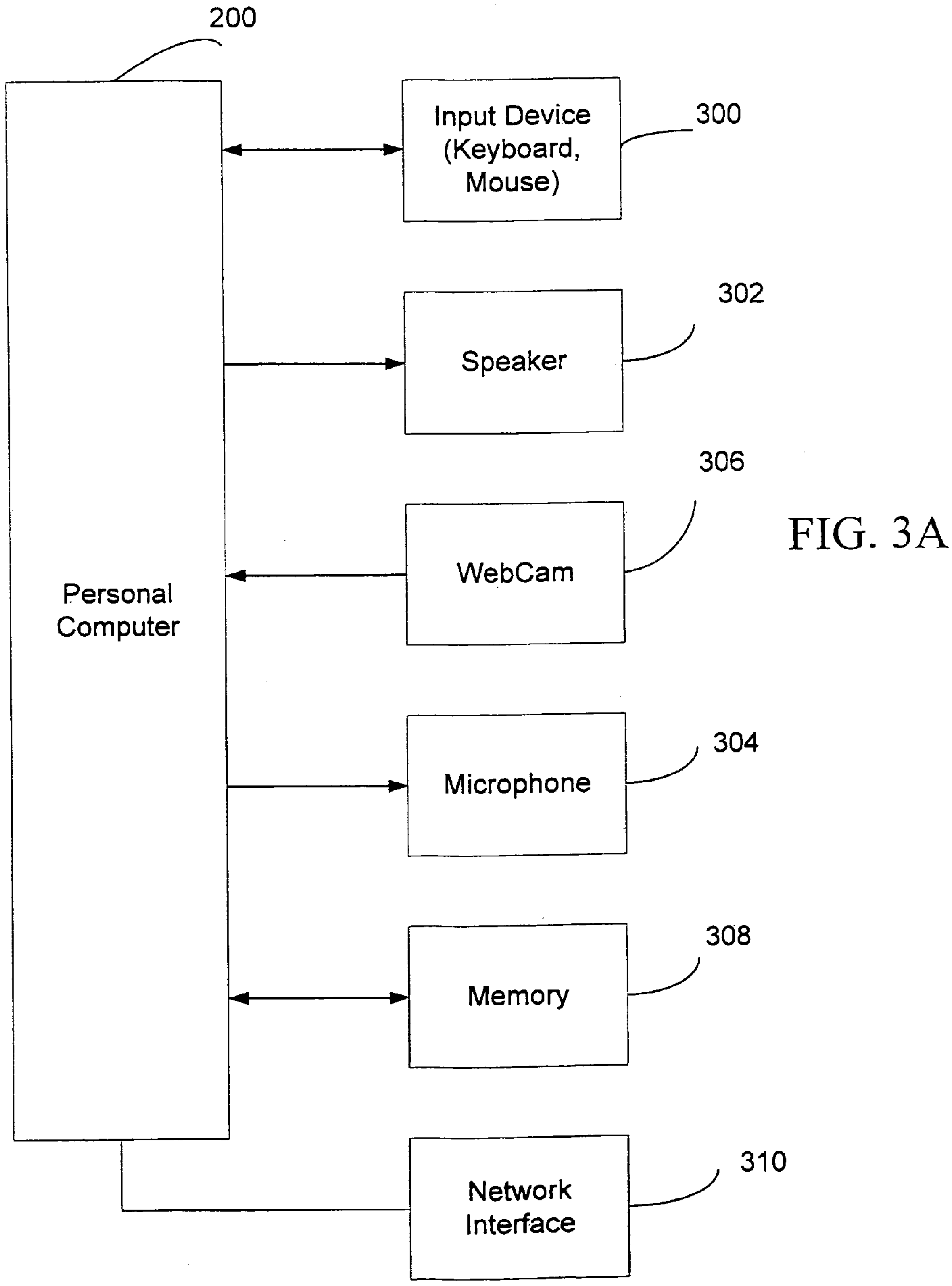
FIGS. 3A and 3B are block diagrams of a personal computer on which the software of FIG. 1 executes.

FIG. 3A is a block diagram providing detail of the personal computer 200 of FIG. 2. Notably, each personal computer (PC) 200 is a conventional personal computer having a processor, a memory and an operating system such as Windows XP by the Microsoft Corporation. The personal computer (client) 200 is provided with a modem 310 or like network interface. The PC 200 is further provided with an input device 300 such as a keyboard, a mouse or the like.

As will be described below, the communications module 104 may optionally support voice communications, in which case the PC 200 is provided with a speaker 302 and a microphone 304.

As will be described below, the communications module 104 may optionally support video communications, in which case the PC200 is provided with a web cam 306 or the like capable of recording and transmitting video. Preferably, the web cam 306 records and transmits video in a compressed format, or the recorded video may be compressed by software executing on the PC 200.

Figure 3B:
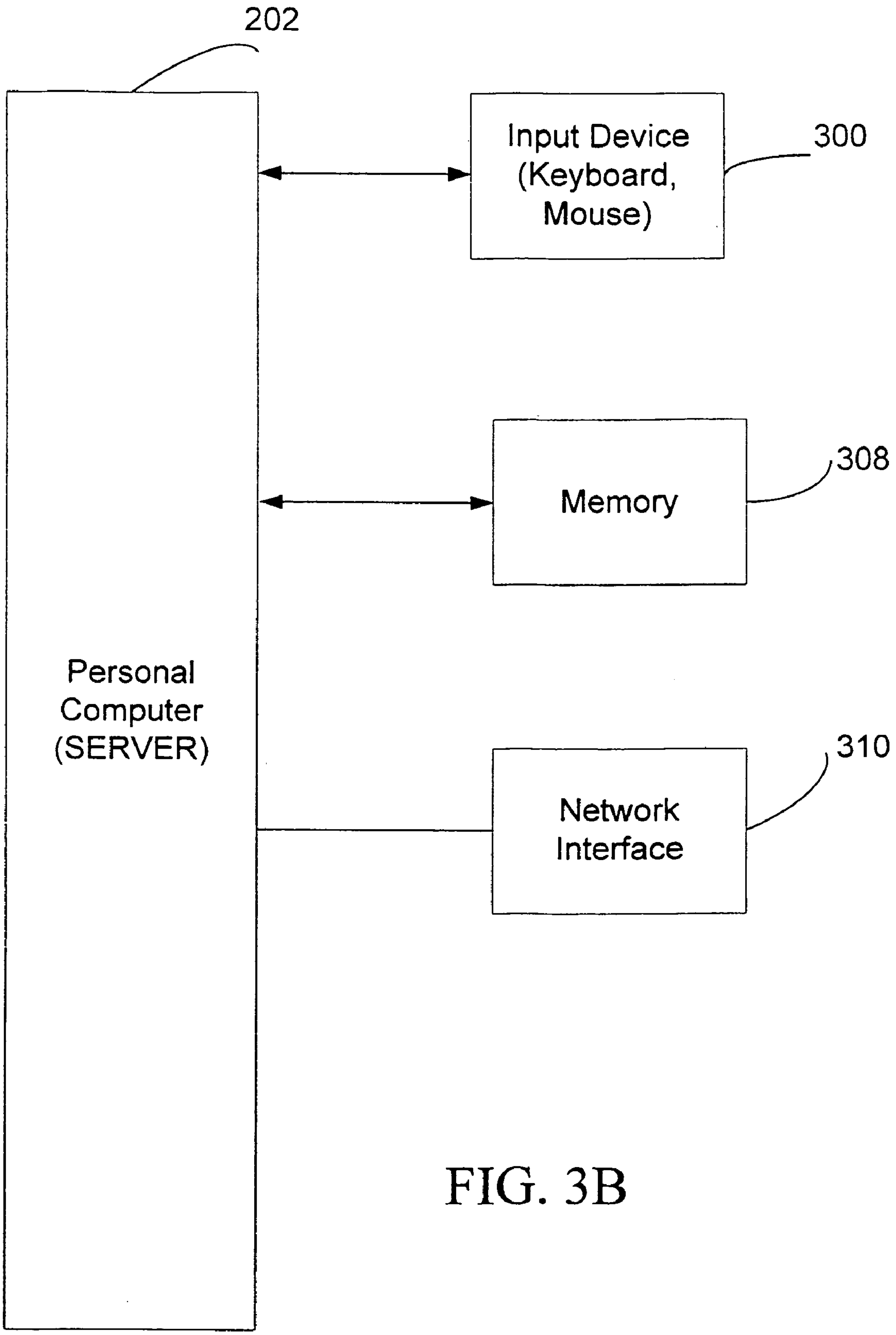

FIG. 3B is a block diagram providing detail of the server computer 202 of FIG. 2. Notably, the server 202 is a conventional personal computer having a processor, a memory and an operating system such as Windows XP by the Microsoft Corporation. The server computer 202 is provided with a modem 310 or like network interface.

The system 100 is specifically designed to enhance the quality of group interaction in four major ways: 1) by providing a visual representation of different types of simultaneous written and voice communications occurring between group members throughout a computer-based meeting; 2) by building continuously-accessible virtual meeting places where group interactions can occur over time; 3) by enabling the group members to access group documents, blackboards, workbooks, and other internet sites while simultaneously engaging in the group discussion; and 4) by creating structured group programs that can be "played" on the system when desired.

The system 100 is compatible with conventional PCs 200 including personal digital assistants ("PDAs") and the like network compatible devices. The system of the present invention makes it possible to deliver computerized group services in a realistic and multifaceted way, overcoming many of the limitations of currently available systems of computerized group interaction, group activities and group environments. The specific design features of the system (with references to the specific problems that they address) are described below.

Figure 4:
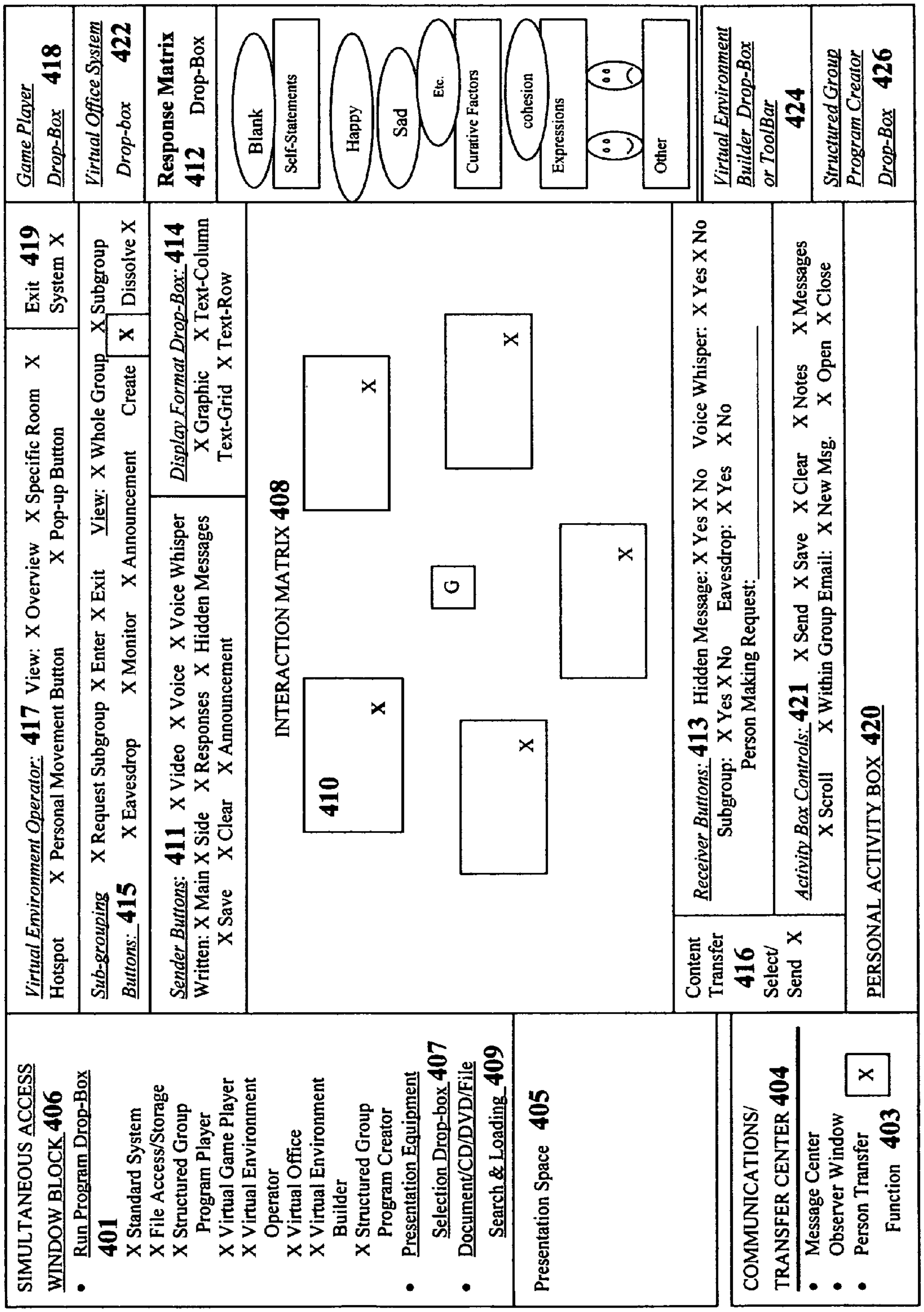
FIG. 4 is a sample screen layout of the group communications system of the present invention.

FIG. 4 is a sample screen layout 400 showing how the system 100 appears to a user during participation in a group meeting. The screen 400 may be logically divided into a group interaction block 402, a communications/transfer control center block 404, and a simultaneous access window block 406.

The system 100 may be operated in a number of different modes, such as an operator mode, a participant mode, or a programmer mode. The operator mode is used by the person whom either "owns" the system space, or whom has the authority as "leader", "Boss" or "Manager" (through password access) to set how the system will operate during any particular group meeting. The Participant Mode is used by all of the group members interacting in a specific group meeting, and the Programmer Mode is used by the individual(s) creating new structured group programs or virtual group meeting spaces for use on the system.

Each of these different modes of operation has access to different files/programs stored in the system. The file access/transfer module 144 (see FIG. 1) of the system provides the means for importing, storing and transporting files for use throughout the system. The participant may enter website wide programs (like open chat-rooms), individual accessed files (like a personal workbook), and shared group-specific programs/files (like shared group documents or slide show presentations). The Leader may enter the general website programs, the special Leader accessed files, the shared group-specific files, and the programming files. The programmer has access to all the modes and all the files when creating new group programs or engineering virtual group meeting spaces using the system. FIG. 13 is a sample screen print showing drop-boxes used to provide access to each of the four types of files/programs in the system. The file access/transfer/storage system can be accessed by clicking on that heading on the Run Program Drop-Box 401 in the simultaneous access window block of the system 406 (FIG. 4).

The Interaction Block: The graphical communications flow module 110 (FIG. 1) controls the interaction block 402, including an interaction matrix 408 used to illustrate the various group communications. The interaction matrix 408 enables members to view the entire group at all times and to observe simultaneous voice, written, and iconographic communications occurring between group members throughout a computer-based meeting in real-time.

In the presently preferred configuration of the interaction matrix 408, each group participant is graphically represented by an identity place box 410 that signifies his/her "seat" in the group. Other configurations will be described in later sections.

The identity place box 410 may have a participant's name on it and/or may include a static photo of the participant or a dynamic video image. The identity place box 410 enables each group member to be identified by all other participants in the group, and importantly, may provide a visual indication of who the current speaker(s) are. The default number of "seats" 410 available in the interaction matrix 408 can be set at a standard number.

To facilitate the group interaction, the Leader can assign a fixed seating arrangement, with each participant occupying the same seat 410 in each meeting. The interaction matrix 408 can be configured to provide an audio alert to a participant to signal a message or communication directed toward that member.

In addition to the respective identity place boxes 410, the interaction matrix 408 further includes a group box indicated by a "G" in FIG. 4, whose purpose will be described in detail below. Further still, the interaction matrix 408 may be provided with on-screen "buttons" 411 used to send different types of messages to other group members, to save and clear sent messages, to form subgroups with other group members, to exit the screen, and to select/send written material from one place to another within the system. This feature is discussed in further detail later in document.

In FIG. 4, the interaction matrix 408 is set in an audiovisual format where each group member appears live via personal web cam 306 in his/her box 410 in the interaction matrix 408.

One of ordinary skill in the art will appreciate that a static image, such as a digitized photograph or the like may be displayed in the box 410 in place of a live video image.

The group participants may communicate in a variety of formats such as Voice Only, Written Only, Audio/Written, Video/Voice, and combinations of these formats. Regardless of the communications media (voice, text or combination thereof) used to communicate, the graphical communications module 100 provides a graphic or text representation of the communication flows, showing the type of communication being exchanged as well as the sender and recipient of each communication.

Each of the blocks (402, 404, 406) of the system 100 may be individually adjusted and/or moved by the user so as to make more room for other blocks. For example, the simultaneous access window 406 can be moved to rest on top of the interaction matrix 408 and communications transfer center 404. This provides the full width of the screen for purposes of working on full-size documents.

Figure 10:
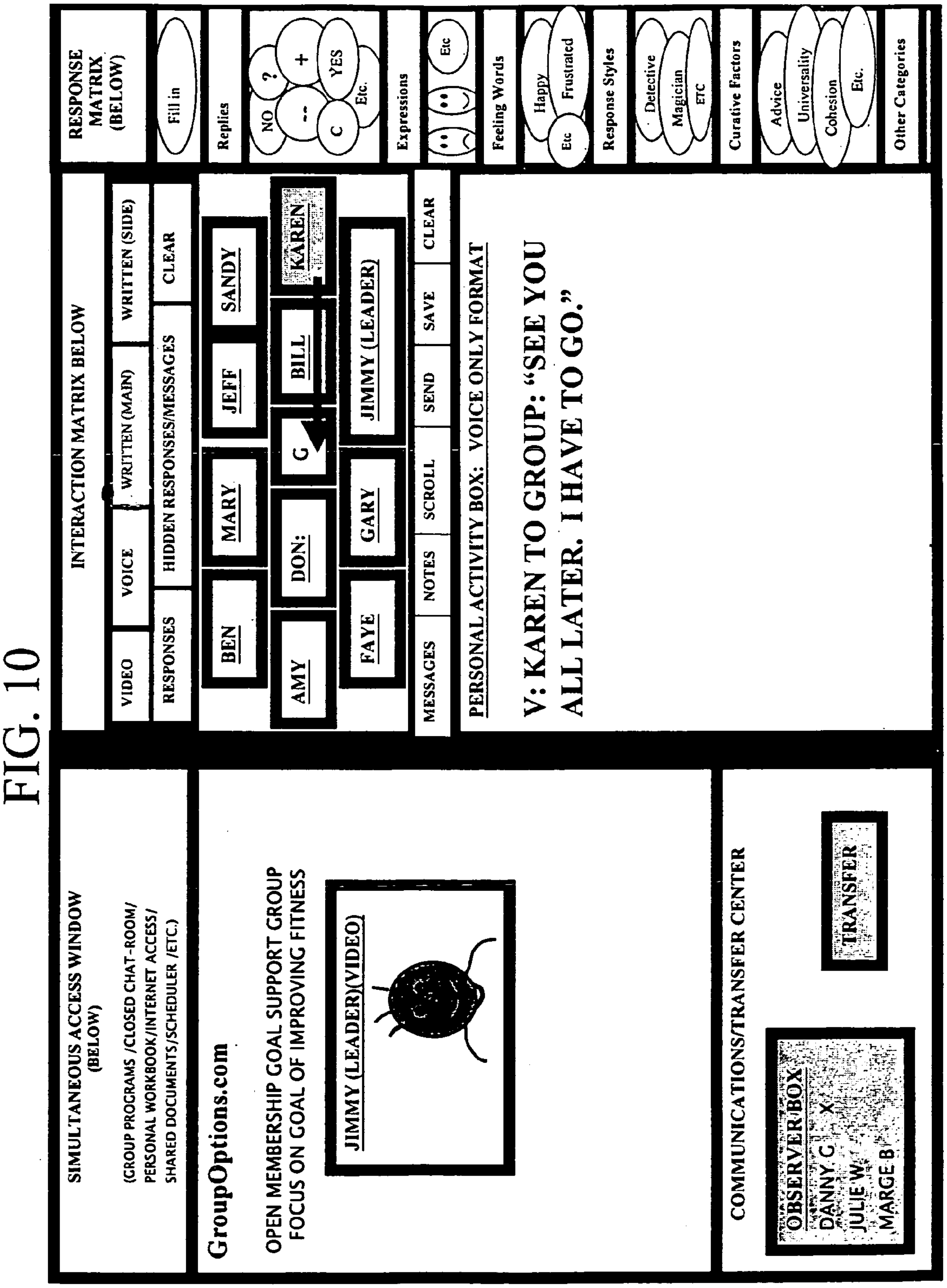
FIGS. 10-12 show alternate layouts of the interaction matrix.
Figure 11:
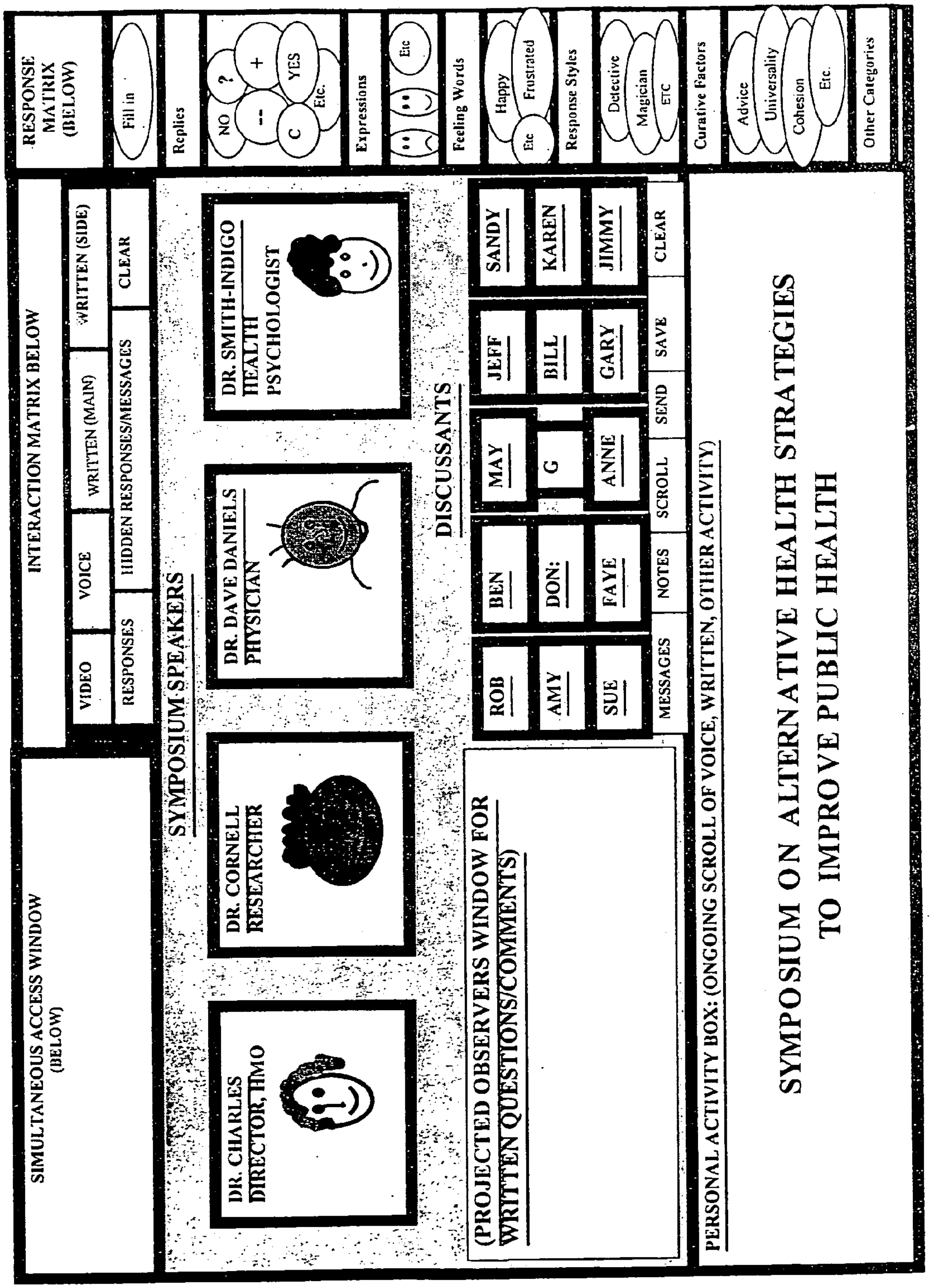
Figure 12:
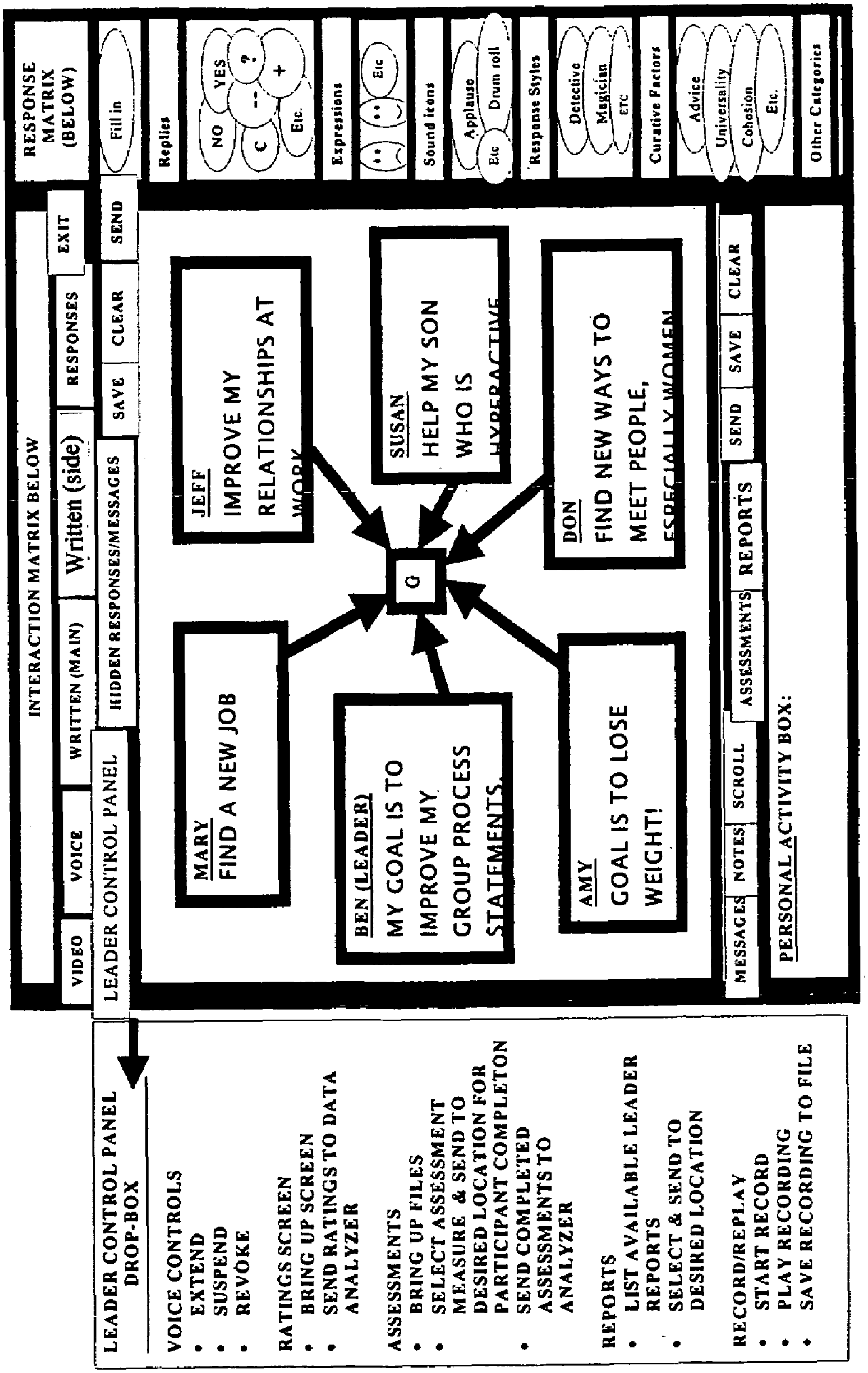

There are also several different configurations of the system: Large Group Configuration (when group size exceeds 10 participants) (FIG. 10); Conference Configuration (FIG. 11); and interaction matrix only configuration (FIG. 12).

Feedback Response Matrix: The interaction block 402 further includes a Feedback Response Matrix 412 which provides a list of icons or emoticons 414-*a* (e.g. facial expressions showing different emotions); sounds 414-*b* (like a drum roll); and pre-defined text 414-*c* arranged under different headings (e.g. "group process terms" or "response styles"); and blank word bubbles, i.e., circular spaces which can be filled in with whatever short message the participant chooses. The various feedback expressions (icons, sounds, text messages) are all stored within library 114 (FIG. 1).

An example of a pre-defined text response 414-*c* is "detective" from the category "response styles". In order to send the selected icon 414-*a*, sound 414-*b*, or pre-defined text 414-*c* response, the participant simply selects an item in the response matrix 412 (using a pointing device such as a mouse) and specifies the recipient 410.

If desired, a member may place an emoticon 414-*a* on his/her own box 410. Thus, for example, a member may place a "happy face" on his box 410 to show the group that he is happy.

Personal Activity Box: Further still, the interaction block 402 includes a personal activity box 420 which enables a user to send and receive hidden written messages to and from other group members, as well as to write and save private notes taken during the meeting. The written messages may be public or hidden messages. Public or open written messages may be main messages or side messages. Participants may also send hidden messages consisting of icons selected from the response matrix 412.

A plurality of on-screen "buttons" 421 may be provided to indicate when a participant has received a hidden message ("Messages"), to allow participant to write notes ("Notes"), and save and send material from the Personal Activity Box 420.

In FIG. 12, the Personal Activity Box 420 may also be used to prompt and display out assessment measures, to receive feedback reports, and to scroll back through interactions as well as take notes and send written messages.

As described above, the Interaction matrix 408 supports voice, written, and iconographic communications (communications module 104 of system 100). Written communications include Main Comments (communications which directly relate to the topic of discussion), Side Comments (communications which indirectly relate to the topic of discussion), and Hidden Messages, each of which is graphically or textually depicted in the interaction matrix 408 (via the graphical communications flow module 110) (FIG. 1). In addition, voice communications can either be delivered so all members can hear the message or "whispered" so only a selected member can hear the message (voice communication control module 106 of system 100—FIG. 1).

Iconographic responses consist of icons, sounds and one-word expressions that are selected from the feedback response matrix 412. These communications are referred to as "Responses" when they are sent from one group member to another in the interaction matrix 408. They are referred to as "Self-Expressions" or "Self-Statements" when they are exhibited in the person's own identity place box 410.

The interaction matrix 408 displays communication flows graphically using a line or the like connecting the sender's identity place box 410 with the receiver's identity place box 410. See FIGS. 5A-5C.

Optionally, an activity counter 116 (FIG. 1) is provided to record the number of times each participant sends or receives each type of message. For example, the activity counter 116 may record the number of response messages sent and received, the number of written or voice messages sent and received, the number of feedback responses sent and received, etc.

With respect to voice communication, the activity counter 116 further measures the amount of group time each member consumes ("air-time"). Notably, the activity counter 116 will record how long a particular participant speaks, as well as how long the participant is spoken to. This type of information provides data for determining the parameters of the Social Relations Model. Specifically, the activity counter 116 will record a participant's Actor Effects (how much she talks), Partner Effects (how much talking she elicits) and any Relationship Effects (how much the participant talks to a specific participant from whom she also elicits a lot of talking).

A statistical methods module 118 (FIG. 1) is optionally provided to process the statistical information collected by the activity counter 116.

Figure 5A:
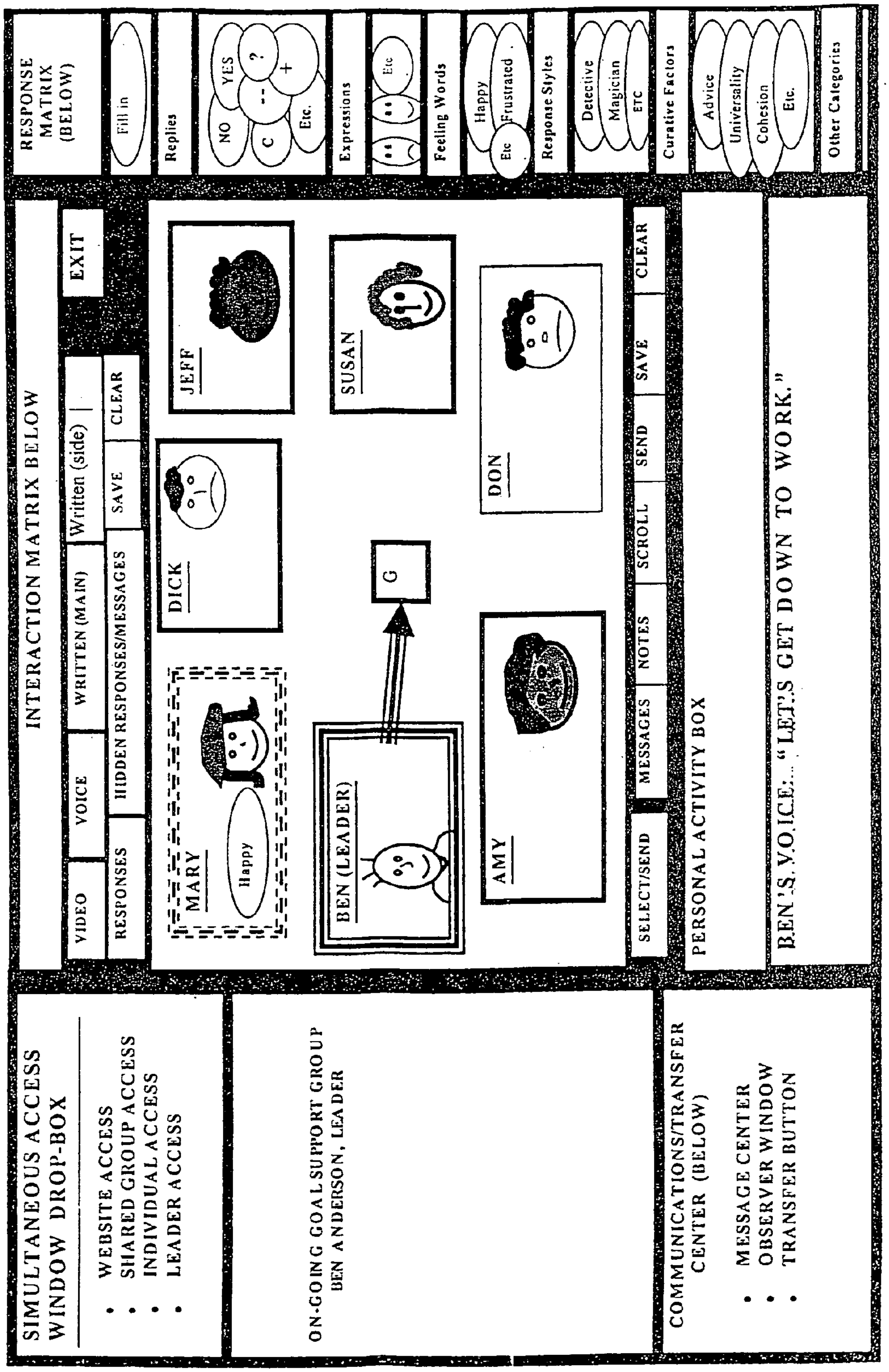
FIGS. 5A-5C are sample screen layouts showing types of interaction that may simultaneously occur in the interaction matrix.
Figure 5B:
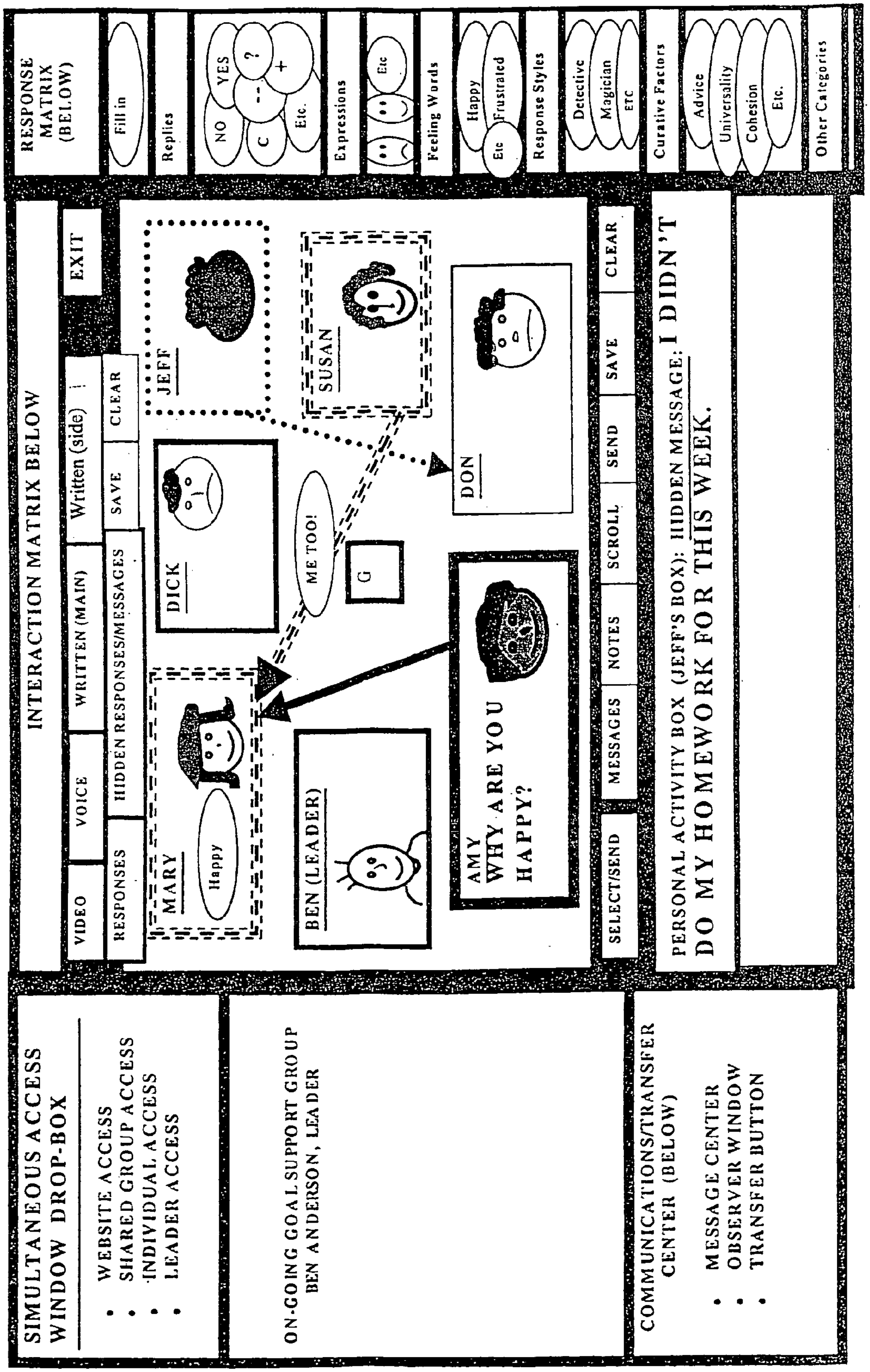
Figure 5C:
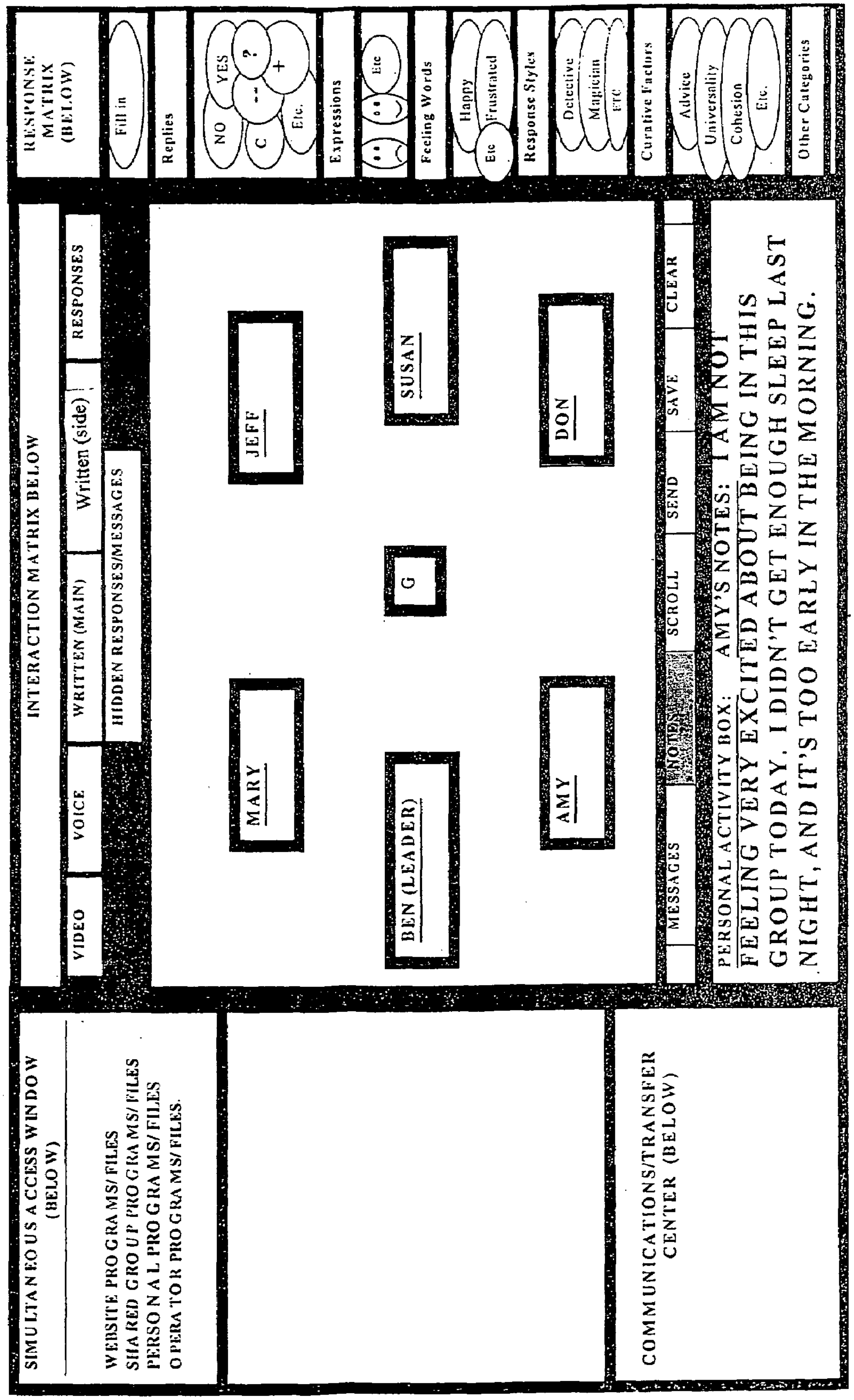

FIGS. 5A-5C show many of the possible types of interactions that may simultaneously occur in the interaction matrix 408 during a computerized group meeting. In FIGS. 5A-5C group members are communicating using voice communications. To facilitate understanding of the group interaction, the text of what the group leader is saying is written in box 522. However, in the actual operation of the interaction matrix 408 in voice mode, the text for voice communications does not appear. It is provided here for explanatory purposes only.

What the "G" means: In FIGS. 5A-5C, group leader 410-*a* is verbally addressing the Group G, as designated by a line from his box to the "G". Each participant may quickly ascertain the current speaker by seeing the coloring or highlighting (not shown in the drawings) of the speaker's box and by the line or arrow drawn from the speaker's box to the "G" signifying the group as a whole as the target of the communication. Alternatively, these communication flows can also be represented in text or text grid formats.

What the different border and arrow types mean in graphic format: As further shown in FIG. 5A, Mary 410-*b* is indicating to the group that she is feeling "Happy", the word "happy" is shown inside her identity place box 410-*b* (along with her video-transmitted live image). In FIG. 5B, Susan 410-*c* is indicating to Mary 410-*b* that she is also feeling happy by the response "Me Too" and the arrow from her box 410-*c* to Mary's box 410-*b*.

In the provided illustrations, voice communications are indicated by triple lined borders around the place box or "seat" 410 of the speaker as well as triple line arrow to show the direction or flow of the communication.

According to a presently preferred embodiment, the arrows indicate communication between members, and are visible to all of the group participants. However, one of ordinary skill in the art will readily appreciate that there are numerous ways to graphically illustrate communication flows. Specifically, all communication flows in the system can be represented in text-column display, text-row display or text-grid display formats. These text display formats are described in detail later in this section.

Main written messages are visible to all of the group members, and are identified in a distinct manner in the interaction matrix 408. For example, in FIG. 5B, Amy 410-*d* is shown sending a main written message to Mary 410-*b*, as indicated by the color of both of the respective place boxes (not illustrated), the solid black line and arrow 416 drawn there between. However, one of ordinary skill in the art will appreciate that there are many ways of graphically illustrating a sender and a receiver of a message.

Side messages (comments) are messages that do not directly relate to the topic or are sent by group members who are not primarily involved in the ongoing discussion in the group. Side comments are distinguished from main messages by the use of a dashed line and arrow for purposes of illustration, and hidden messages are represented by dotted lines in this configuration. See, FIG. 5B. The choice as to whether to send a written main comment or a side written comment is made by the user by clicking on the desired button 411 in the interaction matrix.

Hidden messages are a third type of written message. As the name implies, the content of the hidden message is hidden from the group as a whole and appears only in the intended recipient's Personal Activity Box 420 (FIG. 5B). If desired, the interaction matrix may be configured to display the communication flows of all messages, including hidden ones. Thus, in FIG. 5B, the content of Jeff's 410-*e* hidden message to Don 410-*f* is visible only to Don 410-*f*, but the communication flow (dotted line and arrow) is visible to all members of the group.

Speaking Control: According to the presently preferred embodiment, only one participant may address the group at a time using voice communication. Notably, the voice control module 106 (FIG. 1) providing for each virtual meeting room a plurality of voice communication flags, one flag corresponding to each participant (client computer), with only one flag being active in any virtual group meeting at any given time.

In response to a voice communication request by a participant, the voice module 106 verifies a status of the voice communication flags within a given virtual group meeting. If none of the flags within the virtual room are active, then the voice module 106 activates the corresponding voice communication flag, thereby enabling the participant to transmit voice messages.

To signal a desire to address the group, a participant requests activation of the voice communication flag by selecting a Voice icon (button) 411 (FIG. 4). If the voice communication flag is available, then the voice module 106 activates the corresponding voice communications flag, enabling the requesting participant to address the group using voice communications. When a participant is done talking he/she may relinquish control of the voice communication flag by deselecting the Voice icon 411.

According to a presently preferred embodiment, the voice module 106 automatically resets the voice communication flag a predetermined amount of time after the last communication. Members activate and reset (deactivate) the voice communication flag by clicking on the Voice icon 411. However, if a user fails to de-select the Voice icon 411 when finished speaking, the voice module 106 will automatically reset the voice communication flag after a predetermined time, e.g., 10 seconds, have elapsed without a voice transmission.

Optionally, the group leader may configure the voice module 106 to allocate fixed length speaking slots, wherein the voice communication flag is automatically reset after a predetermined amount of time has expired. Moreover, the leader may extend the amount of time allocated to a participant on-the-fly, by selected a Voice extend icon 411 prior to the expiration of the predetermined amount of time.

Preferably, the interaction matrix includes a timer (not illustrated) that displays to each participant the amount of time remaining for control of the voice communication flag.

Non-speaking participants, i.e., those participants having a non-active voice communication flag, are free to communicate with individual members using text messages (public or private). Notably, the voice communication flag is necessary only when using voice communications, and is not implemented in Written Only, or Video/Written formats. Leader Function of Resetting the Flag: The group leader is given preference in obtaining the voice communication flag, and may regain control of the voice communication flag at any time by revoking the flag from a participant by, for example, selecting a revoke icon 411. Moreover, the leader may suspend a participant's ability to obtain the voice communication flag by, for example, selecting a suspend icon 411 and then selecting the appropriate participant 410. Likewise, the Leader may suspend the group's ability to communicate by selected suspend, and then selecting "G" for group in the interaction matrix 408.

Voice Communications without use of voice communication flags: The voice module 106 may alternatively be implemented without the use of a voice communication flag, in which case, the user initiates speaking by selecting the Voice icon 411 and designating the intended recipient(s) 410. In this mode, group participants would have to rely on their communications skills to limit interrupting and talking over someone else, much as they must do so in "real-world" conversation. Additionally, it is possible to configure the Voice communication so that the participant's voice message is heard whenever he/she speaks into the microphone, even if the Voice icon has not been selected or a specific target of the voice communication has not been selected. In this instance, the graphic or textual representation of this communication would show the participant speaking without indicating a specific target.

How the different types of messages are produced: In order to speak to the group, the leader 410-*a* clicks on Voice button 411 on the interaction matrix 408 and then clicks on the "G" button. The interaction matrix 408 graphically depicts the current speaker (leader 410-*a* in FIG. 5A) by changing the color of the speaker's box 410 (color not illustrated) and through the use of an arrow from the speaker's "seat" to the "G" box in the middle of the interaction matrix 408. Alternatively, the system can be configured to allow voice communication without clicking on the "voice" button. In that instance, the graphical communications module 110 automatically interprets the audio signal and transmits and displays it as such in the interaction matrix. Additionally, if no specific target is selected, then the voice communication is represented by changes in the identity place box of the speaker only.

Whispered voice communications: The communications module of the system 100 provides a way for a group participant to "whisper" a voice message to another group participant. This whispered voice message is heard by the intended recipient only and not by the group as a whole. In order to whisper a voice message, the participant clicks on the voice whisper button 411 and then on the target's identity place box 410. This lights up the voice whisper button on the target's personal activity box (see FIG. 4). If the target desires to hear the whispered voice message, he/she clicks on the lighted voice whisper box. This allows the sender to speak to the target in a way that only the target hears the message. The communication flow (of one participant whispering to another) is represented to all group members in a graphical or textual format, but the group as a whole cannot hear the whispered message.

FIG. 34B provides a demonstration of how whispered voice messages are communicated in the interaction system of the present invention. In this example, Carl has requested to whisper something to Ben. This has caused Ben's whisper button on the Receiver Buttons 413 to light up. Ben clicks on the "yes" to indicate he is willing to receive Carl's message. The content of Carl's message to Ben appears in Ben's personal activity box for purposes of illustration only. Carl whispers to Ben, "Hey, Dee is really hot. Does she have a boyfriend?"

Self-Statements from Feedback Response Matrix: Members are able to provide self-statements by, for example, placing an emoticon 414-*a* on his/her place box 410. Thus, in FIG. 5A Mary 410-*b* indicates that she is feeling "happy" by clicking on the "Happy" word 414-*c* in the feedback response matrix 412 and then clicking on her own "seat". This makes the word "happy" appear in her identity box and colors her box lavender (color not shown in the drawings).

In the present illustration, the self statement is indicated by a hatched border around the participant's box making the statement with the icon from the response matrix 412 appearing in that participant's box. However, one of ordinary skill in the art will appreciate that there are many different ways to graphically illustrate such statements, and the specific illustration is merely provided as an example.

Response Messages from Feedback Response Matrix: Members provide Responses by clicking on the item in the feedback response matrix 412 and then clicking on the box of the selected recipient. Thus, for example, Susan 410-*c* may indicate that she is also feeling happy by clicking on the freeform box 414-*d* (FIG. 4), typing the desired text ("Me Too"), and then clicking on Mary's box 410-*b*. This makes Susan's box 410-*c* a green color (not illustrated) and produces an arrow with the words "Me Too" on it pointing to Mary's box. In the present illustration, responses from the response matrix 412 are indicated by a hatched border around the participant's box 410 and a hatched arrow. Alternatively, the communication flows can be represented in text-column, text-row or text-grid formats.

Side messages: Group members may provide feedback to other members in the form of side messages. The choice as to whether to send a Written (Main) message or a Written (Side) message is made by the participant by clicking on the appropriate button 411 on the interaction matrix 408. The content of side messages are seen by all of the group members. For example, in FIG. 5B Amy 410-*d* sends a side written message to Mary 410-*b* by clicking on the side button 411, typing her message in her Personal Activity Box 420, and then clicking Mary's box 410-*b*. This causes Amy's box to turn gray (not illustrated) and produces the dotted arrow pointing from Amy's box 410-*d* to Mary's box 410-*b*.

Alternatively, the system can be configured so that a text box appears when a participant begins inputting a message via the keyboard 300 without having selected one of the written message buttons 411. In this instance the graphical communication flow module 110 automatically interprets the keyboard signal, and transmits and displays it as such in the interaction matrix. Also, if no specific target is selected for the written message, then the text appears in a text box near the sender's identity place box 410 and no target is represented.

Hidden message: Group members may further send private messages to one another. The text of private messages is visible only to the recipient, but the communication flow between members is visible to all members of the group. For example, in FIG. 5B Jeff 410-*e* sends Don 410-*f* a hidden message by clicking on the "Hidden Message" icon (Button) 411, typing a message in his Personal Activity Box 420, and then clicking on Don's box 410-*f*. This causes red diagonal lines (color not illustrated) to appear in the graphical display format in the sender's "seat" and a red dotted arrow (color not illustrated) flowing from Jeff's seat to Don's seat to appear in the interaction matrix 408, as well as sending the actual hidden message to Don's Personal Activity Box 420. In this illustration, hidden messages are indicated by dotted box border and dotted arrow. This communication flow can also be represented by text or text matrix display formats.

Alternatively, the system can be set so that no visual display appears when hidden messages are sent and received. The procedure for sending hidden messages remains the same in this option. But participants can send hidden messages to each other in this option without the other group members knowing that they are engaging in this private communication. The Leader selects whether or not hidden messages will or will not be displayed in the interaction matrix 408.

Clear & Save Buttons: According to a presently preferred embodiment, the interaction matrix 408 automatically clears the graphical representations of the communications flows after a predetermined amount of time has elapsed. For example, the arrows and color changes in the boxes in the interaction matrix 408 may be programmed to automatically disappear within 10 seconds of completing a given message.

Alternatively, users may manually clear a communications flow by selecting a "clear" button 421, and then clicking on the item the original sender wants to clear. Users may also "save" their messages by selecting the "save" button 421 and clicking on the message the original sender wants to save. Further, the Group Leader may be provided with the ability to clear any group member's message. According to this aspect of the present invention, the Leader's box is enabled to use the "save" and "clear" buttons on any message sent within the interaction matrix 408.

All group members 410 "see" the communication flows (color changes and arrows in the full graphic display format), including the communication flows representing hidden messages. However, depending on the type of message, the content of the message may only be available to the recipient (as in the case of hidden messages and "whispered" voice messages).

Text-Graphic Representations of Communication Flows: According to a presently preferred embodiment, changes in the color and border-type of place boxes (as well as arrows and the like) indicate communication flows between members; and these communication flows are visible to all of the group participants. However, one of ordinary skill in the art will readily appreciate that there are numerous ways to graphically illustrate communication flows. Specifically, all communication flows in the system can be represented in text-column display, text-row display or text-grid display formats by the graphical communications module 110 of the system 100 (FIG. 1) in addition to the full graphic display described previously. The display format for the interaction matrix is indicated in the Display Format Drop-Box 414 (FIG. 4).

Figure 28A:
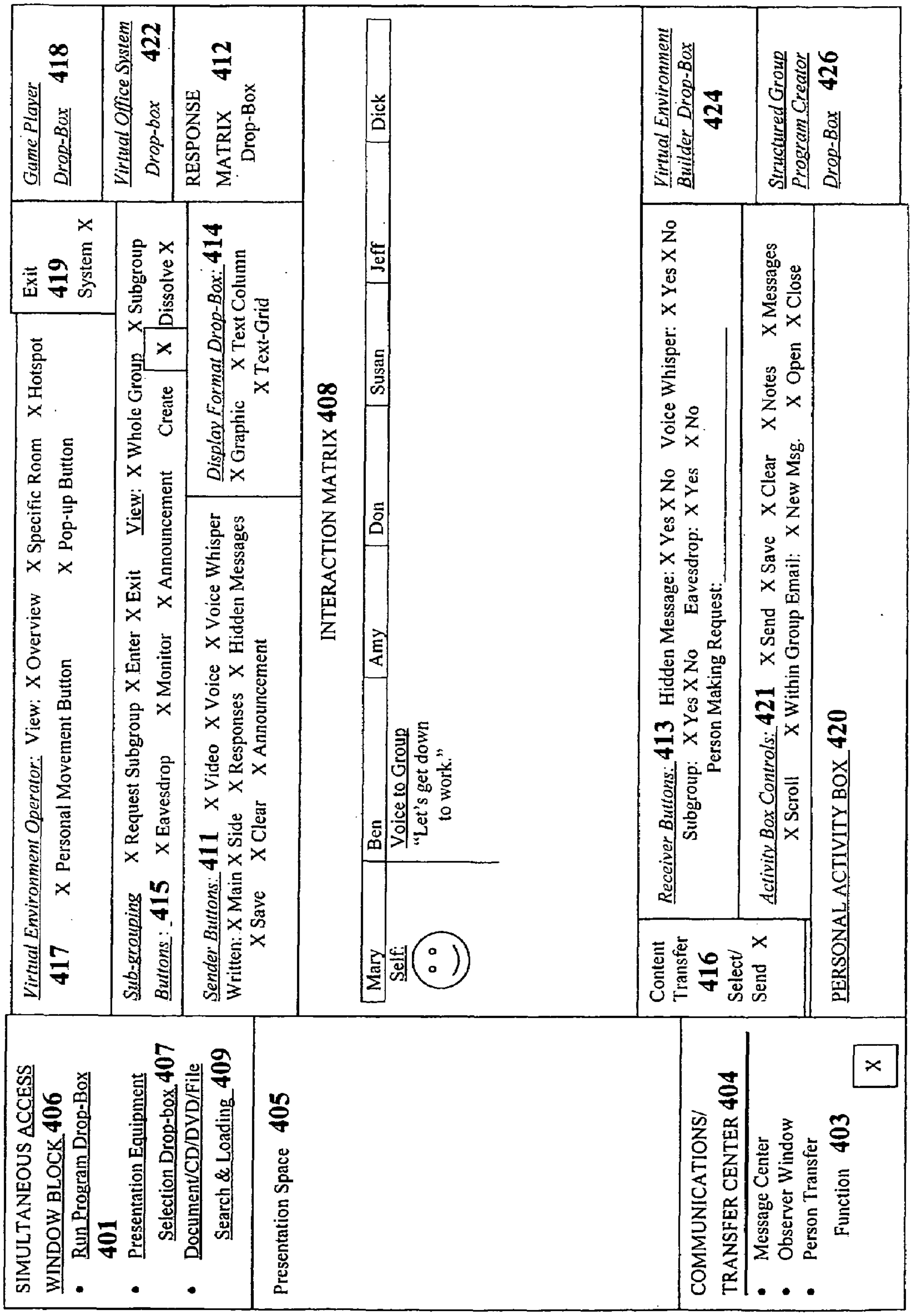
FIGS. 28A and 28B provide text column display format of the interactions depicted in FIG. 5A and FIG. 5B.
Figure 28B:
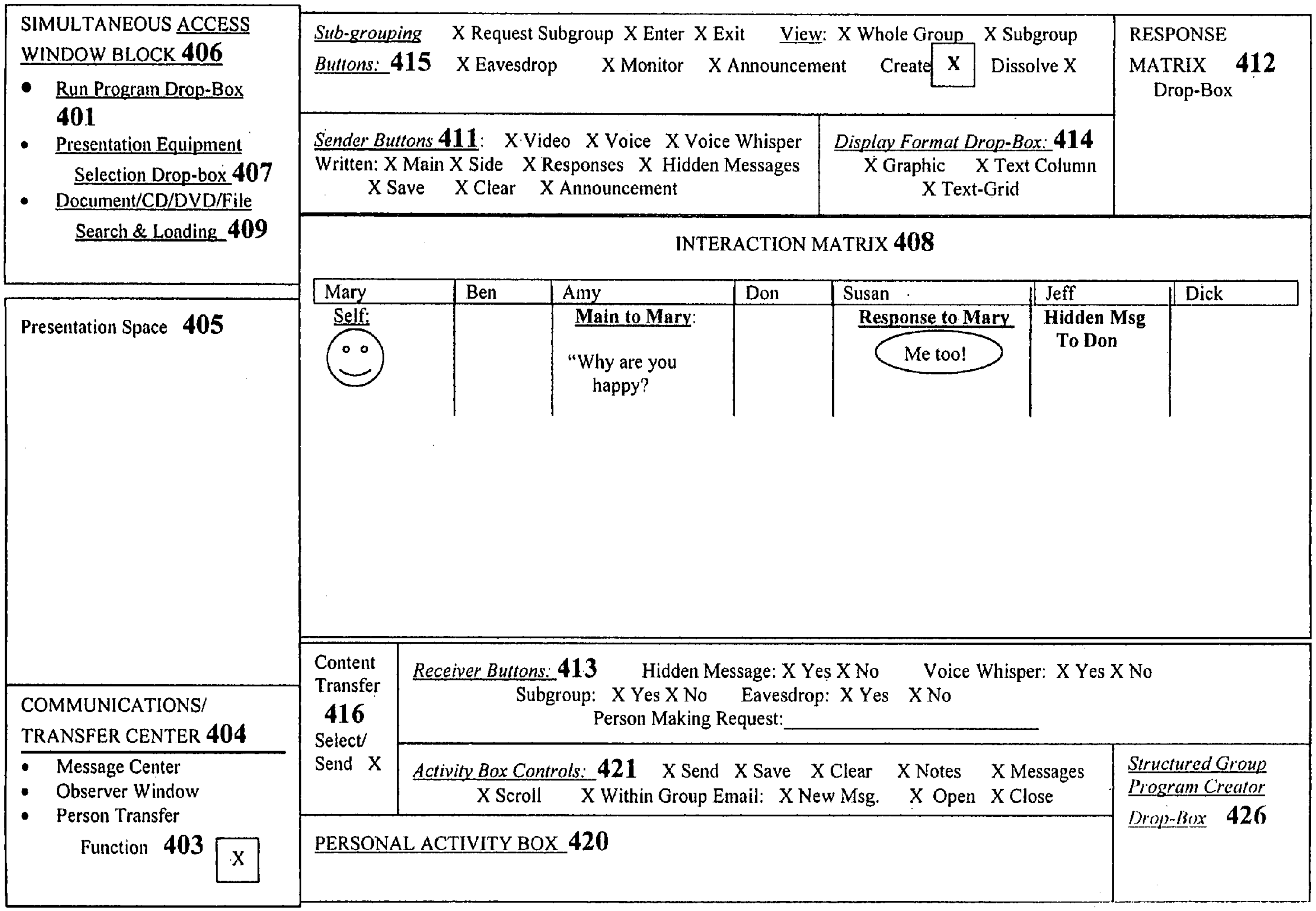

See FIGS. 28A and 28B for a text-column representation of the same interactions that are depicted graphically in FIGS. 5A and 5B. See FIGS. 29A and B for a text grid representation of the same interactions depicted graphically in FIGS. 5A and 5B.

In FIG. 28A, the same interactions that are occurring in FIG. 5A are represented in the text-column display format. In this format, the place boxes of each of the members are arranged in columns across the interaction matrix 408. When a group member sends a message to another group member, the type/target/content of the message is displayed by the graphical communications module 110 under the sender's place box 410. FIG. 28A shows that Ben (the leader) is speaking (voice message) to the Group. (For purposes of illustration, let's assume that Ben is saying, "Let's get down to work.") Mary is displaying a self-statement icon indicating that she is feeling "Happy". In FIG. 28B, Mary is still displaying the self-statement icon indicating that she is feeling "Happy". Amy is sending a main message to Mary asking "Why are you happy?" Susan is sending Amy a side message with the feedback response "Me Too!" And Jeff is sending Don a Hidden Message, the content of which appears only in Don's personal activity box.

In FIGS. 29A and 29B, the same interactions that are occurring in FIGS. 5A and 5B are represented in the text-grid display format. In this format the place boxes of each of the members are arranged in rows down the left side of the interaction matrix 408. Then, the names of all group members are arranged across the top of the interaction matrix as well, producing a kind of grid. Each group member has a different row in which his/her sent messages are displayed under the name of the target of each message. When a group member sends a message to another group member in this format, the type/content of the message is displayed by the graphical communications module 110 in the space defined by the row of the sender and the column of the receiver or target of the message.

FIG. 29A shows Ben (the leader) is speaking (voice message) to the Group (as target) in the space defined by Row 2/Column 8 of the text grid. Mary is displaying a self-statement icon indicating that she is feeling "Happy". This icon appears in Row 1 under Mary's name, since it is a self-statement and has no specific target. In FIG. 29B, Mary is still displaying the self-statement icon indicating that she is feeling "Happy" in the space defined by Row 1/Column 1 of the text grid. Amy is sending a main message to Mary asking "Why are you happy?" in the space defined by Row 3/Column 1 in the text grid. Susan is sending Amy a side message with the feedback response "Me Too!" in the space defined by Row 5/Column 1. And Jeff is sending Don a Hidden Message in the space defined by Row 6/Column 4 of the text grid. The content of this hidden message appears in Don's personal activity box only.

The interaction matrix can also be configured using a text-row display format. (See FIG. 34B for a demonstration of this display format.)

The functions of the personal activity box are the same in the text-column and text-grid display formats as they are in the graphic display format of the interaction matrix.

Scroll function: The interaction matrix 408 is provided with a scroll icon (button) 421 (FIG. 4) which enables a member to scroll back through all of the transactions that have occurred during the meeting, and these transactions will appear in the member's personal activity box 420 for viewing.

Figure 14:
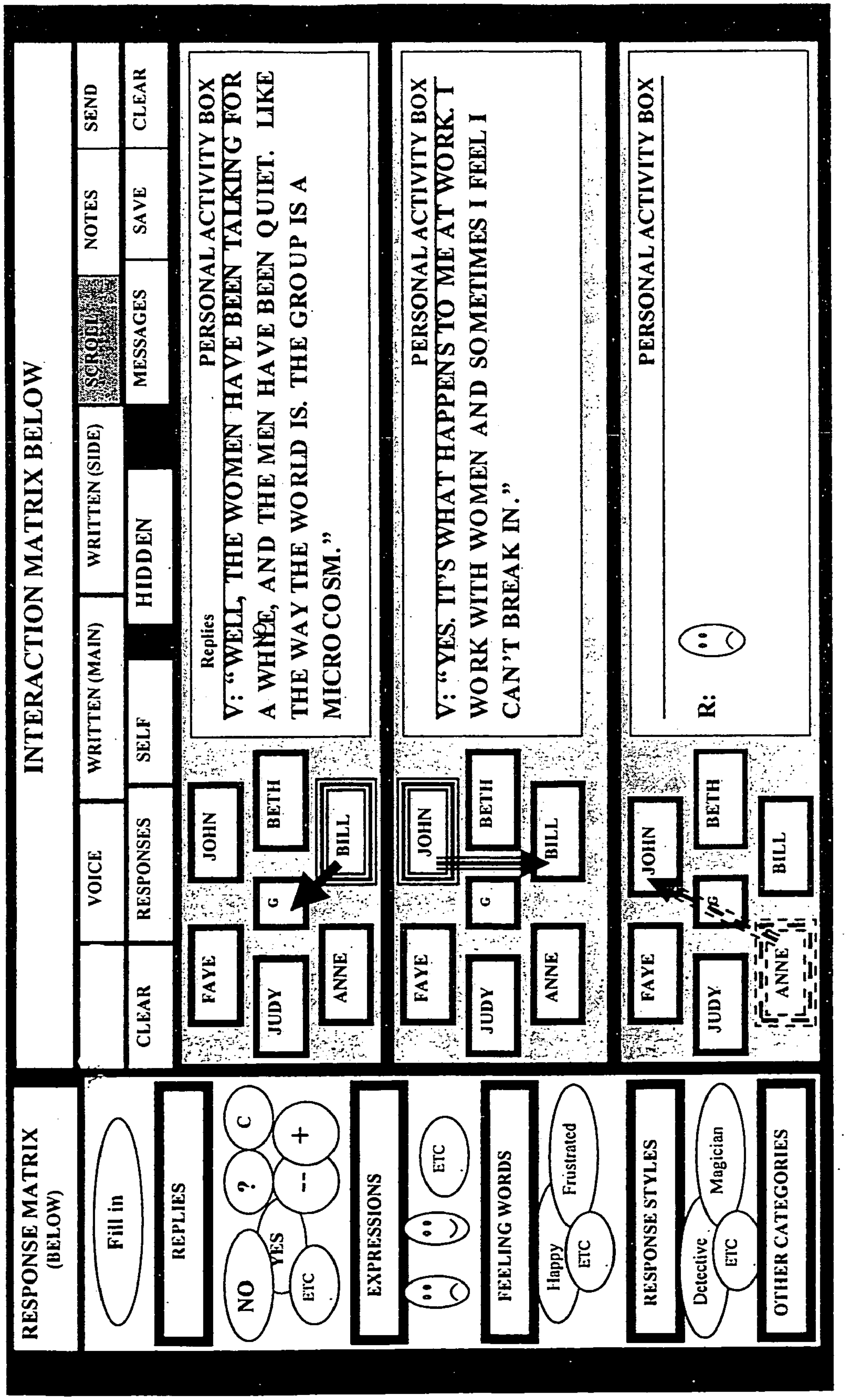
FIGS. 14 and 15 show two different scroll formats used to scroll through snapshots of previous communications.
Figure 15:
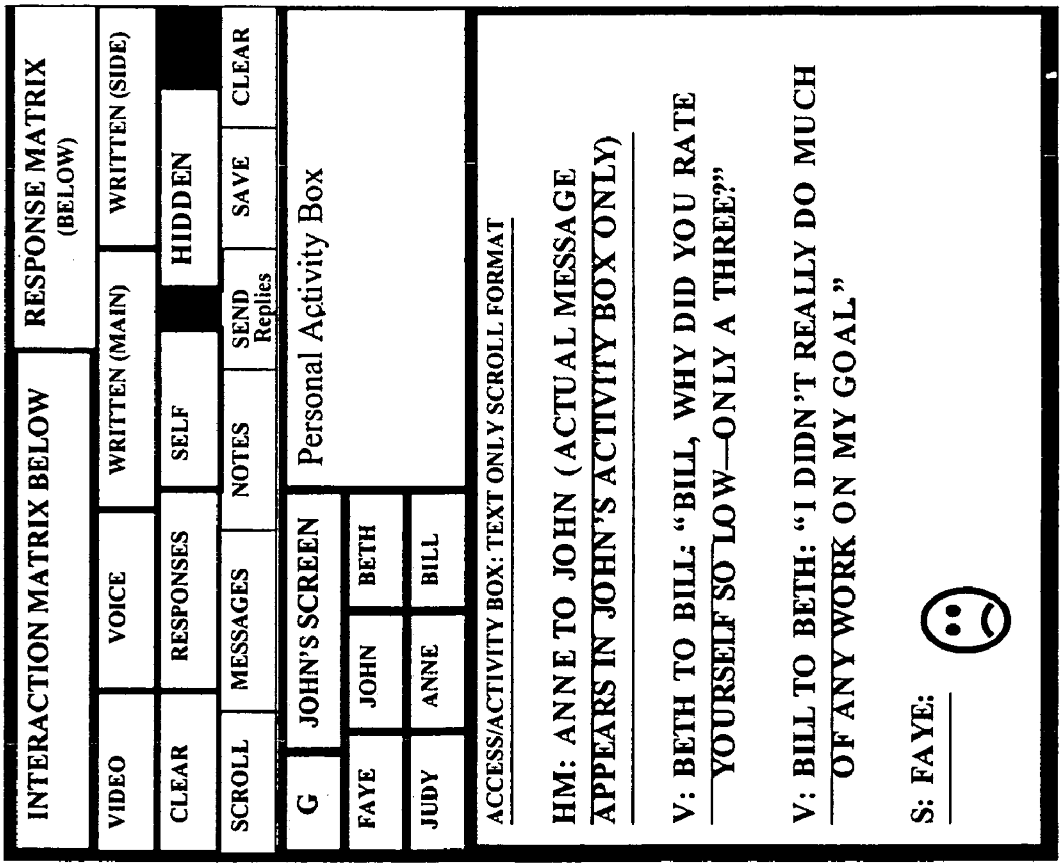

Scroll Formats: According to another aspect of the invention a variety of scroll formats are provided. One scroll format includes a small interaction matrix that indicates the message sender and receiver with an adjacent message describing type and possibly content of message being sent (FIG. 14). Another scroll format is "text only" (FIG. 15) and provides text describing who the sender and receiver are by name as well as what type of message (and possibly the content) was sent. These scroll formats are capable of representing each communication exchange in serial order only. Their advantage is allowing interaction depictions to take up less space on the computer screen or for transmission on the small screen of the PDA.

Writing Notes in Personal Activity Box: A participant can take personal notes by, for example, clicking on the NOTES button 421 (FIG. 5C) and typing notes in the personal activity box 420. This feature provides every group member with a "notepad" of sorts to write notes about the process for their own benefit.

Exit Function: When a participant wants to exit the group interaction matrix 408, he/she simply clicks on exit button 411. Also, the leader can force a member out ("boot") by clicking the exit button 411 and then the participant's "seat" 410. This is an important feature because sometimes participants can become unruly or abusive, and the Leader must have a way to make them leave the group. (See FIG. 5B).

Sub-grouping Feature: The sub-grouping process in the system is controlled by the sub-grouping module 108 of the System 100 (FIG. 1).

The sub-grouping feature allows a selected subset of networked computer users connected to a specific virtual group to break off into a smaller group or dyad for purposes of interacting via the communications system of the present invention. While interacting in the smaller group or dyad, the graphical communications flow module displays the communication flows occurring within the subgroup to those computer users in the subgroup or dyad only. The communication flows occurring within the sub-group are not displayed to other users outside of subgroup. However, all users can click on the "overview" button located on the sub-grouping toolbar and then can see an overview of all of the participants in the whole group, and all of the various subgroups.

The sub-grouping feature is controlled by sub-grouping module 108 of system 100 (FIG. 1). A tool bar is provided 415 in the interaction matrix 408 for operation of the subgroup feature by the user. To form a subgroup from a larger group of participants, the user A clicks on the "subgroup" button on the toolbar and then on the personal identity box of the participant B with whom they would like to subgroup. This action lights up the subgroup request button on participant B's screen. When participant B clicks on the lighted subgroup request button, a note occurs as to who is requesting a subgrouping. If participant B chooses to subgroup with participant A, he would click on the subgroup button and on participant A's box, and this would create a subgroup. Alternatively, a cursor button on the sub-grouping toolbar can be activated, allowing the user to drag the cursor around those place boxes of members who are selected to be in the subgroup, creating a subgroup in the system.

In the graphical display format of the interaction matrix, a heavy curved enclosure would appear around Person A and Person B's place boxes 410. In the text-column display format of the interaction matrix, a heavy border would appear around the nameplates of Person A and B, and their names would appear in adjacent columns, indicating that they were sub-grouped. In the text-grid display format, a heavy border would appear around the nameplates of Person A and B, and their rows would be re-arranged so they were immediately next to each other, indicating that they had been subgrouped.

It is also possible for a participant D to indicate that he would like to "eavesdrop" on the conversation in a specific subgroup. To do this, Participant D would click on the "eavesdrop" button on the subgrouping toolbar and then on the personal identity box of one of the participants in the desired group (e.g. Participant E). This would light up the "eavesdrop request button" on Participant E's screen. If E wanted participant D to be able to eavesdrop, he would click on the eavesdrop button and then on E's identity box, and then E would be able to "hear" what was going on in the selected subgroup.

Optionally, it is possible to configure the system to allow the user or manager of the system to monitor any and all subgroupings within the larger group. In this set-up, the owner/leader/manager simply clicks "monitor" on the subgrouping toolbar and then on the subgroup to be monitored, and the proceedings of that subgroup can be observed.

In order to communicate via the interaction matrix when subgrouped, the user must click on the "subgroup" view on the view button on the subgrouping toolbar 415. This will cause the standard operating system to appear on the user's screen, but only those participants in the specific subgroup will appear in the interaction matrix.

An announcement capacity is provided which allows any computer user connected to the larger virtual group to make an announcement that can be sent to all the computer users connected to the virtual group, including those computer users who have broken off into subgroups or dyads. To do this, a user would click on "Announcement" button and send a text message or a voice message stating the announcement. This announcement would be "heard" by all participants in the group, including those in subgroups.

When a participant decides to exit the subgroup and return to the larger group, he does this by clicking on the "exit" button on the subgrouping toolbar.

Figure 30A:
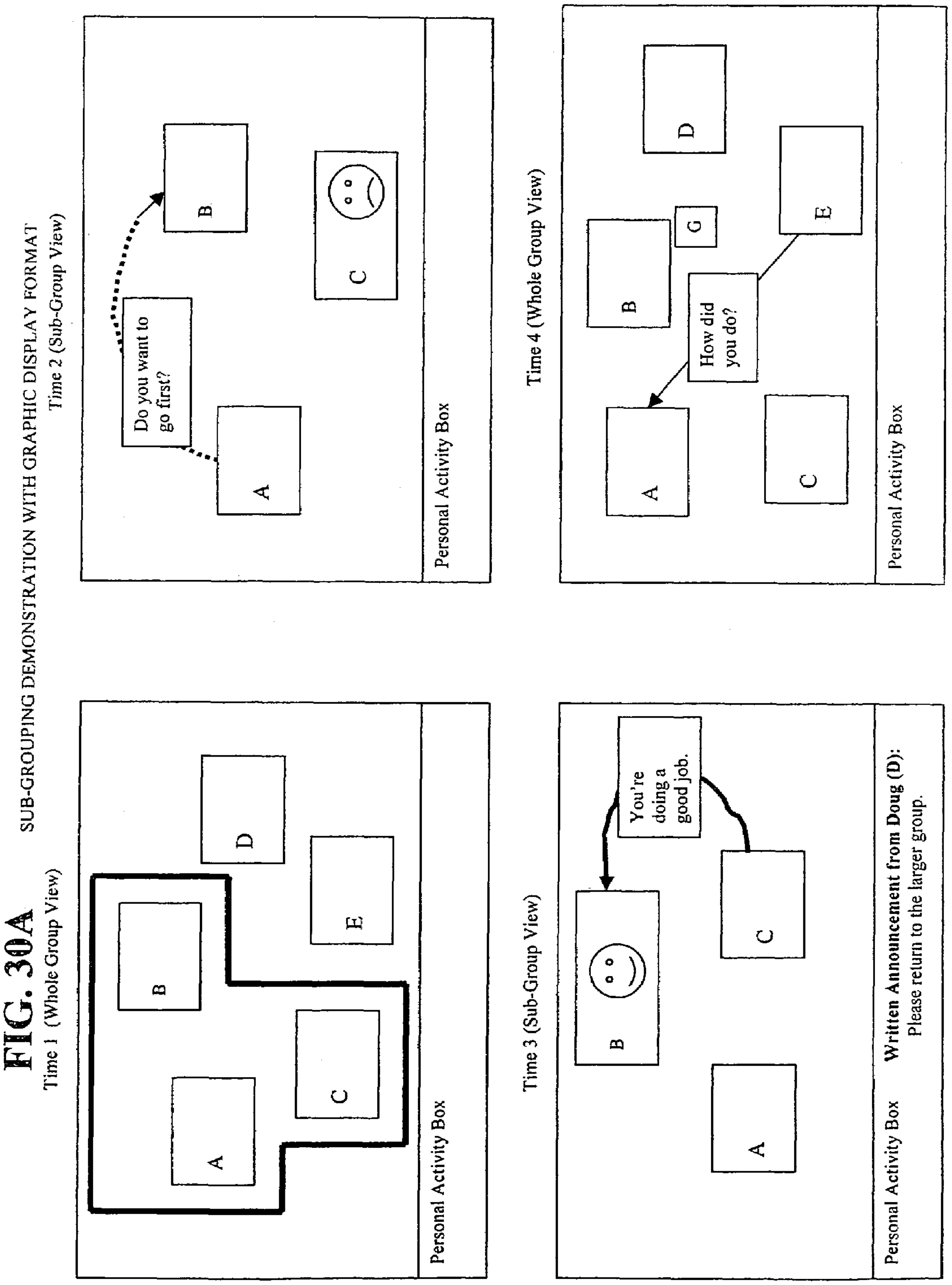
FIG. 30A shows the subgrouping process using the graphic display format.

FIG. 30A provides a demonstration of the subgrouping feature in the graphical display format of the interaction matrix 408. In FIG. 30A, Carole's (Person C) user screen is shown. The upper left quadrant (Time 1) shows that Persons A, B and C have formed a subgroup. In the upper right quadrant (Time 2), an interaction matrix is displayed with only those members of the subgroup (Persons A, B and C). At Time 2, Angie (A) is asking Bob (B) if he wants to go first. Carole is displaying a sad face icon in her identity place box 410. In the lower left quadrant (Time 3), Carole (C) is sending Bob (B) a side comment "You're doing a good job." Bob (B) displays a smiling face icon as a self-statement in his place box. At that same time, an announcement appears in the personal activity box of all group members (shown here in Carole's personal activity box) that states, "Please return to the larger group." The lower right quadrant (Time 4) shows that all group members have returned to the larger group and are interacting together.

FIG. 30B provides a demonstration of the subgrouping feature in the text-column display format of the interaction matrix 408. In FIG. 30B, Carole's (Person C) user screen is shown. The upper left quadrant (Time 1) shows that Persons A, B and C have formed a subgroup. In the upper right quadrant (Time 2), an interaction matrix is displayed with only those members of the subgroup (Persons A, B and C). At Time 2, Angie (A) is asking Bob (B) if he wants to go first. Carole is displaying a sad face icon as a self-statement. In the lower left quadrant (Time 3), Carole (C) is sending Bob (B) a side comment "You're doing a good job." Bob is displaying a happy face as a self-statement. At that same time, an announcement appears in the personal activity box of all group members (shown here in Carole's personal activity box) that states, "Please return to the larger group." The lower right quadrant (Time 4) shows that all group members have returned to the larger group and are interacting together.

FIG. 30C provides a demonstration of the same interactions from FIG. 30A of the subgrouping feature using the text-grid display format of the interaction matrix. In FIG. 30B, Carole's (Person C) user screen is shown. The upper left quadrant (Time 1) shows that Persons A, B and C have formed a subgroup. In the upper right quadrant (Time 2), an interaction matrix is displayed with only those members of the subgroup (Persons A, B and C). At Time 2, Angie (A, Row 1) is asking Bob (B) if he wants to go first. Carole (C, Row 3) is displaying a sad face icon in the space defined by her Row 3 and her column 3. In the lower left quadrant (Time 3), Carole (C, Row 3) is sending Bob (B, Column 2) a side comment "You're doing a good job." Box is displaying a happy face as a self statement in the space defined by his row and column (Row 2, column 2). At that same time, an announcement appears in the personal activity box of all group members (shown here in Carole's personal activity box) that states, "Please return to the larger group." The lower right quadrant (Time 4) shows that all group members have returned to the larger group and are interacting together.

One of the problems with existing systems of computerized group interaction is that it is not possible for a large group of people to break up into smaller groups or dyads with the potential to be called back by an announcement to rejoin the larger group again. In real-life group situations, we have the ability to talk to someone who is sitting next to us in a larger group, to "tune out" all the other conversations going on in the room, and then to attend only to the person sitting next to us for a while. There are many situations in real-life where people may choose to break up into smaller groups while having the potential to return to the larger group when desired, including during academic classes, office meetings, conferences, counseling sessions and social other settings. The subgrouping feature makes it possible for the system of the present invention to produce a more realistic and satisfying computerized group interaction experience.

Content Transfer Function: A content transfer feature enables participants to select text from one component of the system and send a copy of it to another component. This feature enables participants to view a document in the simultaneous access window 406, select a certain passage from that document, using the pointing device 300 (FIG. 3), and then send a copy of the selected passage to his/her personal activity box 420. Subsequently, the selected passage may be sent as a written message to members of the group. This feature also enables a member to scroll back through the written messages that have occurred throughout a group meeting, select a particular statement, send a copy of it to his/her personal activity box 420, whereupon it may be incorporated into the ongoing dialogue of the group. In other words, the members may "remind" the group of earlier statements (verbatim), without the need to re-type the dialogue.

In operation, content is transferred by clicking on the select-send button 421 (FIG. 6A), selecting the desired passage using the pointing device (mouse) 300, and then clicking on the place icon 410 on the screen where the content is to be sent.

Moreover, the content transfer feature enables participants to transfer video and text files to different points in the system. For example, participant A might choose to send a document file from his own PC to another participant B. Alternatively, participant A may choose to send a video or document file to the simultaneous access window so that it can be opened for all group members to view. In operation a video or text file is transferred by clicking on the file to be transferred, then clicking on the select-send button 416 (FIG. 4), and then clicking on the point on the screen for the desired destination (i.e., a participant's identity place box or the simultaneous access window). The transfer of content and files throughout the system is controlled by the file access/transfer/storage module 144 on system 100 (FIG. 1).

Figure 6A:
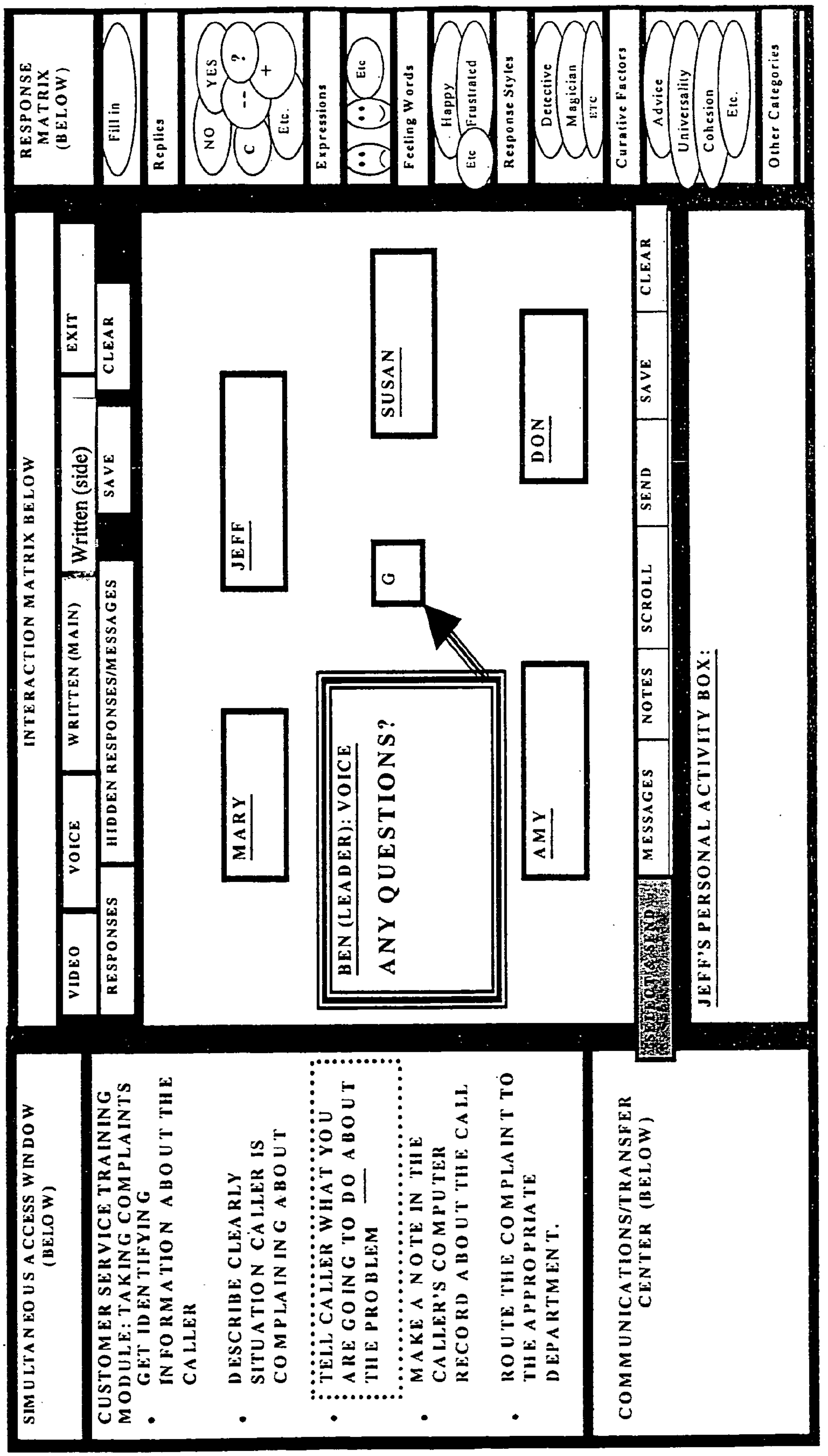
FIGS. 6A-6C are sample screen layouts used to explain how content is transferred in the system of the present invention.

In FIG. 6A, a user has selected text 602 from the presentation material on "Taking Complaints" which is indicated by the dotted box around the selected passage in the simultaneous access window 406.

Figure 6B:
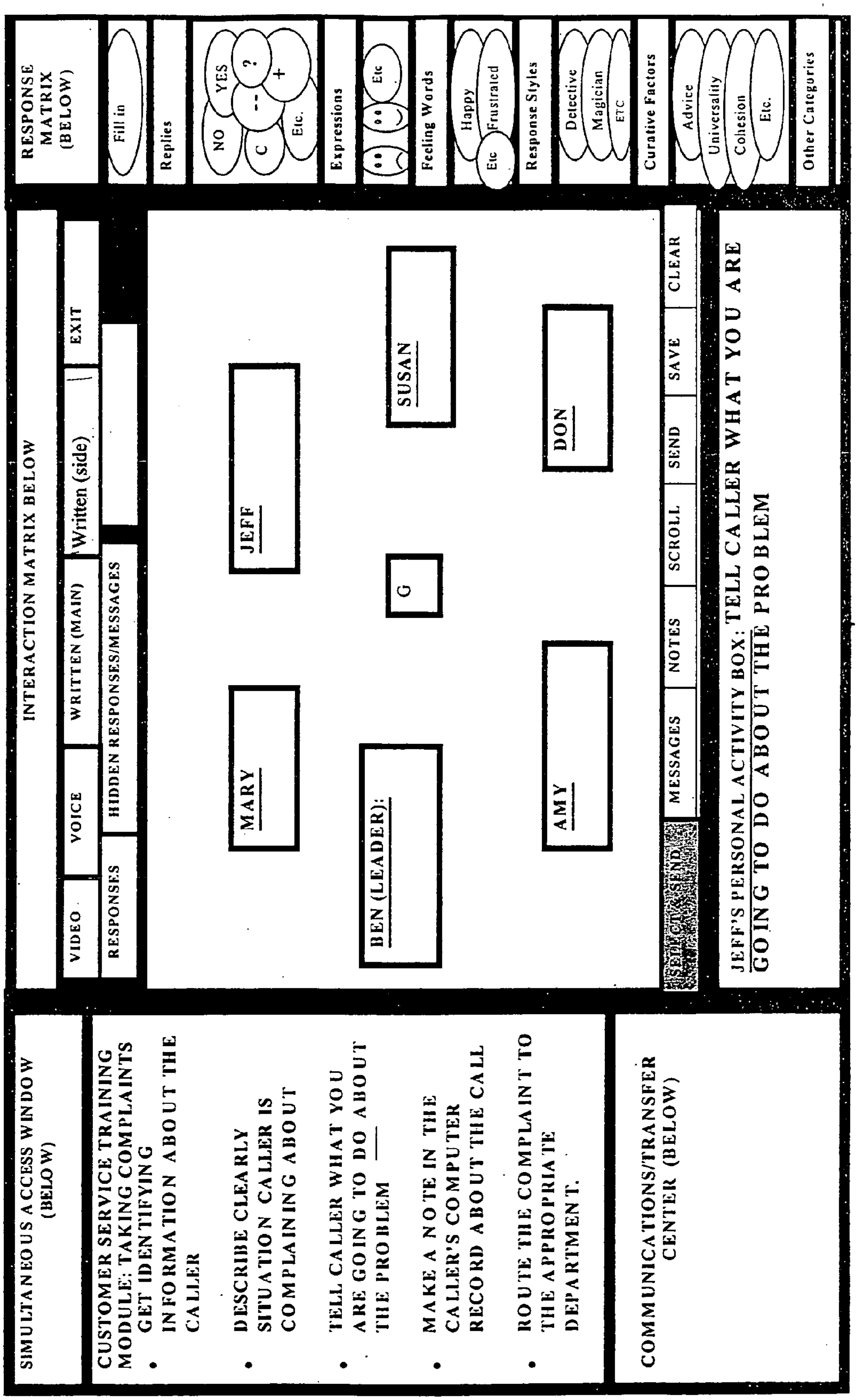

In FIG. 6B, the user has pasted the passage 602 into his personal activity box 420 and has edited the passage to send as a written message into the interaction matrix 408.

Figure 6C:
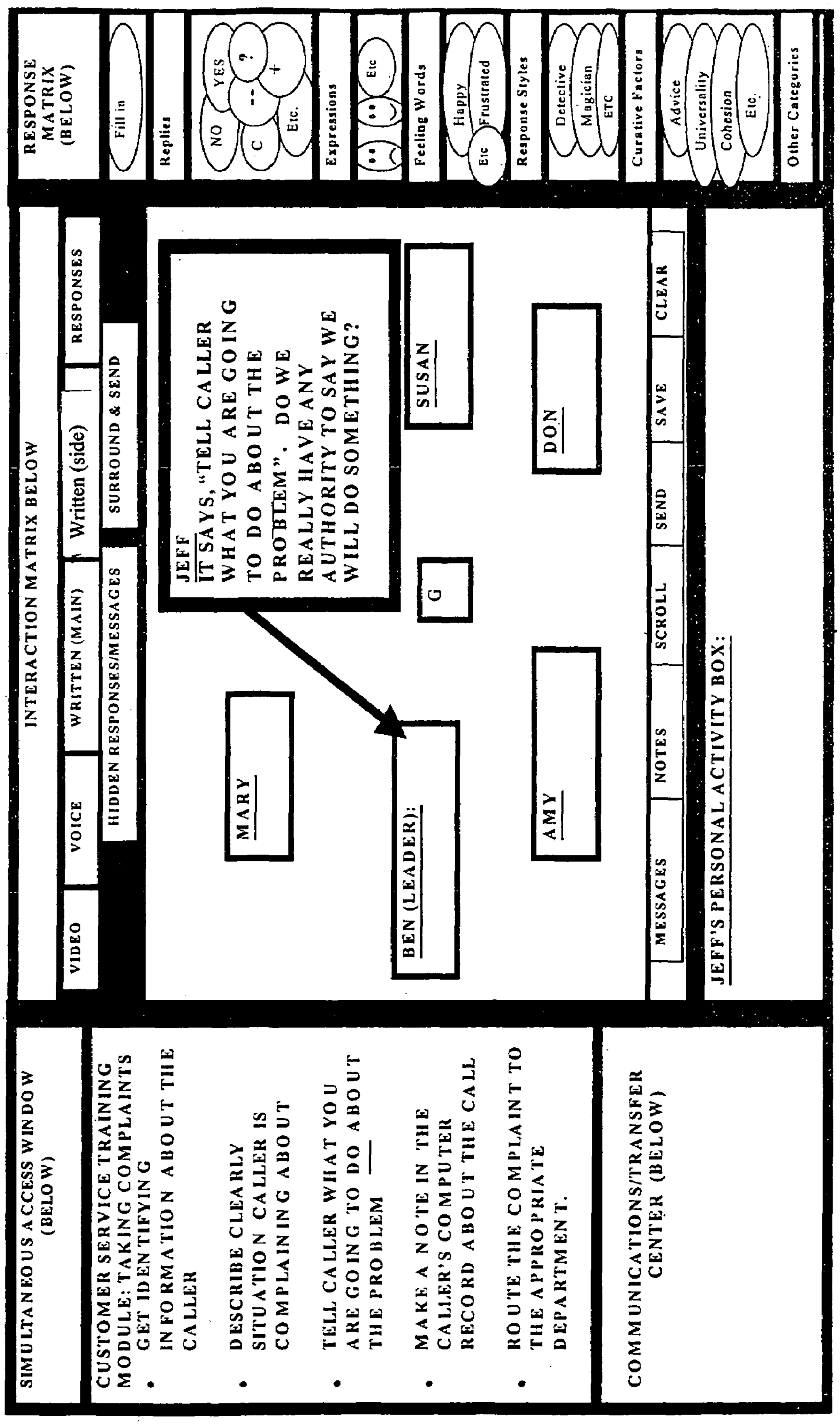

FIG. 6C shows the user's comment in his "seat" 410-*e* on the interaction matrix 408 where he is asking the Leader, 410-*a*, a question related to the passage.

Counter Module As shown in FIG. 1, the system 100 is provided with an activity counter 116 for counting the number and type of messages each participant sends or receives. For example, the Counter 116 may record that a particular user sent 5 voice messages, 3 hidden messages and 2 Responses during the meeting; and that she received 3 voice messages, 0 hidden messages and 5 Responses from others. The activity counter 116 further measures the amount of group time each member consumes ("air-time"). That is, with respect to Voice messages, a timer will record how long a particular participant speaks, as well as how long the participant is spoken to. The activity counter 116 further measures the amount of time each member spends sending and receiving written messages. That is, with respect to Written messages, a timer will record how much time a particular participant spends using the keyboard sending and receiving Written messages.

The counter feedback data is continuously recorded and sent to the statistical methods module 118 (FIG. 1) that analyzes the feedback data according to pre-programmed statistical methods, and reports of that feedback are sent to the participant and to the leader. For example, the data may be analyzed using Round Robin Analysis of Variance that determines whether there are Actor Effects (do some people talk more than others), Partner Effects (do some people elicit more talking than others), or Relationship Effects (do some people talk more to certain people than to others?)

Figure 7:
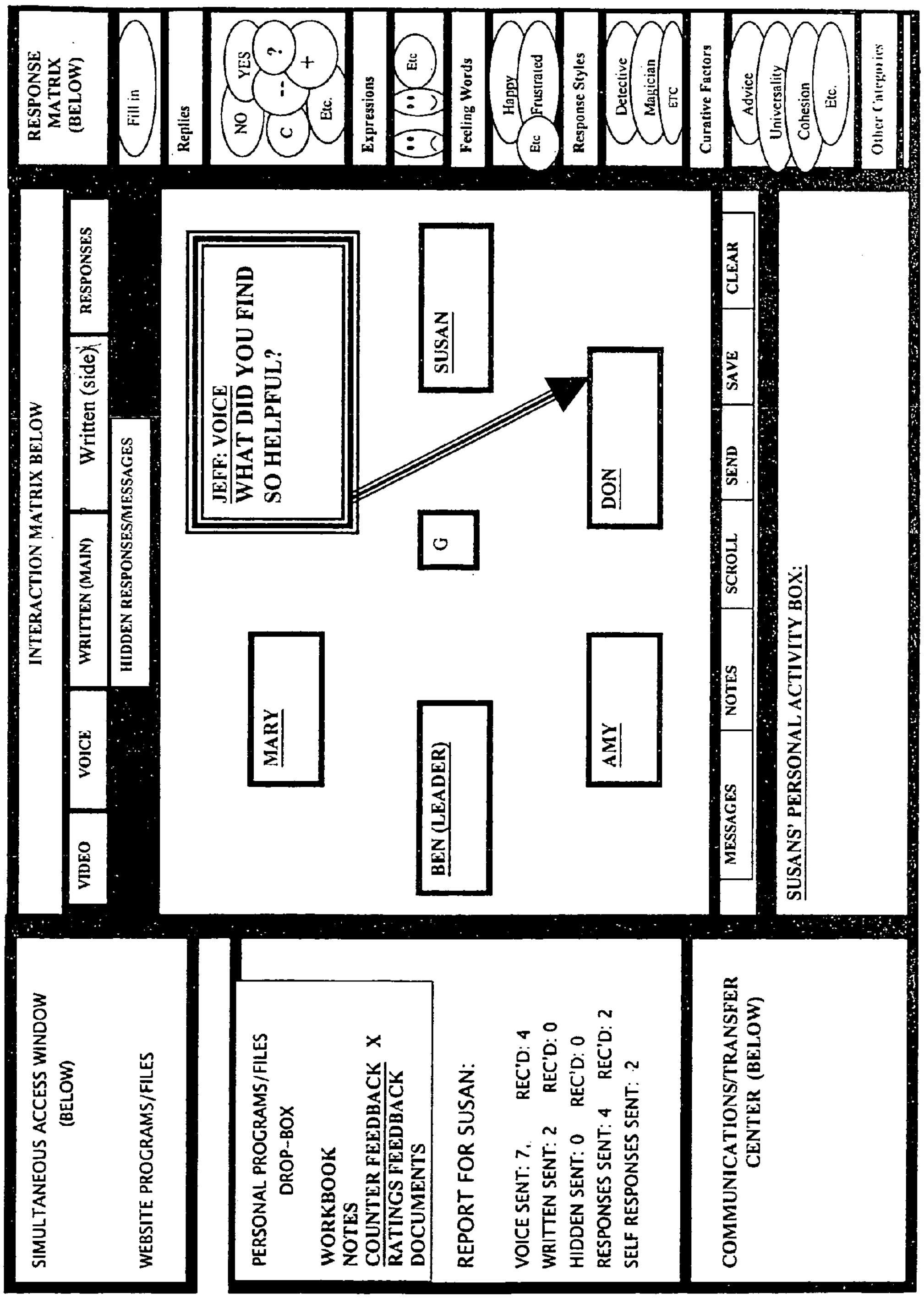
FIG. 7 is an example of a Member's Personal Report showing what messages that member has sent and received as measured by the activity counter.

The activity counter's 116 report only provides information about that participant in the feedback report. The activity counter report may also provide averages so that the participant can compare his or her activity level with the average on any measured variable. The Leader Report provides the information about all participants. FIG. 7 shows a sample participant counter activity report in the simultaneous access window 406. This report could alternately appear in the Personal Activity Box 420 in the interaction matrix only configuration of the system.

Figure 8:
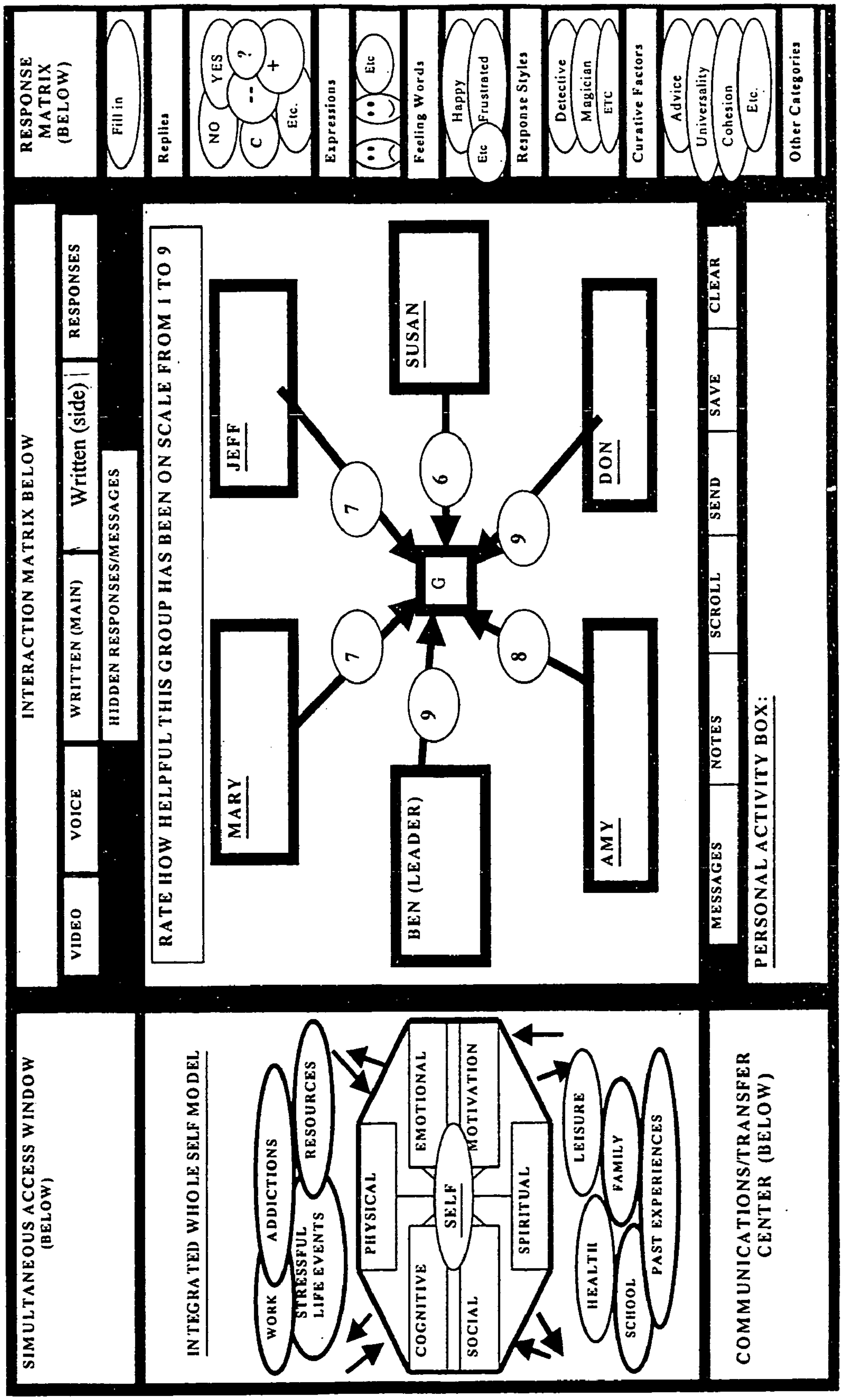
FIG. 8 is an example of a feedback template used by a group leader to enter a feedback question and provide a rating scale or a series of multiple-choice responses.

Ratings Module: The system 100 may further include a rating module 120 (FIG. 1), which may be used by the group leader to solicit feedback from the group. The rating module 120 presents a special screen in the interaction matrix, which prompts the leader to enter a feedback question and provide a rating scale or a series of multiple-choice responses. For example, as shown in FIG. 8, the leader could write, "On a scale from 1 to 9, how satisfied are you with today's group meeting?" The Ratings Screen in the interaction matrix provides a place for each group member to make his/her rating. This provides an excellent way for group members to obtain information about how other people are feeling and to compare his/her own ratings with the other group members.

All the ratings are sent to the Statistical Methods Module 118 to be analyzed according to pre-programmed statistical methods. Then reports are sent to the Leader and to each participant with results (e.g. your rating was 7, and the average rating on this question was 5).

Figure 9:
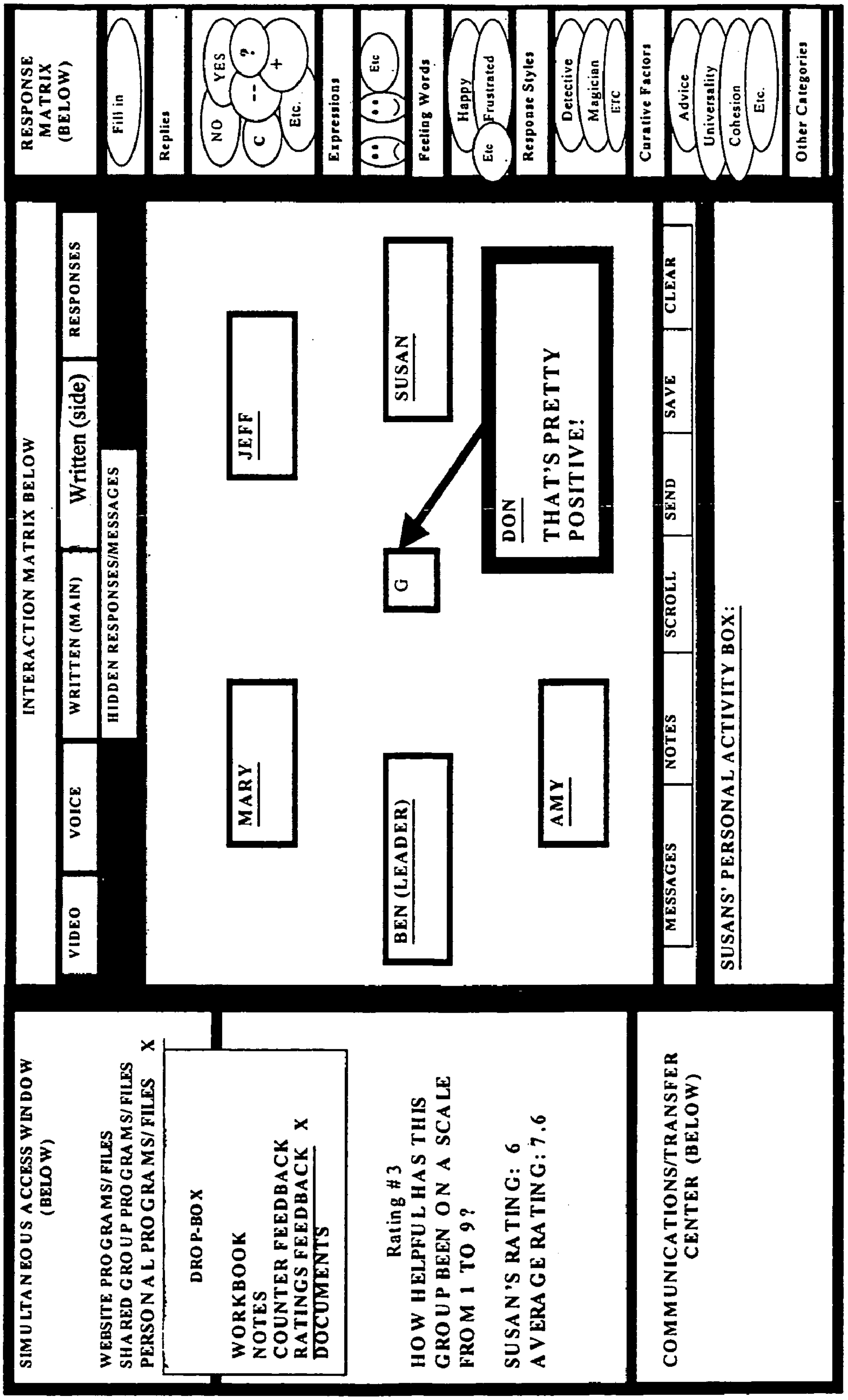
FIG. 9 is a sample Personal Feedback Report.

FIG. 8 shows the Ratings Screen in the interaction matrix 408, and FIG. 9 shows a Personal Feedback Report in the simultaneous access window 406.

Recording Module: According to one aspect of the present invention, the system 100 includes a recording module 122, which provides the leader with the ability to record the communications (voice and text) and then re-play the communications and communications flows back to the group. The purpose of this feature is to allow group members to go through a training exercise (like a role-play) and then observe themselves after the role-play is completed through the playing back of the communication. This re-play technique is often used in teaching people how to do psychotherapy or how to improve interpersonal skills. It is very difficult to pay attention to oneself while in the process of role-playing or acting out other therapeutic techniques. This process can also be very helpful for teaching group process and dynamics to participants.

Simultaneous Access Window Block: The simultaneous access window 406 is an interface or area used to display programs and documents on the system. There are four categories of files that the simultaneous access window 406 displays: "Individual accessed" (personal) programs (like a user's personal on-line workbook); "shared group-specific accessed" programs (like closed chat-rooms, group bulletin board, participant "Bios" or homework assignment list); "Leader Accessed programs/files" (like controls for running and creating structured group programs or setting interaction matrix controls); and "system-wide accessed" programs (like open access chat rooms, scheduler, or outside internet links). Each of these programs is explained in detail herein below.

The system 100 of the present invention allows a user to be participating in a group discussion in the interaction matrix 408 while simultaneously viewing whatever documents or programs are being presented in the simultaneous access window 406. When a group is in session and the group leader is presenting material in the simultaneous access window 406, the material appears in the Window for all group participants to view. The group leader has the controls to choose which programs are presented in the simultaneous access window 406. However, if a participant wants to access a different program than what is being presented, she simply clicks on the desired program in the drop-box of the simultaneous access window, and that selection then appears in the window, covering up what is being presented to the group as a whole by the leader. To return to the group presented material in the simultaneous access window 406, she simply closes the file.

The simultaneous access window 406 can present many different types of materials, including any document file, slide show presentation file, video clip, digital photographs, computerized interactive games, and the structured group programs of the present invention.

It should be noted that the ability to "see" the group members with whom one is interacting through the interaction matrix 408 while also viewing shared documents or presentation materials in a closed virtual meeting room is unique to the present invention. Also, the ability to access programs and files in the simultaneous access window 406 without having to leave the group discussion in the interaction matrix 408 is a unique aspect of this invention.

Assessment Module: The system 100 may optionally include an assessment module 124 (FIG. 1) which enables group members to complete assessment tools in the simultaneous access window 406, have these measures analyzed, and reports sent to the leader and participants of the group.

These assessments may be standardized measures of some variable (e.g., the Beck Depression Inventory), or they may be questionnaires that have been made up by the group leader (or programmed into the structured group program). These questionnaires or standardized assessment tools are presented in the simultaneous access window 406. The participant "fills out" the assessment tool by, for example, entering answers with the keyboard 300. The data from the assessments are analyzed by the Statistics Methods Module 118, and feedback reports are provided to the group leader.

Optionally, the feedback reports may also be provided directly to participants. At other times, the leader shares results with each participant individually or through the within group e-mail system. The assessment module 124 and/or the Statistical methods module 118 may be programmed to monitor or score any particular assessment measure and perform any desired statistical manipulations on the data retrieved.

Figure 16A:
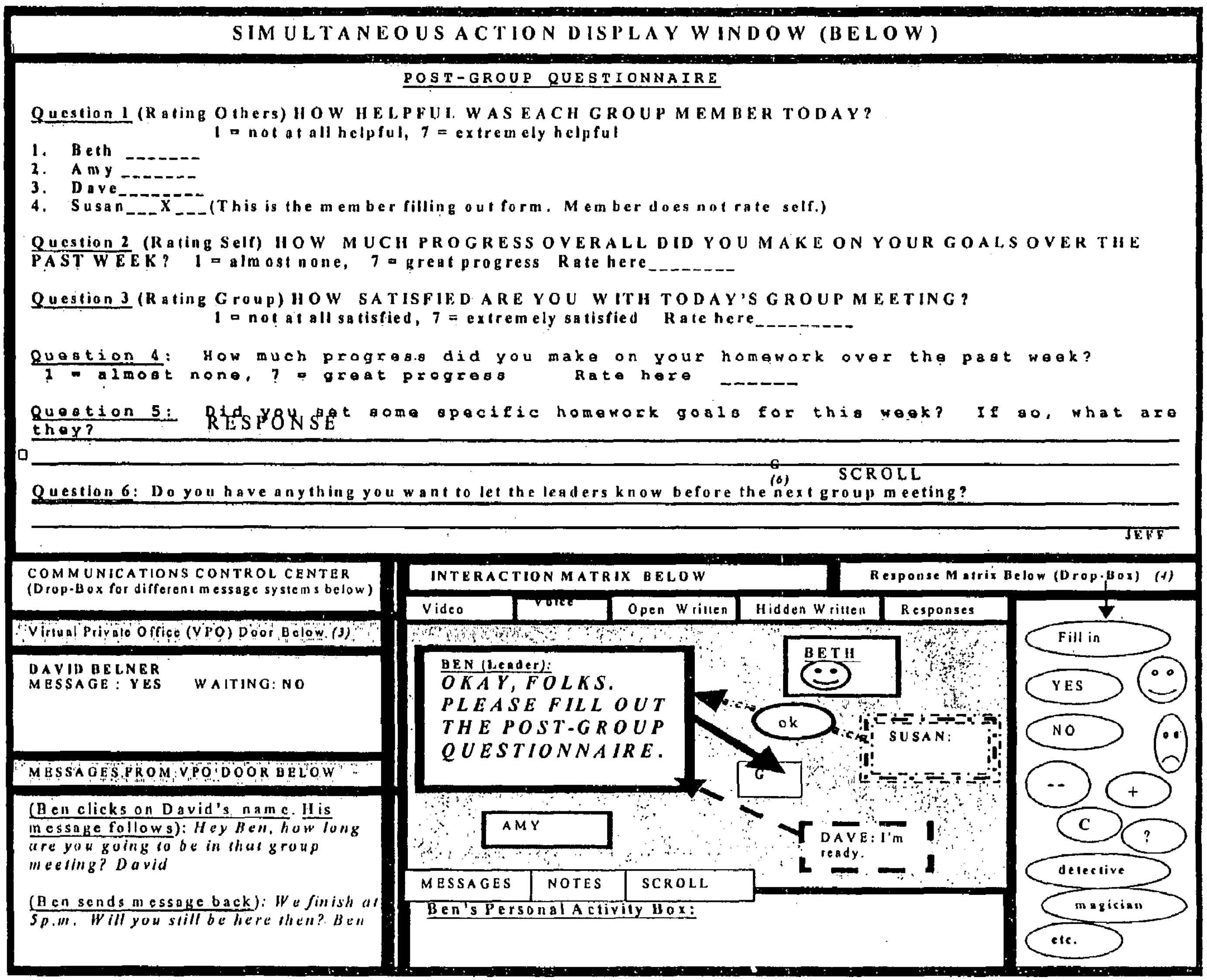
FIGS. 16A and 16B show sample assessment questionnaires.
Figure 16B:
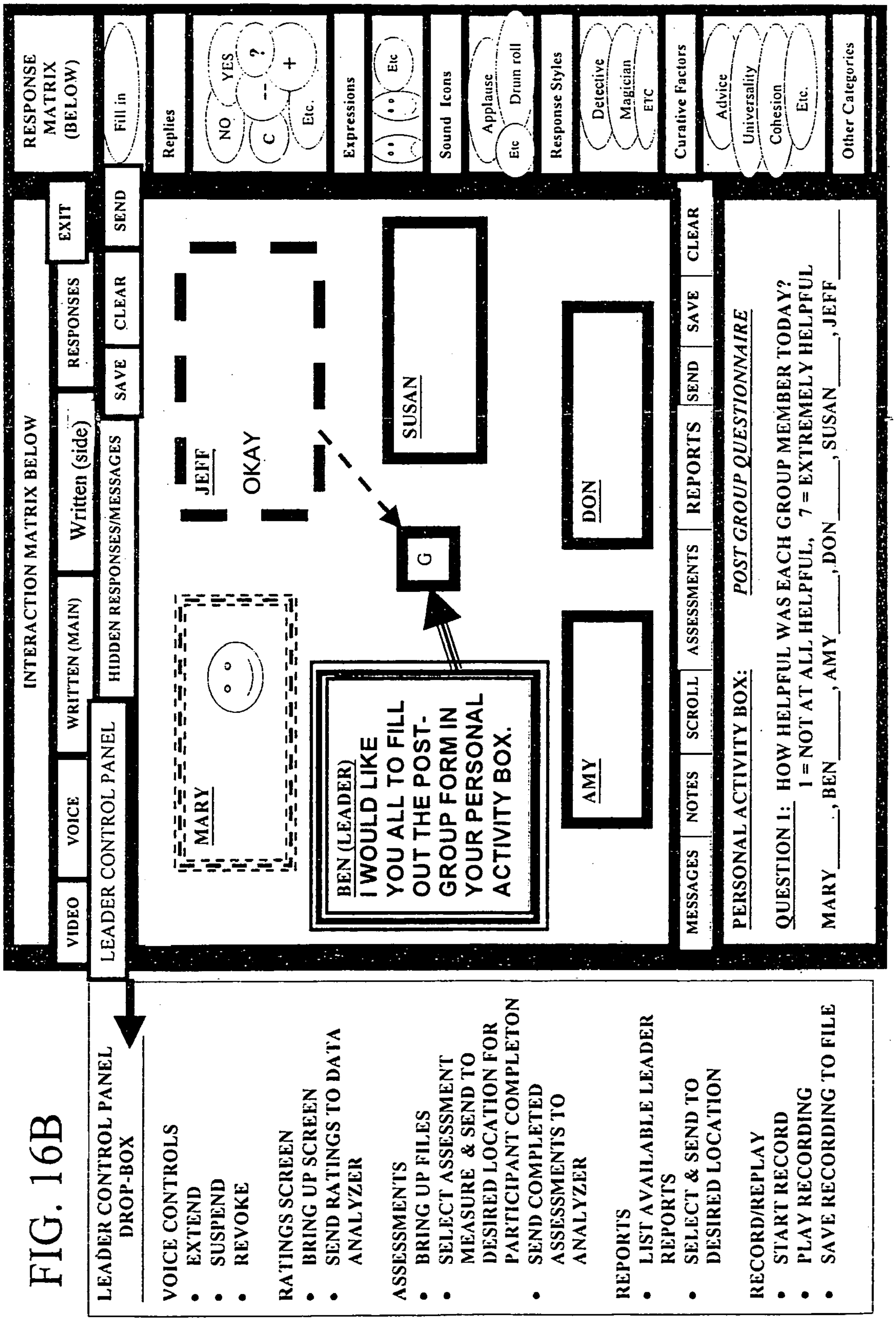

An example of an assessment measure presented in the simultaneous access window 406 is the Post-Group Questionnaire (FIGS. 16A and 16B). This instrument asks group members to rate their feelings toward other group members, among other things. But the Post-Group questionnaire may also include written answers that are organized in a special report for the Leader of the group. Examples of questions requiring written answers might include, "Is there something that you feel is holding you back from accomplishing your goal?" or "What was the most important feedback you received today in the group meeting?" The purpose of the assessment module 124 is to provide a way for individual assessment of each participant, which is not viewed by other group members (as is the case with the Ratings Screen described earlier).

FIG. 16C shows an example of the Leader's Post-Group Feedback Report. The report provides information about group rating data related to how close each group member feels to every other group member (Question 1). The data is arranged in a response grid which can be analyzed using Round Robin Analysis of Variance to determine whether there are Actor Effects (individual differences in how close each group member tends to feel towards others), Partner Effects (individual differences in how close other group members tend to feel toward each group member—how much "closeness" each member elicits), and relationship effects (special adjustments that members make in their usual level of closeness depending upon the person they are reporting about). The Leader's Feedback Report from the Post-Group Questionnaire also summarizes written answers to questions by all the group participants.

The assessment module 124 allows the group leader to assess progress of each participant according to standardized measures. The information retrieved from assessment measures (e.g. the Post-Group form) can also help to guide future interactions in the group. For example, if a member has stated on a post-group form that she would really like to get to know a specific member of the group better, then the group therapist, knowing that information, could facilitate interactions between the two group members in future group meetings.

Computerized Game Player: The computerized game player with interaction capability is controlled by module 148 of the system 100 (FIG. 1). The computerized game player system can be accessed by clicking on that heading on the Run Programs Drop-Box 401 in the simultaneous access window block 406 of the present system (FIG. 4). Once the game player system is accessed, a drop-box 418 (FIG. 4) appears to allow the user to upload and select a specific game to be played as well as the type of game playing format (standard, double-decker or integrated). (Also see FIG. 36 for description of game player components.)

The original patent application allowed for a game to be played in the simultaneous access window while participants continued to observe each other communicating in the interaction matrix of the present system. The improvement in this continuation in part is a specific computerized game player system that allows computerized games to be played in a much more enjoyable and satisfying way than previously possible. The improved game player system will play CD's in one of three formats: 1) standard format (game is played in simultaneous access window of the system while people communicate in the interaction matrix); 2) double-decker format that allows the communication flows of the game players to be exhibited in an upper level interaction matrix while each player's moves on the card or board game are visible on a lower level; and 3) integrated format where the place boxes of each player surround a game board or card table and game players can talk and play a game simultaneously much like would occur when playing a card or board game in real life. Game compact disks ("CDs"—or DVDs or other media) can be specially developed for playing on the computerized game player system of the present invention. These games can also be directly downloaded from Internet sites licensed to supply specific games for use on the system of the present invention.

FIGS. 31 and 32 demonstrate two of the game-playing formats and their advantages.

FIG. 31 shows a double-decker game player system using the graphic display format in the interaction matrix. In this operation, the interaction matrix using the graphic display format is located above the playing board or table. Optionally, lines extending from the table to the place box of the participant who is accessing the board or table can be displayed so as to provide a more authentic representation of people playing a game, drawing, or arranging photos in a scrapbook while talking.

FIG. 32 shows the integrated interaction/activity game player system using the text-column display format. In this example, participants are arranged around a table where a connecting word game (such as SCRABBLE) is being played.

There are already games available for playing over computers—like video games and card games and board games (e.g. chess or SCRABBLE). But they do not allow participants to continue talking while playing the game as people do in "real-life" game playing situations. The improved game player system of the present invention provides several options for enjoying computerized card games or board games in an authentic and satisfying way not otherwise available.

Virtual Meeting Place (Office): As noted above in the Background of the Invention, many businesses would like to be able to hold meetings and seminars over computer networks. However, currently available systems for holding meetings have a number of problems. The system of the present invention solves the problems associated with holding business meetings over computer networks. Specifically, the system allows the meeting participants to "see" each other in the interaction matrix 408 while simultaneously viewing presentation materials together, working on shared group documents, and moving from one virtual meeting space to another to meet the demands for attending multiple meetings in disparate locations.

Notably, the system 100 may include a shared virtual meeting place module 126 providing a plurality of virtual meeting rooms. The virtual meeting place system can be accessed by clicking on that program on the Run Program Drop-Box 401 of the simultaneous access window block 406 of the present system (FIG. 4). Once accessed, a virtual office drop-box 422 (FIG. 4) will appear on the user screen. (Also see FIG. 36 for description of virtual office components.)

Figure 17A:
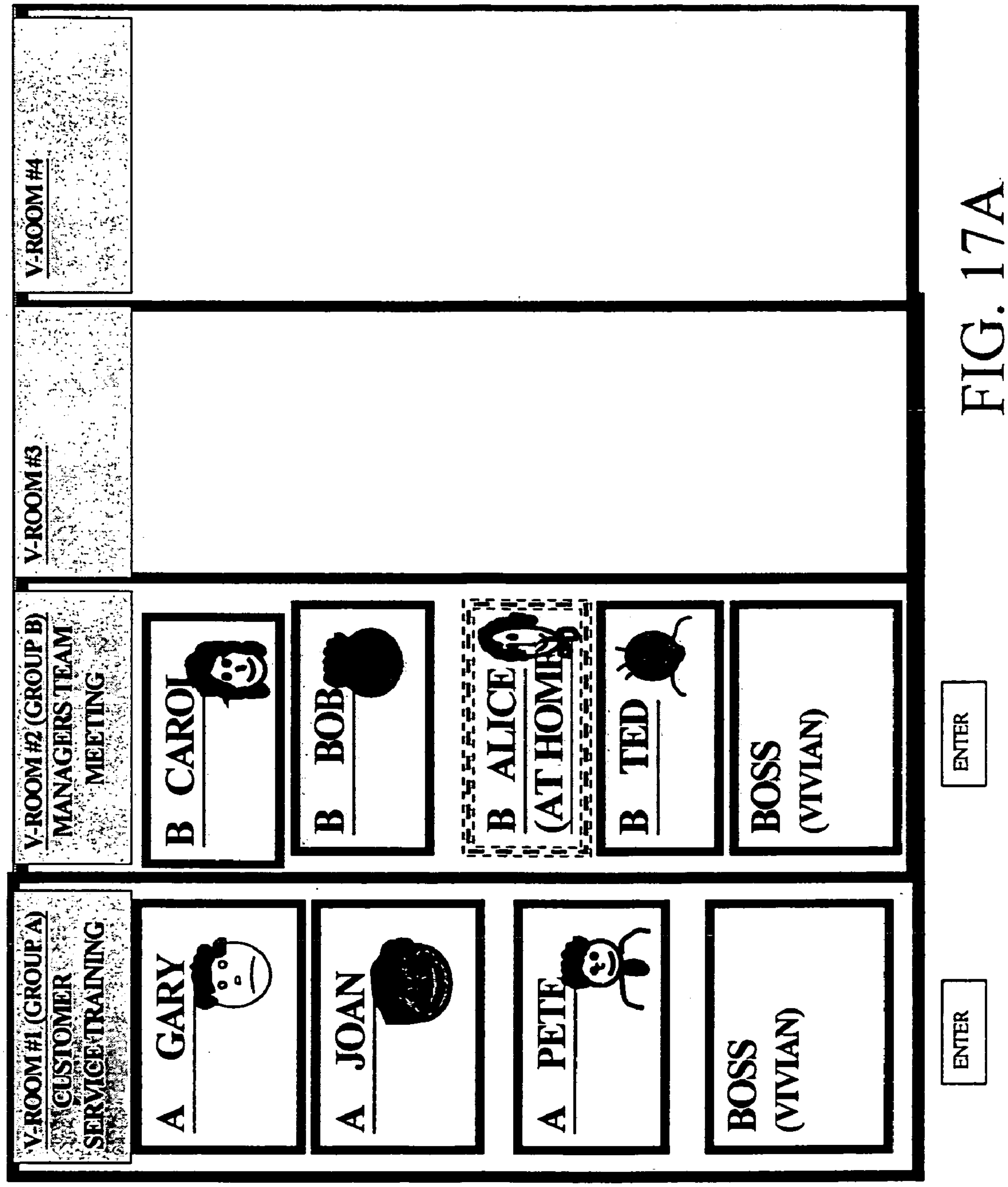
FIGS. 17A and 17B are sample layouts of a Virtual Floor Plan graphically depicting a number of virtual rooms.
Figure 17B:
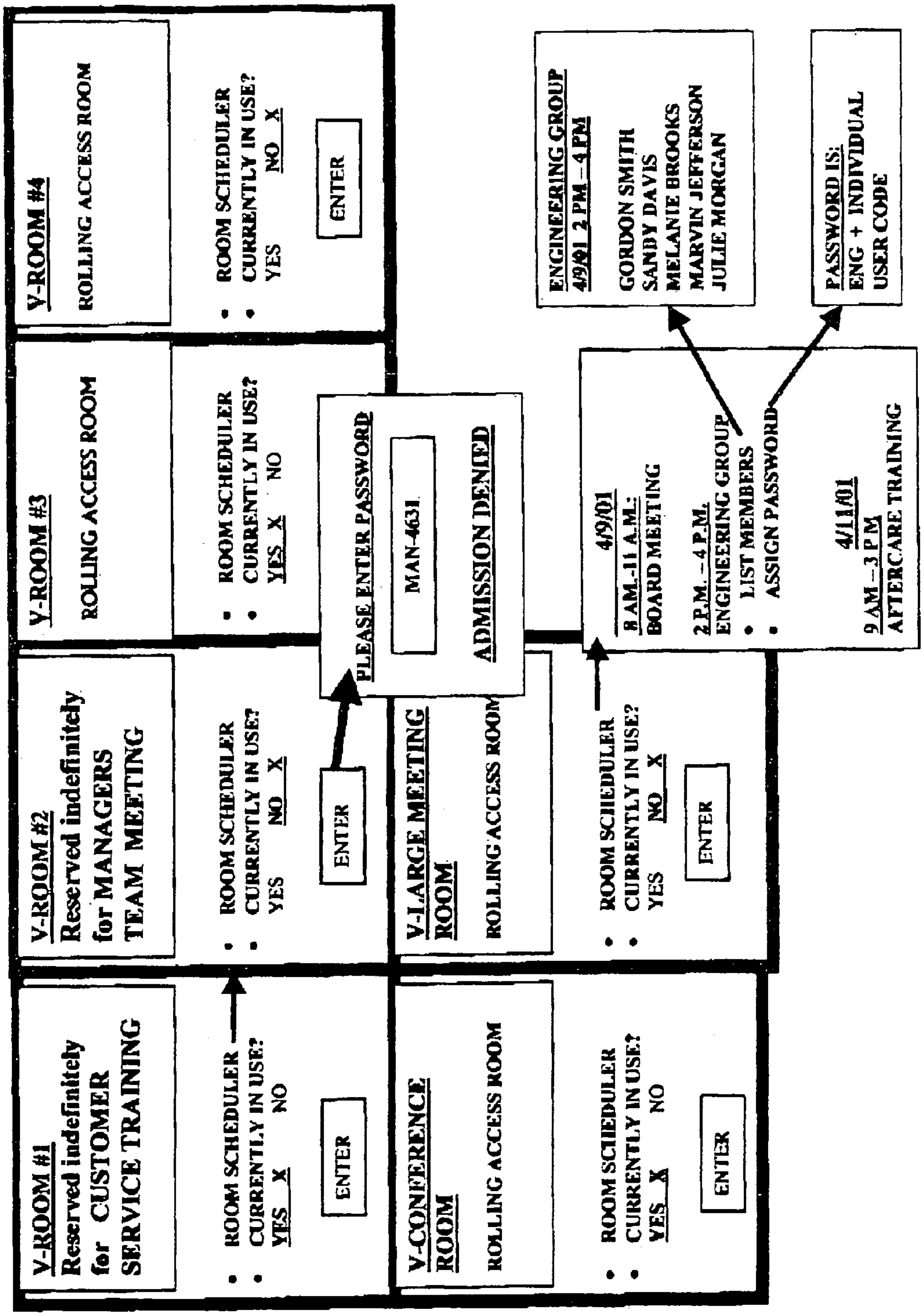

The virtual meeting rooms in the system may be public or limited access (password protected). If desired, the shared virtual meeting place module 126 may include a virtual floor plan (FIGS. 17A and 17B) graphically depicting a plurality of virtual rooms, showing which rooms are occupied, and which rooms are available, and then clicking the "Enter" button 181 to enter the selected virtual group meeting place. Following is an example that will be used to explain this feature in detail. The system 100 is also equipped with a Room Scheduler 128 (FIG. 1), which allows users to schedule the available virtual rooms ahead of time and indicate the persons who are scheduled to participate in meetings held in the virtual rooms. Rooms may be reserved so that people working on a long-term project may come in and out of the virtual room over time. In that case, the room would be scheduled for a block of time, i.e., days or weeks.

Figure 18:
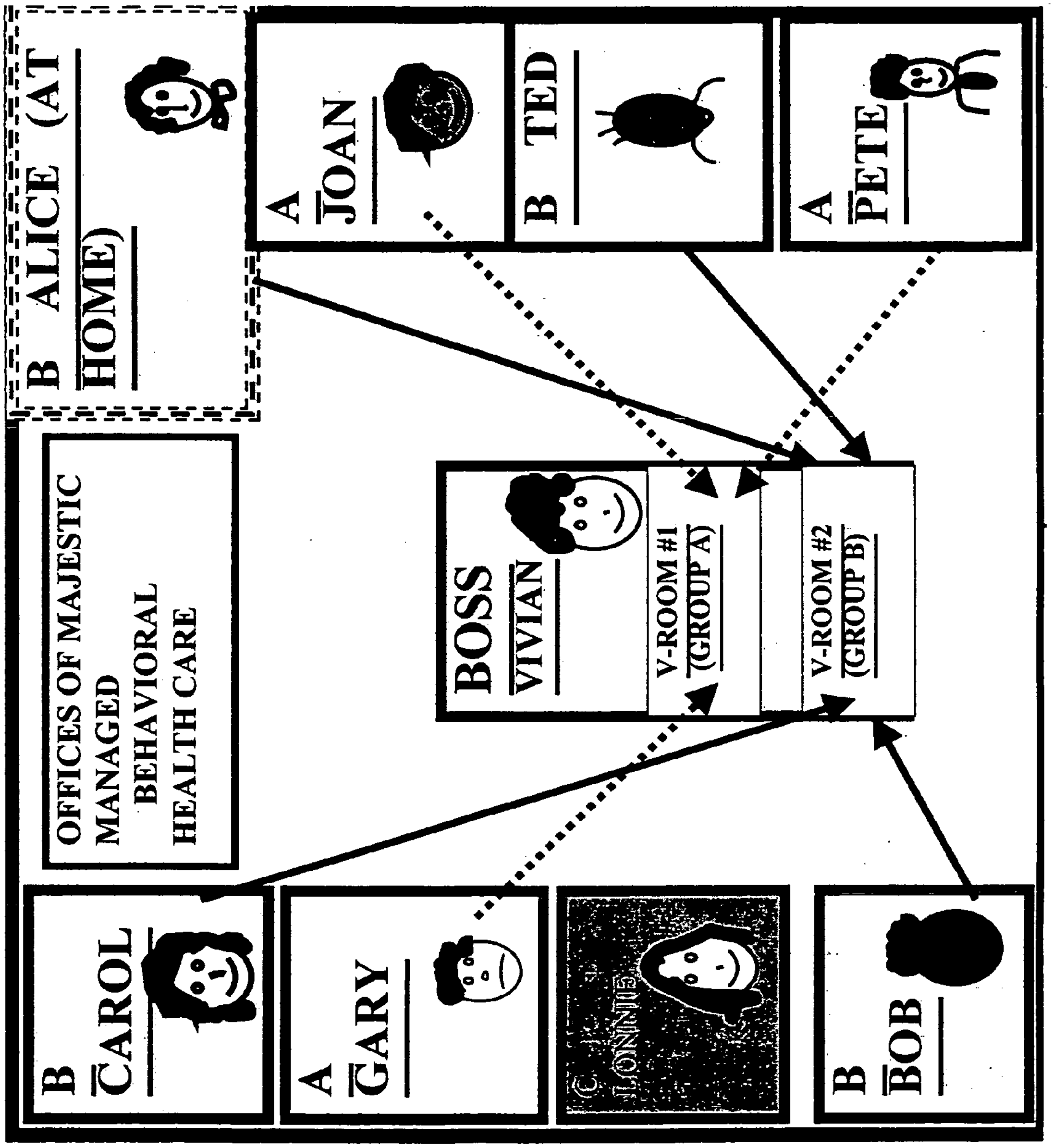
FIG. 18 is a sample layout of an office depicting employees in cubicles who will be entering two different virtual meetings rooms on the system.

The virtual meeting place feature of the present invention will be better understood with reference to the following example in which a managed behavioral healthcare business (FIG. 18) shows a group of employees (Carol, Gary, Bob, etc.) scheduled to attend one or two concurrent meetings ("A" Group and "B" Group), and a boss (Vivian) monitoring both meetings.

The "A" Group (meeting in Virtual Room #1) is working through a structured group program on Customer Service. The "B" Group (meeting in Virtual Room #2) is having a team meeting focused on claims processing.

To access a particular meeting, a user simply clicks on the "enter" button 181 for that virtual meeting place.

Figure 19:
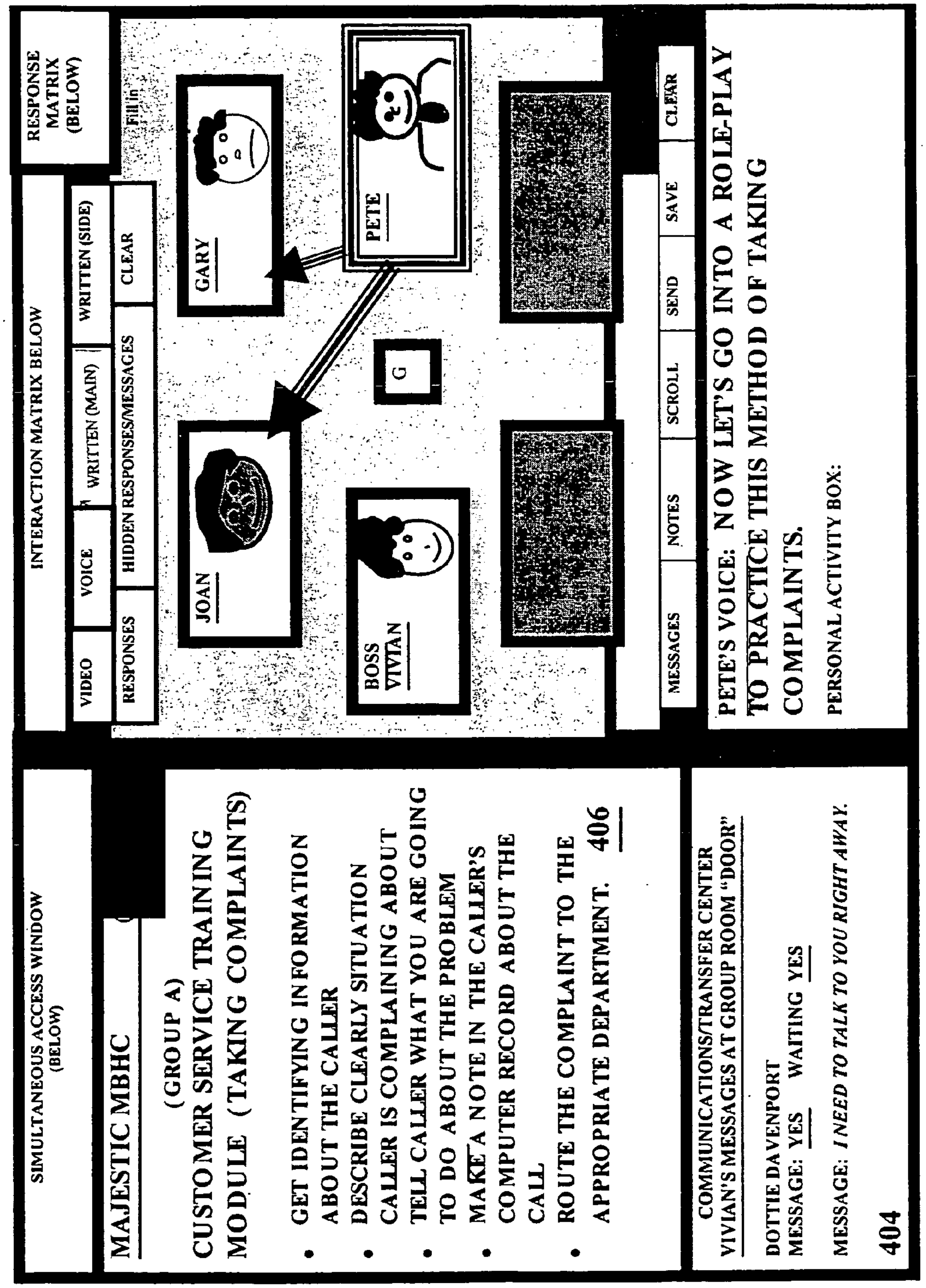
FIG. 19 is a screen print showing a group viewing presentation materials together in the shared access window.

Viewing Presentation Materials Together: As shown in FIG. 19, a group is viewing presentation materials together in the simultaneous access window 406 while participating in the group discussion in the interaction matrix 408. In the example depicted, Group A is working through a customer service training program on "Taking Complaints". This training program advises the customer service representative to get identifying information about the caller, among other things. The participants discuss these materials in the interaction matrix 408 and are directed to try a role-play in order to practice what they have learned about taking complaints. The ability to view presentation materials together in the simultaneous access window 406 while discussing them in the interaction matrix 408 makes the system 100 of the present invention ideal for providing employee training programs, academic courses, and self-improvement groups. The material that is presented may be any type of documents, video clips, films, digital photographs, slide show presentations, or the structured group programs of the present invention.

Figure 20:
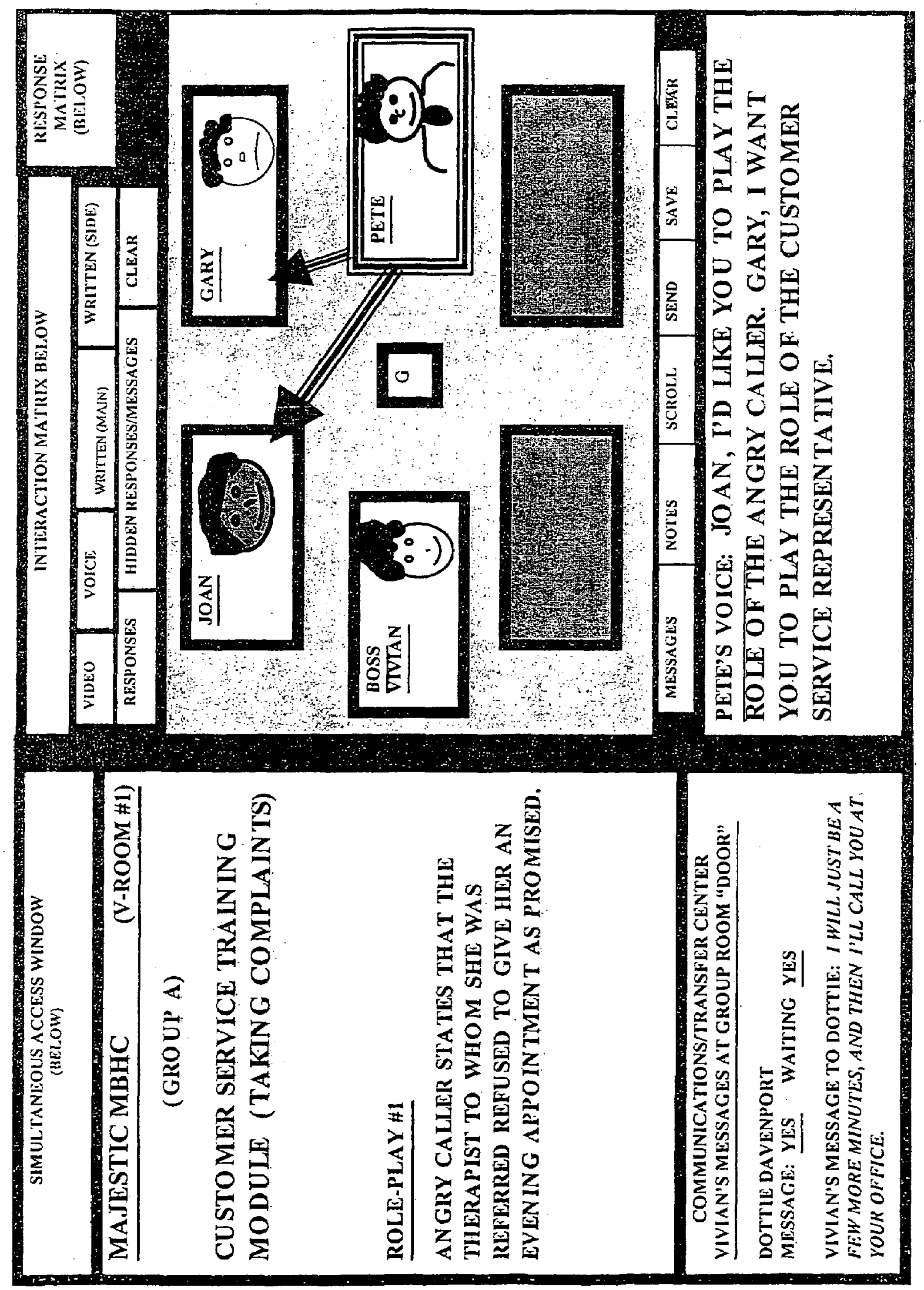
FIG. 20 is a screen print showing group members viewing a role-play exercise while discussing it in the interaction matrix.

In FIG. 20, a Complaint exercises program is displaying Role Play #1 in the simultaneous access window 406. In the example provided, Pete is speaking in the interaction matrix 408, saying, "Joan, I'd like you to play the role of the angry caller. Gary, I want you to play the role of the customer service representative."

Figure 21A:
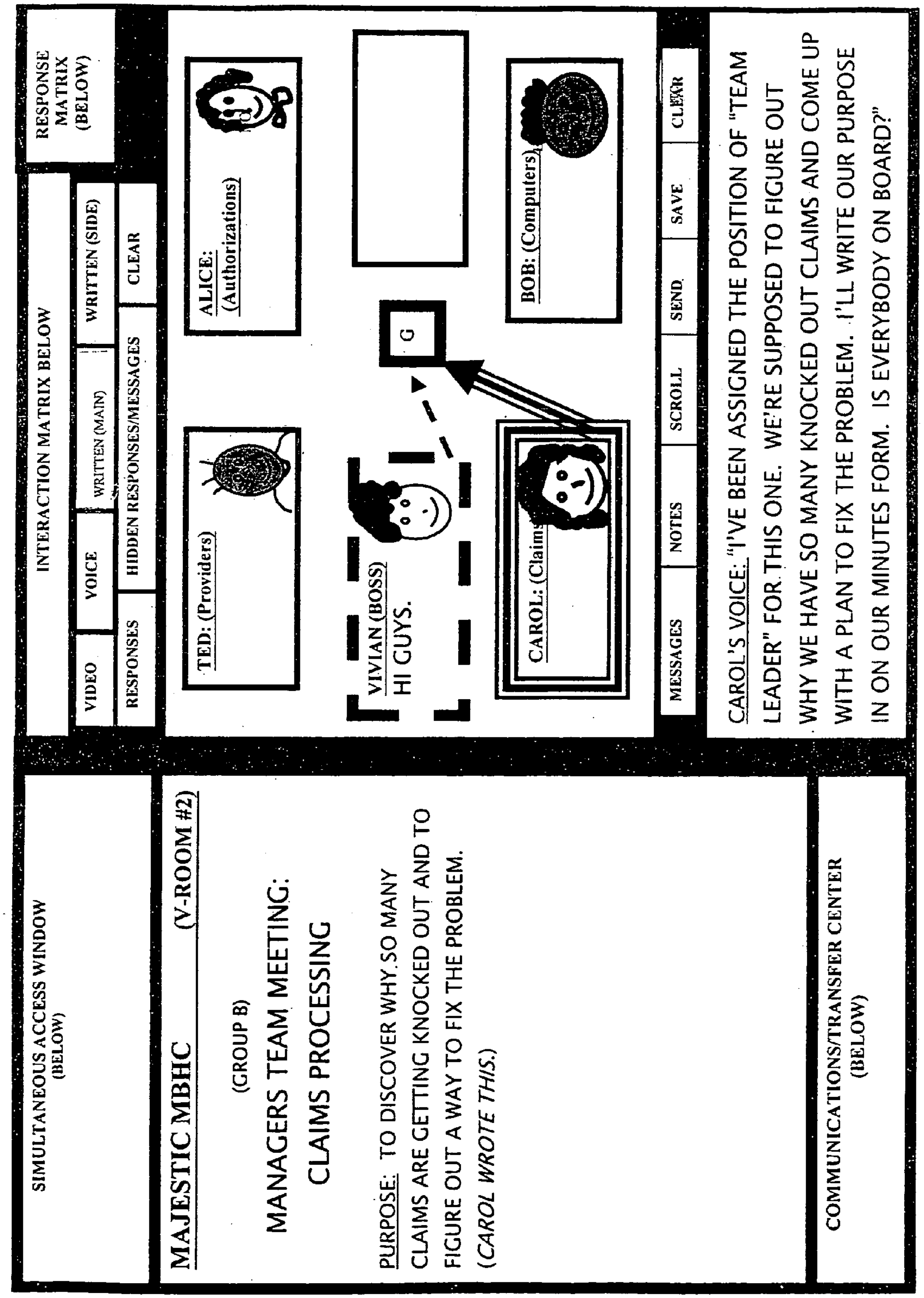
FIGS. 21A and 21B are screen prints showing group members working on a shared document while discussing it in the interaction matrix.
Figure 21B:
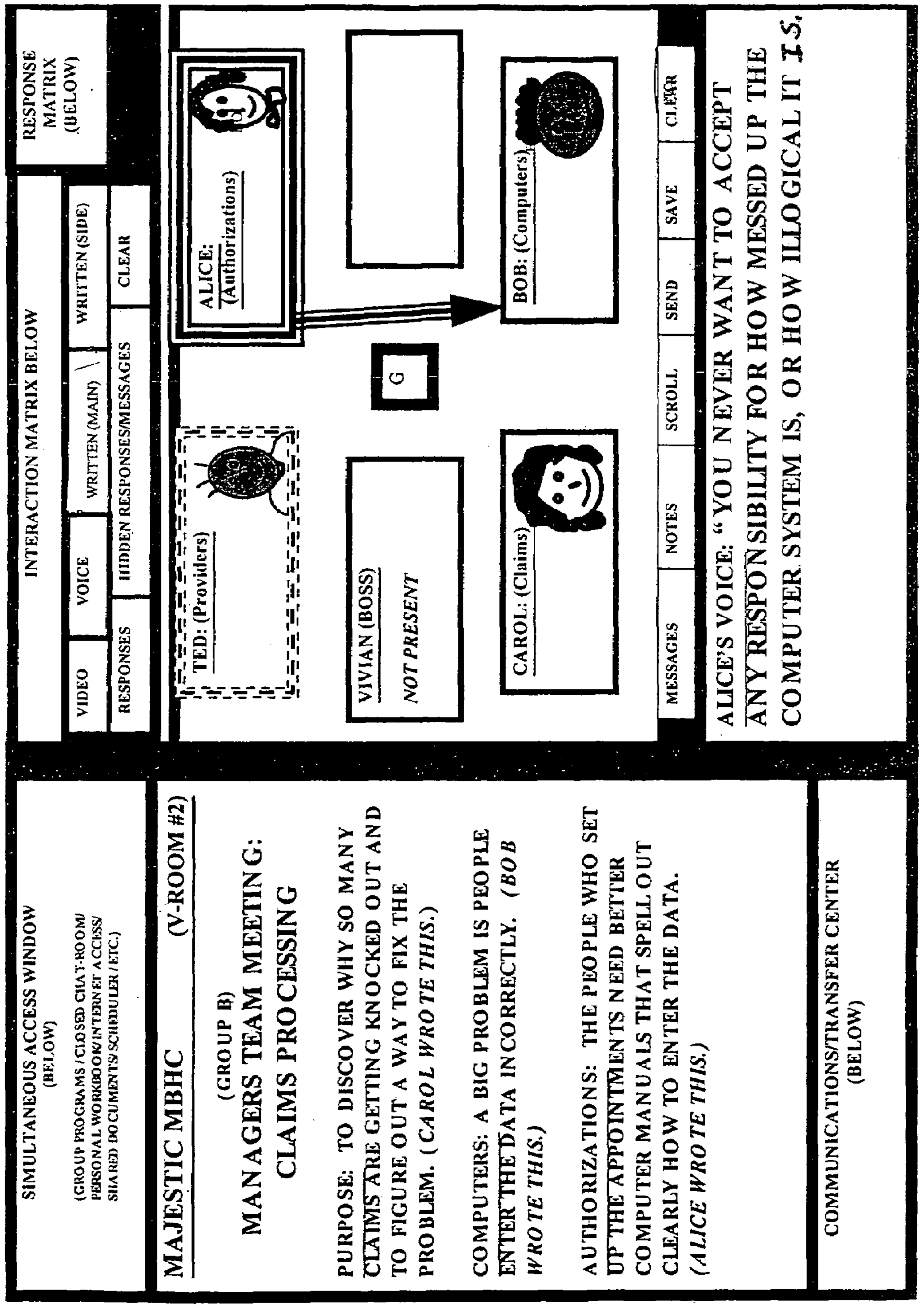

FIGS. 21A and 21B show that Group B is working on an action plan for improving claims processing in the Company. Writing the action plan requires that the group use the shared document feature of the simultaneous access window 406 which enables a group of members to view a document being edited by one of the members while simultaneously communicating via the interaction matrix 408.

Communications Control Center Block: The communications control center 404 provides access to a number of features including a Virtual Group Room "door" Messaging Feature, an Observer Window Feature, as well as connections to the internet, email, office intercom and telephone systems. The operations of the communications control center 404 are controlled by the External Communications Module 150 of the system 100 (FIG. 1).

The Virtual Group Room "Door" Messaging Feature enables the group leader (or Operator) of the system to receive messages from visitors without having to exit any group activity in which he/she is participating.

This feature is illustrated in FIG. 19, which depicts members of a managed behavioral healthcare company in a meeting. As shown, a given member, Vivian, has received a message through the Communications Center at her office "door". She sends a message back to the person at the "door" and decides she needs to leave the meeting.

If the facilitator/leader is present and chooses to invite the visitor into the virtual group meeting room, then the Operator clicks on the visitor's name, then selects "TRANSFER" from the menu in the Communications Center 404, and finally on the "seat" 410 in the interaction matrix 408 where he/she wants that visitor to go in the interaction matrix 408. The visitor has then entered into the group room interaction matrix 408 and is able to communicate and share documents as if they were actually in the same room together. This capacity would require that the visitor entering through the Communications Center 404 have the software for the system 100 downloaded on his/her PC. Moreover, an occupant may have plural visitors simultaneously. However, they must be transferred into the interaction matrix 408 one person at a time. (Or alternately, they may enter the group room by password.)

Observer Feature According to another aspect of the invention, the system 100 may include an observation feature, whereby the group leader (or system operator) may permit visitors to observe group interactions. Optionally, the visitors would be invisible to the group, and only able to communicate with the leader, with communications between the visitors and the leader being invisible to the group. The observer feature allows the leader/operator of the program to create a virtual "observation window" for people who want to learn about group processes. This feature also makes it possible to have rolling membership to open chat rooms or structured group meetings.

The preceding examples clearly demonstrate the system's significant advantages for business. Specifically, the system allows businesses to hold meetings in virtual spaces while being able to "see" all the participants, to view presentation materials together, to access shared documents and external communications systems (i.e., internet email, office intercoms, telephony systems), and to move easily from one meeting to another. There is no currently available team ware or web conferencing system that provides these unique and useful features.

Virtual Environment Builder & Operations System: The Virtual Environment Builder is controlled by module 152 of the system 100 (FIG. 1). The Virtual Environment Builder & Operations System can be accessed by clicking on that heading on the Run Programs Drop-Box of the simultaneous access window block 406 of the present system (FIG. 4). The Virtual Environment Builder Toolbar 424 and the Virtual Environment Operations Toolbar 417 (FIG. 4) would then appear on the user's screen. (Also see FIG. 36 for description of virtual environment builder components and virtual environment operations.)

The virtual environment builder and operations system combines the ability to choose a basic floor plan (e.g. office suite, home, trade show or conference layout); the ability to select type of furniture and equipment for each room in the created virtual environment (e.g., shared document software, slide presentation, movie, chalkboard, video game, television program, internet sites; tables and couches and booths); the capacity to set up "interaction hot spots" where desired (e.g. places that would create their own subgroup of people who could communicate via an interaction matrix); and the capacity for participants to move around the created virtual environment and choose to interact with others they come into contact with or to go from one interaction hot spot to another, or to create different subgroups of people.

Once the virtual environment is constructed, it can host different individuals who may visit the site. The movement of participants throughout the created virtual environment is controlled by the Personal Movement Module 154 of the System 100 (FIG. 1). To move about the virtual environment, the participant clicks on environment overview, clicks on the movement cursor and then on his/her identity place box and drags the box to the desired location in the virtual environment. If the participant wants to communicate with someone else who is present in the virtual environment, he/she can activate the subgrouping function or can click on a specific hotspot interaction area or specific room within the environment. This will bring up the standard operating screen for the particular room or subgroup for interaction. All participants interacting within a particular subgroup or room of the virtual environment can be reached through the "Announcement" function previously described.

This unique improvement to the system of the present invention would allow a person to have a virtual "house party" and have different activities set up in different rooms, and the guests could wander about the house interacting with different subgroups of people and participating in different activities as desired. This feature would also allow for a business organization to put on a trade show consisting of different booths where visitors could stroll from booth to booth, asking the person in each booth questions about the product and viewing selected presentation materials together. Finally, this feature could allow for an organization to hold a duplicate bridge tournament providing separate rooms for each group of players to play (and converse) as allowed.

The Virtual Environment Builder and Operations System can be used to bring people attending a meeting or conference in "real-life" together with people who are attending the meeting via computerized networks. Specifically, people attending a "real life" trade show can be provided with electronic wristbands that transmit their location onto the overview of the virtual environment. When a "real-life" participant enters a particular show room, that person can interact via computer with other participants visiting the trade show through virtual means only. The "real-life" participant can view the same presentations (poster boards, videos of products, slide shows, etc) that the virtual participants are viewing and discuss them together. The electronic wristband can be equipped with lights that signal someone is requesting to communicate with the person. If the participant wanted to communicate with the person making the request, he/she would find a computer, access the virtual environment and enter into a subgroup or interaction hotspot with the participant making the request.

This method can also be used to bring together people who are present at a "real-life" meeting and those people who are participating virtually only. Nowadays, many business meeting rooms provide jacks at every seat around the table (or wireless capabilities) so that every "real-life" participant can also plug into computerized systems. The system of the present invention would allow for three or four people, each equipped with his/her own laptop computer, to meet together in "real-life" (and via computer) with three other people who are participating via computer networks only.

Finally, this method can be used to bring different "real-life" environments to groups of people who cannot visit them in "real-life". People can experience different settings with colleagues, classmates, or family members via the system of the present invention. For example, someone attending an art museum with a video camera could project the images of the art onto the simultaneous access window of the present invention. In this way everyone could visit the museum together and discuss the different pieces of art through their computers. For another example, someone on a trip to a foreign country could project his video of the places he is visiting directly onto the simultaneous access window of the present invention for all those interacting with him at the time to view and discuss via the present invention.

Figure 33A:
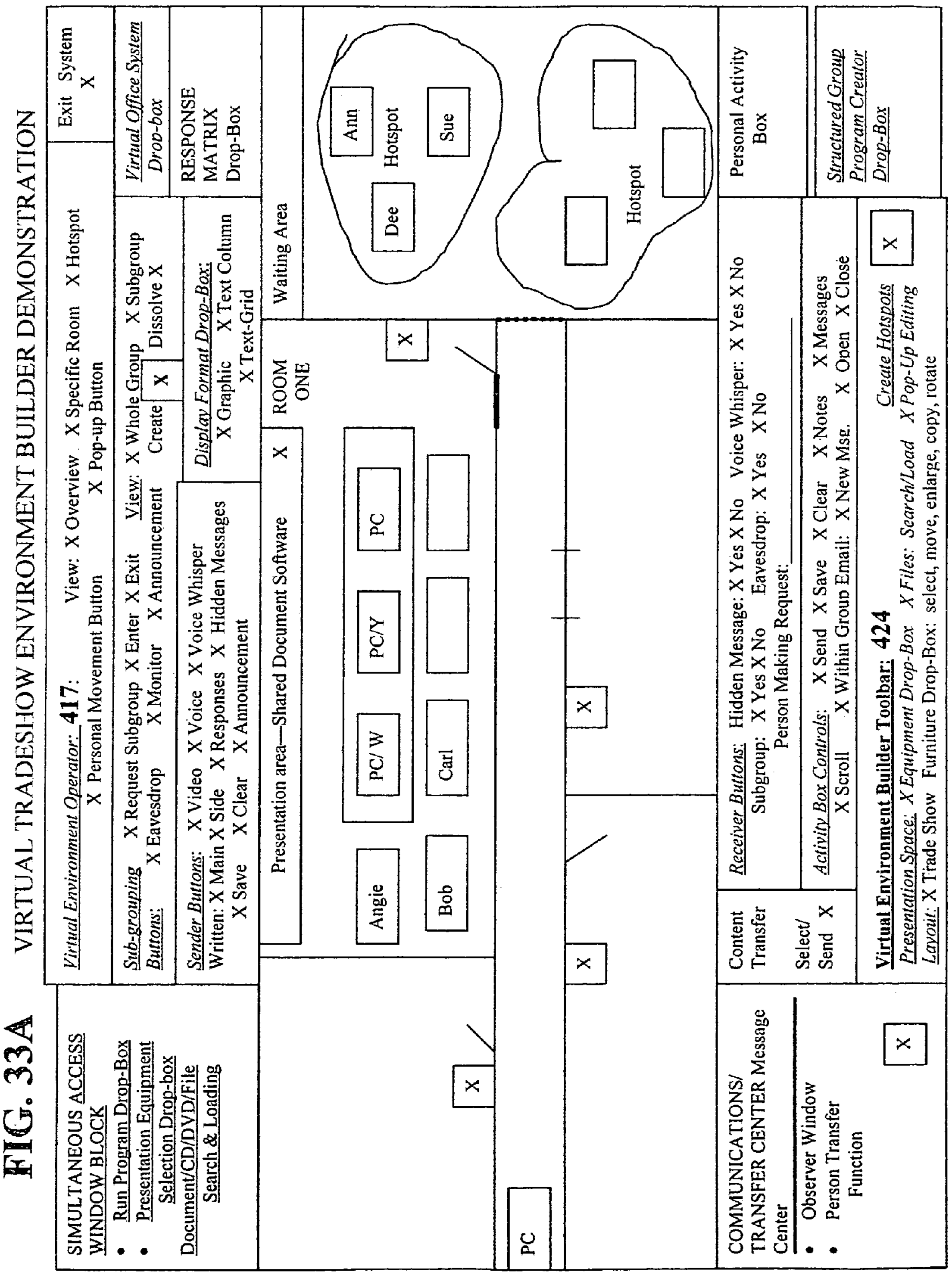
FIG. 33A provides a demonstration of the virtual environment builder system.

FIG. 33A provides a demonstration of how the user builds a suitable virtual environment for his/her purposes. The process involves clicking on the Virtual Environment Builder Toolbar and selecting the type of floor plan desired (office suite, home, conference, tradeshow, etc.) This causes a screen to pop up displaying the selected floor plan. The user would then click on "Equipment" and select the desired equipment for use in each room of the virtual environment (e.g., DVD player, shared document software, karaoke, chalkboard, computer game, etc.). The user would also click on Files/Documents/Programs and upload any materials desired for use in each room. The user could also click on "Furniture" and select what furniture he/she wanted in each room. Then the user would click on "hotspots" and click on the floor plan where he/she wanted these to be located. Usually a person would choose to locate a hotspot at a table surrounded with four chairs or in another sitting area or natural conversation area.

In FIG. 33A, the user is building a tradeshow virtual environment. Hotspots in the Waiting Area have been constructed along with one meeting room equipped with shared document presentation software.

Figure 33B:
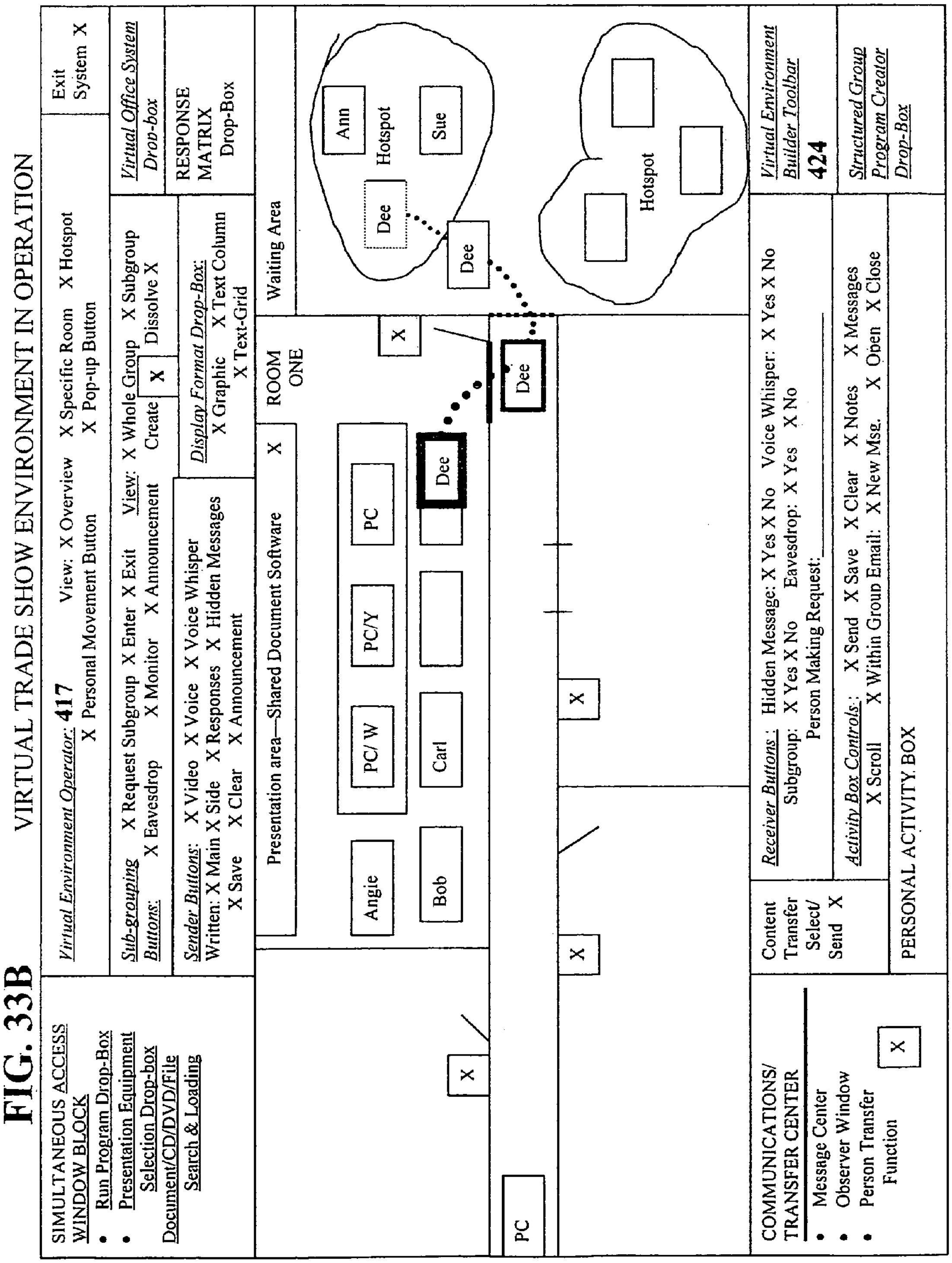
FIG. 33B shows a screen print of a sample virtual trade show environment in operation.

FIG. 33B shows the operation of the "trade show" virtual environment depicted in FIG. 33A. FIG. 33B shows the trade show layout overview with different rooms set up with different presentation equipment, interaction hotspots, place boxes of "real-life" participants and virtual only participants, and subgroupings. To enter a specific room of the virtual environment using the standard operating system 400, the participant would click on the room or subgroup view on the toolbar 417 (FIG. 4). FIG. 33B is demonstrating how Dee is moving within the virtual environment from the Waiting Area into the hall and then into Room One where several users are participating in a presentation using shared group software.

FIG. 33C shows the interaction and activity occurring in Room One of the tradeshow virtual environment depicted in FIGS. 33A and 33B. The interaction matrix is set on graphic display format. In FIG. 33C, Dee, Bob, PC/Y, Carl, PC/W and Angie are all participating in a presentation of "Guidelines for Becoming Financially Independent" via a shared document software presentation. Dee is sending a written message to PC/W saying, "Are you in debt?" Bob is requesting to send a hidden message to PC/Y, and this is indicated by dotted lines around Bob's place box and a dotted arrow to PC/Y's place box. The screen print is that of user PC/Y. It indicates that Bob has requested to send him a hidden message and that PC/Y has indicated that he is willing to receive the hidden message. The specific hidden message appears in PC/Y's personal activity box and says, "Hey, let's go find something else to do. This is boring."

Figure 34A:
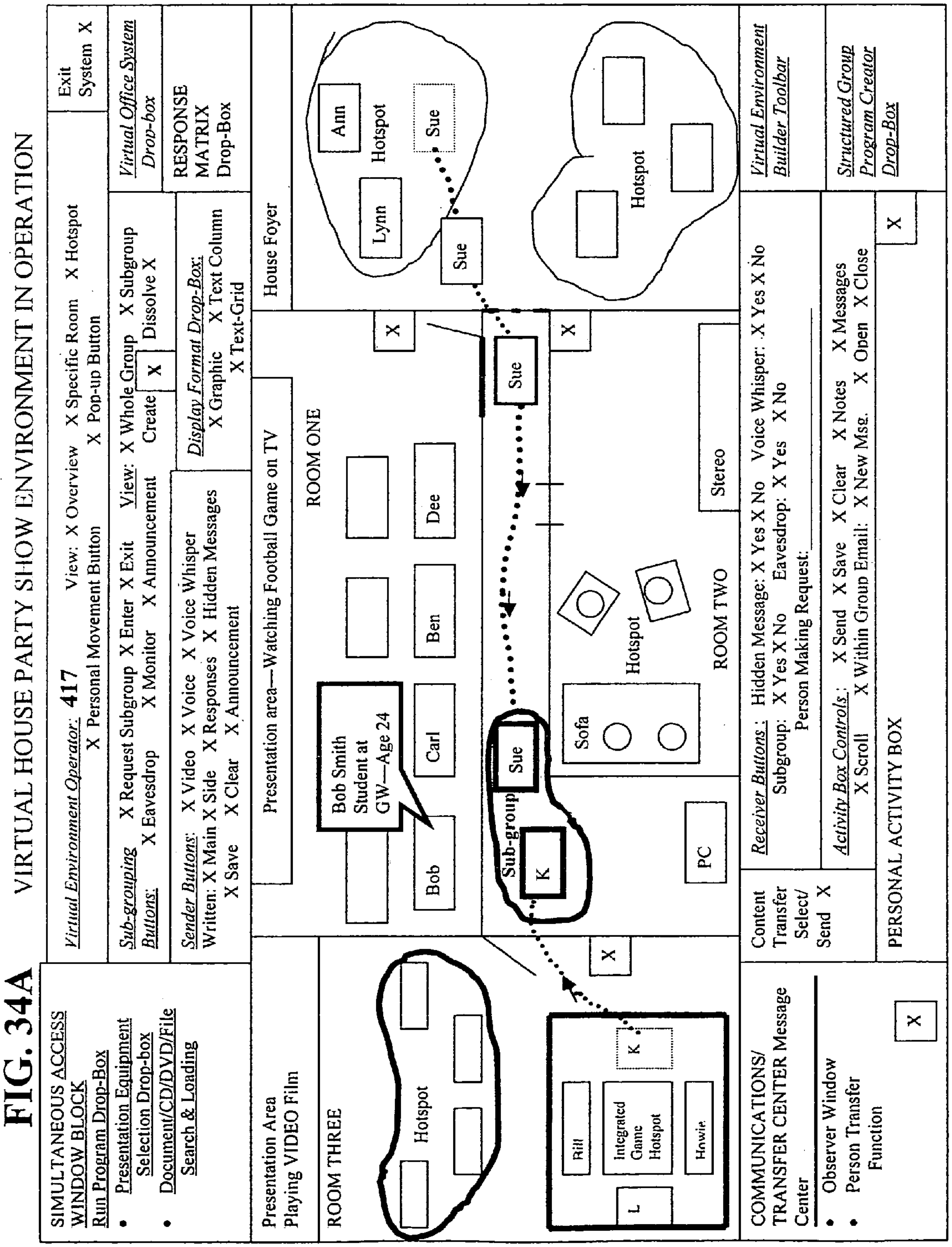
FIG. 34A provides a screen print of a sample virtual home environment holding a party using the Virtual Environment Builder and Operations System.

FIG. 34A show the operation of a "house party" virtual environment. FIG. 34A shows the house layout overview with interaction hotspots, place boxes of participants and subgroupings. To enter into a specific conversation or to enter a specific room in the system, the participant would click on the room or subgroup view on the virtual environment operator toolbar 417. This would bring up the interaction system with the simultaneous access window and interaction matrix for the specific room or subgroup. FIG. 34B shows that Sue is moving away from the hotspot area in the House Foyer, proceeding down the hall until she runs into "K" and forms a sub-group with him to allow interaction. In Room One the user of the illustrated system has clicked on the Pop-Up button and Bob's place box to reveal some information about Bob. The Pop-Up Button can also be used to find out information about different presentations and directories for the virtual environment.

FIG. 34B shows a specific room from the virtual house party environment depicted in FIG. 34A. In Room One, Bob, Carl, Ben and Dee are talking while watching a football game on television. The interaction matrix is being displayed in the text-row format. Bob is saying, "I'm bummed" through a self-statement. Dee is sending a main message to Carl saying, "How's your favorite player doing?" Carl is requesting to whisper to Ben. Ben is agreeing to receive Carl's voice whisper. The content of the whispered voice message is written in Ben's personal activity box for demonstration purposes only. Carl whispers to Ben, "Hey, Dee is really hot. Does she have a boyfriend?"

Method for Providing Structured Group Programs: As discussed in the Background of the Invention, there are serious limitations to the current methods of providing structured group programs (or skills training programs) over computer networks, as well as problems with existing methods of computerized group discussion in general.

The system 100 of the current invention overcomes many of the shortcomings of conventional systems by:

- Providing and Organizing Content Material Presented in Group Programs;
- Teaching Group Communication Skills and Providing Opportunities for Practice;
- Giving and Receiving Appropriate Feedback;
- Strengthening Group Cohesion;
- Providing a Place for Keeping Personal Records and Materials;
- Providing a Setting Where Group Participants Can View Presentation Materials Together;
- Providing Ways for Group Members to Work Together Outside of Regularly Scheduled Meetings;
- Providing Tools for Group Leaders to Manage Group Process; and
- Providing Website or System-Wide Programs (e.g., Scheduler/Matcher, a Resource Director; a Professional Leaders Registry, Open Access Bulletin Boards and chat rooms, etc.) to meet the needs of the general population accessing the group services delivery system.

Each of the above-listed components of the system of the present invention for providing structured group programs over computer networks is described in detail below.

Providing and Organizing Content Material Presented in Group Programs: The system 100 provides a means of accessing, organizing and delivering content materials through the structured group program player module 146. The content materials may include lecture materials, special training exercises, group prompts, response matrix vocabularies, assessments & feedback measures, and an on-line workbook all related to a specific topic. Thus, presentation materials are organized and presented in a way that is unique to this system.

For example, a structured group program focused on the topic of improving social skills may include lecture material about what the different types of social skills are (like making a request, saying "no", meeting someone new, or joining in an ongoing social activity. The Training Exercises in this social skills program might present different social situations to participants and have them practice assertive responses. The response matrix 412 in this social skills program could be customized to include a list of things to consider when responding assertively in those situations (like what are your objectives, what is the relationship, what are your rights, etc.) The social skills program may have a Social Anxiety Assessment Inventory as part of the program to help give the leader and the participant information about changes in social anxiety as the program progresses. Further, the social skills program workbook could provide homework assignments that instruct participants to seek out challenging social situations in the real-world, practice newly learned skills, keep track of all of the challenging situations they encountered and how they handled the situation, and then later report their experiences back to the group.

Teaching Group Communication Skills and Providing Opportunities for Practice: The system 100 provides a convenient way of teaching group communication skills and providing opportunities for practice through the group training exercises, group prompts, and modifications that can be made to the response matrix vocabulary list. FIGS. 24A and 24B show sample materials for an interaction training manual.

The set of group training exercises provides opportunities for practice by listing different role-play situations for group participants to act out during group meetings. In addition, the items of the response matrix 408 can be programmed to correspond with specific training exercises. For example, one training exercise teaches people about various ways of responding to different types of statements by another person. One such statement that is included in the role-play exercise is, "I spent all that time interviewing and negotiating for that job, and now they say there isn't even a position any more." Some of the types of responses, also provided as items in the response matrix under the head "Response Styles", include the detective style, the foreman style, the magician style, and the swami style. By practicing different response styles, participants learn about their own styles of responding, their reactions to the responses they hear from others, and possibly, which new responses they wish to incorporate into their repertoire.

The list of prompts is a list of statements, (typically prepared by the Leader), that may help facilitate group interaction or the acquisition of new skills related to the topic of the program. The following are examples of Prompts:

"It seems like things are happening very fast. Why doesn't someone summarize what has happened over the last 5 minutes."

"The group seems to be breaking up into several different segments, with several people forming a sub-group. What do you think that is about?"

"What do you think is getting in the way of your following through on your plan?"

If a user clicks on the list of Prompts and wants to use one of the statements in the ongoing group discussion, all she has to do is copy the statement to her Personal Activity Box 420 where it can be edited and then sent as a message in the Interaction Matrix 408.

Giving and Receiving Appropriate Feedback: The system provides ample sources of giving and receiving appropriate feedback. As discussed in an earlier section, participants may rate their satisfaction with the group via the ratings module 120 (FIG. 1). These data can be analyzed by the statistical methods module 118 and then feedback can be provided to each participant in Personal Feedback Reports (discussed previously). Information about each participant's activity level in the interaction matrix 408 is recorded by the activity counter 116 and reported to participants and the leader in feedback reports (discussed previously). Special assessment measures can be given to all group participants, then scored in the Assessment Module 124, and then reported to the Leader and the participants (discussed previously).

Strengthening Group Cohesion: The system 100 provides several features that strengthen group cohesion, or attraction for the group. Limited Access Virtual Meeting Rooms (closed chat rooms), blackboards and bulletin boards all provide opportunities for group members to interact more frequently than is provided during scheduled meetings alone. More frequent positive interactions lead to greater group cohesion. In addition, the system provides a method for group members to be reminded about all of the other group members, as well as what their goals might be, and what homework they are currently working on. Having more information about group participants helps to strengthen group cohesion as well.

Figure 26:
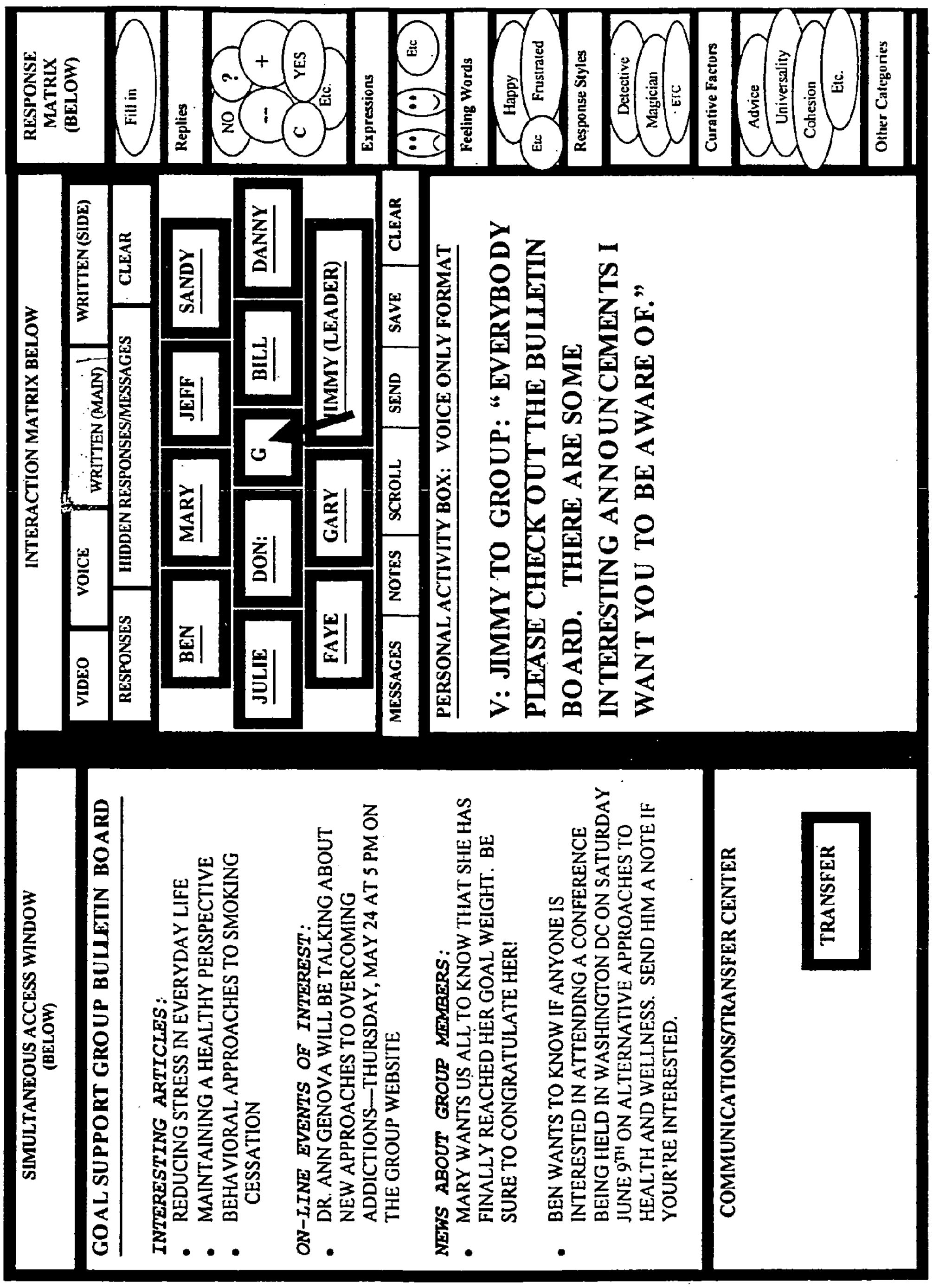
FIG. 26 shows a sample screen print of a bulletin board for a closed membership group.

A bulletin board module 142 (FIG. 1) allows members of the group to post various articles or updates for the group. Preferably, access to the virtual bulletin board is limited to only the specific members of the group. FIG. 26 shows a sample screen print of a group viewing a closed bulletin board during a group meeting.

Figure 27B:
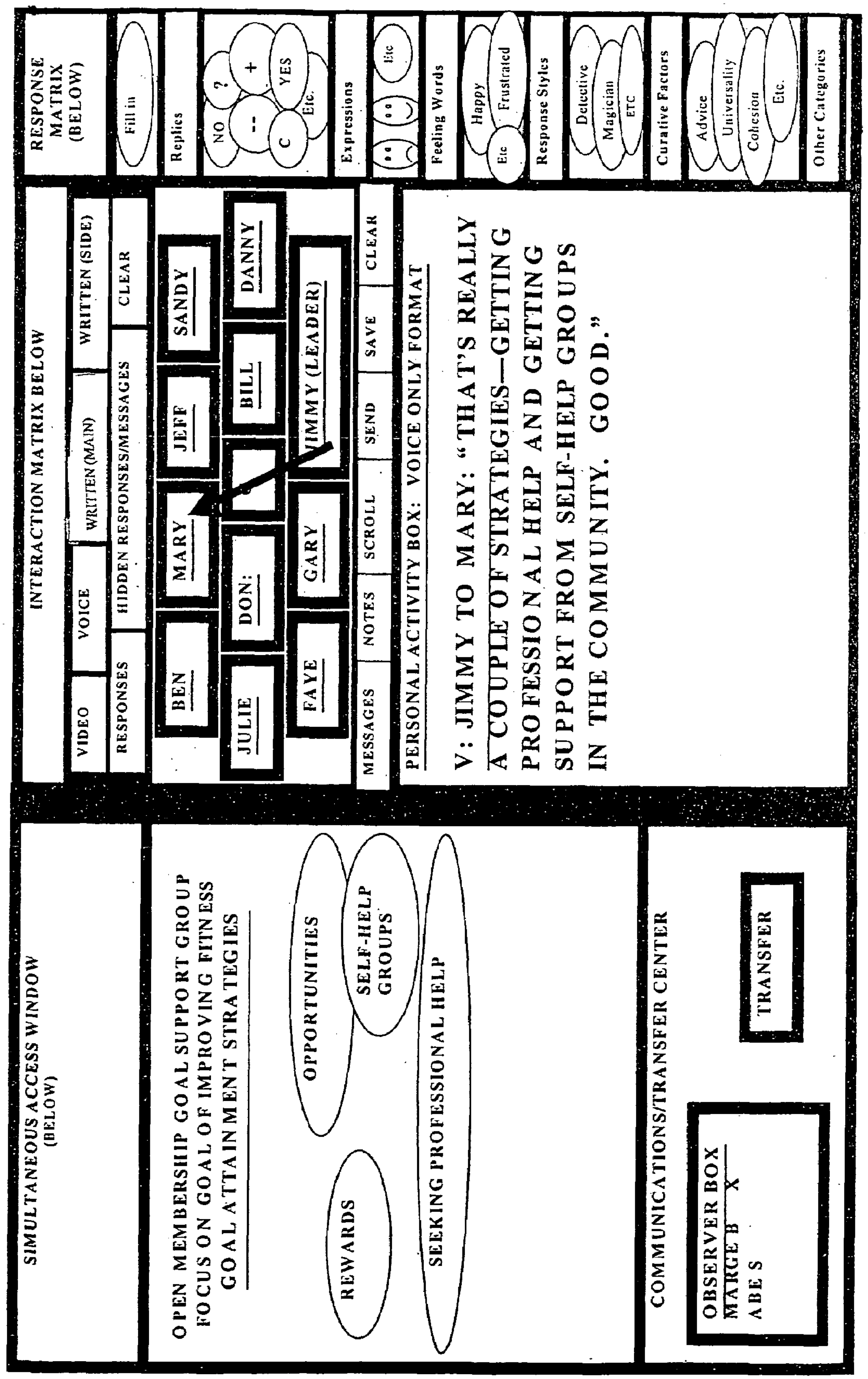

A chalkboard (blackboard) module 140 (FIG. 1) allows group members to draw on a virtual chalkboard screen with a pointing device such as a mouse or a light pen. FIGS. 27A and 27B show sample screen prints of a group using a chalkboard during a group discussion.

Both the bulletin board and the chalkboard can be accessed while the participant is participating in a group discussion in the interaction matrix 408. Participants access the bulletin board and chalkboard (blackboard) by clicking on the "shared group access" files in the simultaneous access window 406.

Providing a Place for Keeping Personal Records and Materials: The system 100 includes a journal module 130 for storing and accessing personal records and materials.

The individual records or programs of the present invention include such things as the on-line workbook, personal notes, personal documents, attendance records, and personal feedback reports.

According to a presently preferred embodiment, the system 100 provides each participant with an on-line workbook for each structured group program. The on-line workbook may be accessed during group meetings through the simultaneous access window 406 without having to exit the group process.

The on-line workbook may consist of exercises, charts to monitor progress, a place to keep track of homework assignments, and a record of all the personal Feedback Reports received during the program. FIGS. 23A and 23B show sample on-line workbooks according to the present invention.

The system 100 includes a predefined (default) on-line workbook for all structured group programs. If desired, the on-line workbook may be customized by the group leader. Or completely new workbooks can be constructed and stored for later use on the system.

Providing a Setting Where Group Participants Can View Presentation Materials Together: As discussed in a previous section, the simultaneous access window 406 provides a way for group members to view presentation materials together. These materials can be specially programmed to focus on a particular topic area. The presentation materials may consist of documents, video clips, slide presentations, live lectures, group training exercises, workbook or homework assignments and special closed bulletin board materials.

Providing Ways for Group Members to Work Together Outside of Regularly Scheduled Group Meetings: The system provides two important ways for group members to work together and communicate outside of regularly scheduled group meetings: closed group meeting rooms (provided by virtual meeting room module 126) and within group e-mail system.

The closed group chat room feature allows the specific members of the group to use the system even when a regular group session is not scheduled. Thus, group participants are provided with a virtual meeting place where they can work on shared documents or projects and where they can communicate with each other in the interaction matrix 408 at all times.

According to another aspect of the present invention, a within group e-mail module 132 (FIG. 1) is provided to enable group members to send e-mails to other members of the group without having to exit the group interaction matrix 408. For example, if Don wants to send a within-group e-mail to Jeff, he simply clicks on e-mail, then on Jeff's name, then a box appears in the simultaneous access window 406, where Don can write the e-mail and send it to Jeff.

The within-group e-mail system 132 is especially practical when a participant is working on a group project and realizes she has a question for a particular group member who does not happen to be in the closed chat room while she is there. In that case, she simply clicks e-mail and sends the message without having to leave the interaction matrix 408.

Within group e-mail as a component of the overall system is also important for the Leader in particular. The Leader will often write notes to each group member at the end of a group meeting. These notes may be responses to questions that participants have asked on the Post-Group Questionnaire. Or the Leader may simply want to ask the individual participant a question about his reaction in the group (ex parte communication, so to speak).

The within group email system 132 plays an important role in facilitating communication between members of a closed group who want to communicate anonymously, withholding information about their identity and regular email address from the group members. It is a common practice to engage in on-line discussion groups and chat rooms while remaining anonymous. The within group email system allows members to communicate outside regularly scheduled group meetings without compromising anonymity.

Therefore, while e-mail per se may be ubiquitous, it has an important role in the overall system of this invention for providing structured group programs over computer networks.

Providing Tools for Group Leaders to Manage Group Process: The system provides several tools for leaders to manage and direct the group process. The "Leader Access" heading in the simultaneous access window 406 drop-down-box lists all of the programs that the Leader controls in the system. The leader controls what structured group programs will be "played" and navigates through the various screens of each of the programs that are displayed in each participant's shared access window 406. The leader controls when the Ratings screen appears in the interaction matrix, as well as when assessment measures appear in the simultaneous access window 406. The Leader receives special Feedback Reports that combine the information about all group members into one report, facilitating the understanding of the group's dynamics. The leader also sets the format for the interaction matrix 408 and the closed meeting rooms described above. In addition, the Leader may use the within group e-mail system to communicate individually with each group member if desired.

System-Wide Features: As described above, the system 100 may include a Scheduler 128. In addition to scheduling virtual meeting rooms, the scheduler 128 may provide a list of group offerings and meeting times, and enable users to register for a particular offering. For example, users may be provided the option to select a Lay Group, or a Professionally Led group. They can choose to participate in a group with Written Only Format, or Voice Only Format, etc. They can also choose to sign up for a heterogeneous or homogeneous group. See, e.g. FIGS. 25A-25C.

The system 100 includes a security module 134 (FIG. 1) that includes, among other things, a password system for individuals to sign onto groups having a restricted access (such as closed groups with the same membership and group leader meeting over an extended period of time). When signing onto the group, the participant will enter his/her own password and the group password, which will give him/her access to one of the positions on the group interaction matrix 408.

A Professional Leaders Registry 136 (FIG. 1) provides a list of professionals who are leading groups on the system 100. The Registry 136 provides information to the customer as to the qualifications of professionals, and it will also provide a format for professional leaders to "advertise" their services to the public. Only those people who have received training in leading groups will be permitted to register. The Registry 136 contains biographical information about the registrant as well as what groups (and what time-slots, number of group meetings) each registrant is leading or will lead, and provides a sign-up sheet for visitors to reserve a space in each group. Users access the Professional Leaders Directory through module 136 (FIG. 1) of the present system.

A Resource Directory 138 (FIG. 1) contains reviews of publications in the fields of business, health, psychology, self-improvement and other content areas. The Resource Directory 138 may also be customized to include literature reviews of only those publications that have direct relevance to the topic of the specific training program.

Creating New Structured Group Programs: The system 100 provides a Structured Group Program Creation/Distribution Module 146 (FIG. 1) for creating new self-contained structured group programs that can be distributed for use over multiple computer systems in compact disk format. The Structured Group Program Creator/Player System can be accessed by clicking on that heading on the Run Program Drop-Box 401 of the simultaneous access window block 406 of the present system (FIG. 4). Once accessed, a structured program drop-box 426 will appear on the user's screen. See FIG. 36 for a description of the structured group creator system's components.

The essential components of the structured group program of the present invention include the following: 1) the means for accessing and delivering content materials specific to the structured program (module 144); 2) a setting where presentation of the content materials can be viewed together by the group participating in the specific program (module 126); 3) the means to discuss and practice information/skills included in the content materials (Modules 104, 106, 108, 110); and 4) the means to assess progress or learning of the skills/content materials (modules 120, 124). The Structured Group Program Creation/Distribution Module 146 coordinates the functions of the File Access/Transfer/Storage module 144, the Virtual Meeting Room Module 126, the Communications 104 and Graphical Communications Flow Module 110, and the assessment module 124, to provide the essential components for creating a new structured group program for use on the system 100.

Optionally, the Structured Group Program Creation/Distribution Module 146 may also provide the means for coordination of other modules of the system 100, including the response matrix 112, Ratings Module 120, Journal Module 130, and Bulletin Board Module 142, etc. Once a new structured group program is created, the program can be distributed via compact disk where it can be played on multiple computer systems and venues providing for uniform use of the program. For example, a specific program for developing social skills could be distributed on compact disks and the program would be delivered in a uniform way to computer users everywhere.

The Structured Group Program Creator/Player Module provides the user of system 100 with a blank program outline of the structured program and prompts the user to fill in for all the desired components of the program to be created. FIG. 35 provides a list of a selected number of components that can be filled in to create a new structured program that can be saved and transferred to CD format. The system allows the user to select files/materials to be used in each lesson of the specific group program. The user can select what equipment will be needed (DVD players, slide presentation players, chalkboards, etc.). The user also selects workbooks and assessment materials that will be needed to complete the program. The user also can customize the Feedback Response Matrix with categories needed to work through the specific structured program. The user can also select assessment measures that will be used and set up special Ratings and Prompts of the present system. Each lesson of the structured program can recommend exercises and role-plays and discussion topics (for use in the interaction matrix) that will facilitate the participants in learning and practicing the material. The lessons may also instruct participants to break up into smaller groups using the subgrouping feature of the present invention. The user may also select a preferred type of interaction matrix display format (graphic, text-column, text-row or text-grid).

Once the structured program is completed, it can be saved and transferred to CD where it can be distributed in a standardized format for multiple computer systems and venues. The structured programs can also be directly downloaded from Internet sites licensed to supply such programs.

By manner of illustration, FIG. 22 shows an example of how the structured group components are customized to create a goal-supporters group program and a group-supported social skills training program.

Specific Application—Goal Attainment Supporters Group Program: As discussed in the Background of the Invention, the currently available self-improvement group programs available over computer networks have serious limitations. Many of the existing programs are offered to people with serious emotional problems or addictions. Presumably people who do not suffer from such serious problems could potentially be unwilling to participate in programs like these. However, the goal attainment supporters program of the present invention could be appealing to large numbers of people who could benefit from support for attainment personal goals, whether or not they suffer from serious emotional problems or addiction disorders. People could choose whether they wanted to participate in a professionally led group or a lay, "leaderless" group. People could choose whether they wanted to participate in a homogeneous group (e.g., a group of people all working on the goal of improving fitness, or a group of people who are all students at a particular university) or whether they wanted to participate in a heterogeneous group (e.g., a group of people working on all different kinds of problems, or a group of people from different ages living across the entire nation). Offering such a program in the context of a full service, large scale internet site (with components such as a scheduler/matching system, password access system, professional leaders directory, resource directory/search engine, bulletin boards, closed chat-rooms and security systems) would ensure that the needs of large numbers of people desiring support for working on their personal goals could be met.

The two main objectives of the Goal Attainment Supporters Group Program are: 1) to teach skills in how to utilize group support for attaining goals and 2) to help every group member come up with a plan for working on the personal goals they have chosen (e.g. improve fitness, improve work relationships, give up a bad habit, take on a new hobby, etc.) The program can be operated along the lines of the 12-Step Model of "Alcoholics Anonymous", in which case the group could be called a "Goal-Supporters Anonymous" group. Or the program can be operated as an adjunct to other counseling programs a person is receiving. For example, a person receiving individual therapy for depression may be encouraged to participate in a goal supporter's program where he could receive support in working on the goal of becoming less isolated. People could attend goal attainment supporter's groups via computer networks or in real-life settings.

The Goal Attainment Supporters Program encourages people to write down their goals, learn what resources are available to them, develop a strategy for attaining each goal, and make regular assessments of their progress. It is generally thought that getting a goal down in writing makes it more concrete and increases a person's sense of commitment, creating a contract with oneself. It is also likely that writing goals down produces a greater sense of "cognitive dissonance" or discontinuity between what one's stated objectives are and how one is actually behaving. Letting the group members know what one's goals are also increases the dissonance between what is being said versus what is being done about a specific issue. For example, if John writes down that he wants to cut down on his television viewing (and perhaps tells his goal support group about his goal), then he is more likely to experience discomfort if he finds himself sitting in front of the television for hours one afternoon. Hopefully this dissonance will motivate John to get up and do something else.

The Goal Attainment Supporters Group Program has specific steps for attaining personal goals, which are outlined below:

a) complete specially developed assessment measures to help identify areas in their lives where they would like to improve or change;

b) list specific goals aimed at addressing the areas identified for self-improvement;

c) monitor thoughts, behaviors and events associated with the desired changes;

d) set up step-by-step action plans for attaining each goal;

e) perform periodic assessments of the progress made on each goal;

f) complete on-line training modules in group process, leadership and helping techniques;

g) participate in on-going self-improvement support groups composed of the same group members meeting over time (if desired);

h) receive instant goal support services when needed at open-membership "Goal Supporters Anonymous meetings;

i) review any special instructional materials presented during the group meetings related to specific personal goal or related to the process of change.

The Goal Attainment Supporters Group Program can include any and all of the components of the structured group program described in a previous section of this application. Specifically, the program has a special workbook, group prompts, and sets of training exercises.

The workbook encourages people to write down their goals, learn what resources are available to them, develop a strategy for attaining each goal, and make regular assessments of their progress.

The "Prompts" provided by the program are a list of possible statements to be used when the group is "stuck" or doesn't know what to do next. They include many statements that refer to the group process as well as statements that are specific to goal attainment strategies.

The Goal Attainment Supporters Group Program of this invention incorporates group interaction training exercises that provide information about group dynamics, group "curative" factors, different types of listening styles, different ways of responding to others, special group techniques for facilitating interaction (like role-playing and the "empty chair" technique), and stages of group development. The training program will allow a training group to observe demonstrations of the different concepts, and then practice engaging in the various interaction techniques together. This training is offered to open as well as closed membership groups. People who participate in open training groups will gain valuable experience for working on their goals should they decide to participate in an ongoing goal attainment supporters group composed of the same group members meeting on an ongoing basis over time.

Because the goal attainment supporters structured group program is integrated into a full service, large scale website that utilizes the enhanced system of computerized group interaction of the present invention, the experience of participating in the program can be powerfully rewarding to just about any person, regardless of whether or not the person suffers from serious emotional, behavioral or addiction problems requiring other professional interventions.

Business Applications of Present Invention with Improvements: In view of the many shortcomings of existing systems of computerized group interaction and virtual group environments outlined in the Background section of this application, businesses have not been able to optimally utilize computerized interaction systems to offer group services to their potential customers. Nor have they been able to reliably use computerized systems to hold business meetings, trade shows or conferences. However, the system of the present invention makes it possible for businesses to deliver high quality, authentic group services over the Internet and over virtual private networks as well. Businesses that regularly utilize group presentation formats for delivering services will benefit particularly well from having their group activities hosted on a website using the system of the present invention. Some of these other specific business applications of the present system of interactive technology include the following:

Healthcare organizations (including managed care, hospitals and public health agencies) will benefit from being able to offer specially tailored group outreach programs to their clients with the capacity for maintaining a "personal file" or medical record for each client. For example, a hospital could host a pre and post surgery support group for breast cancer patients allowing them to monitor each patient, provide important information regarding treatment options, and deliver professionally led support services.

Psychotherapists or Life Coaches could benefit from providing Internet group support programs as an adjunct to other face-to-face therapy services. Providing free or reduced fee groups on the host website would be a very good way of advertising the kinds of therapists and services available at a particular practice as well as reaching a much broader clientele than is possible in a "real-world" practice alone.

Community support groups could reach a much larger audience by offering groups on the host website as well as in the community. Weight Watchers and Alcoholics Anonymous, as well as groups for people suffering from emotional & physical disorders, groups for people wanting to quit smoking, and MADD and SADD are a few examples of community-based groups that could benefit from offering services via the host website.

Academic, research and policy organizations could set up seminars and policy work groups on an ongoing basis, reaching members from different institutions across the entire country. Universities could offer courses that require lecture presentations and discussions segments as provided in the structured group programs of the present invention; and students could take tests and submit assignments via their personal file that could be accessed by the instructor. Foreign language courses could be adapted remarkably well to this format. Research organizations (like NIMH) could set up studies with participants from all over the world. For example, researchers could study group process and its impact on different psychological problems by analyzing interaction data obtained from the operation of the system of the present invention, along with assessments and feedback reports provided by group participants. In addition, a scientific organization could put on a research "poster" session using the virtual environment builder of the present invention.

Juvenile justice authorities could hold on-line groups for teens where they could work through the goal attainment supporters group program of the present invention (or other structured programs) while being closely monitored by probation officers. Juvenile justice authorities have a rehabilitative mission, and this kind of structured group interaction has been found to be a powerful intervention for teenagers. In fact, this approach could be highly effective for prisoners and parolees in many different institutions, since participants in on-line groups would allow for social interaction and rehabilitative efforts without the risk of actual physical proximity required in "real-life" group settings.

Publishers and authors of self-improvement and popular Psychology literature could lease space on the host website at the same time that their books are being published, thus providing an immediate setting for people to "work through" and practice the book's prescribed activities in a supportive, anonymous, and entertaining group environment. This approach would be particularly well suited to books that use a serialized format for helping people make improvements in their lives.

Producers of business education & professional continuing education seminars will want to distribute special "workbook" versions of their programs for use on the host website (or in CD formats for use on personal computers). This type of presentation would be especially useful for programs teaching business management and leadership skills that are best developed in a group setting.

Internet service providers ("ISPs") could benefit from offering consumers options for different types of group interaction, activities and environments made possible by the present invention with improvements. Specifically, consumers could choose whether they wanted to play a board game or card game, arrange a scrapbook with friends or family, watch a movie or sing karaoke together, or just chat. ISPs could also throw parties or other social events in which consumers could "mingle" and engage in whatever activities were being offered in different virtual rooms of the provided social environment.

It is to be understood that the present invention is not limited to the embodiments described above, but encompasses any and all embodiments within the scope of the following claims.

I claim:

1. A system for facilitating interpersonal communications over a computer network, comprising:

a plurality of computers, each computer having a memory, a processor storing and retrieving instructions from the memory, and a network interface operably connecting the processor to a communications medium;

a communications module receiving content from an originating computer and transmitting said content to at least one target computer, with each of the computers being able to function as both an originating computer and a target computer;

a graphical communication flow module integrated with the communications module and providing to each of the computers a graphical representation of a group of networked computers, said graphical communication flow module graphically depicting communication flows showing the originating and target computer users corresponding to each content transmission by the communications module, and having means to graphically depict the communication flows in a manner perceptible to users of all the computers connected to a virtual group; and wherein the graphical communications flow module has at least one means selected from the group comprising:

a) means to graphically depict that a communications flow is intended by an originator to target all computer users connected to the group of networked computers who are participating in a virtual meeting of the virtual group;

b) means to graphically depict the intended target of each communication flow occurring between computer users participating in a group meeting;

c) means to graphically depict more than one type of communication occurring between users participating in a group meeting;

d) means to graphically depict the originators and targets of more than one communications flow occurring simultaneously between computer users participating in the group meeting;

e) means to enable the originating users to graphically distinguish between communications flows that they intend to be primary and communications flows that they intend to be secondary;

f) means to enable an originator to transmit a hidden communications flow to only one target, while indicating the originator and target of the hidden communications flow in a manner perceptible to all users participating in the group meeting; and g) means to select at least one type of graphical display of communication flows during the group meeting.

2. The system according to claim 1, wherein said computers are client computers, and the system further comprises a server computer that manages the communications module and the graphical communication flow module.

3. The system according to claim 1, wherein there is no separate server computer, and the computers manage the communications module and the graphical communication flow module on a peer-to-peer basis.

4. The system according to claim 1, wherein the means to enable an originator to transmit a hidden communications flow to only one target includes:

a first graphical representation that the originator can select to indicate the desire to transmit the hidden communications flow;

a second graphical representation that the originator can select to indicate the intended target of the hidden communications flow;

a third graphical representation that the intended target can select to indicate the desire to receive the hidden communications flow.

5. The system according to claim 4, wherein:

the first graphical representation is a whisper button controlled by the originator;

the second graphical representation is an identity place box for the intended target;

the third graphical representation is a whisper button controlled by the intended target;

the whisper buttons and identity place boxes are selected by "clicking" on them;

once a hidden communications flow is initiated, it can be reciprocal, with either party able to both transmit and receive messages; and each party has a "clear" button that they can "click" to end the hidden communications flow.

6. The system according to claim 1, including:

means for enabling two or more members of the virtual group to temporarily form a subgroup, wherein members of the subgroup communicate only within the subgroup, while still being able to perceive graphical representations of other members of the virtual group.

7. The system according to claim 6, including:

an announcement function that allows any member of the virtual group that can be perceived by everyone in the virtual group, even if they are in a subgroup; and an eavesdrop function that allows any member of the virtual group that is not a member of a subgroup to perceive communications within the subgroup, if a member of the subgroup allows it.

8. The system according to claim 1, wherein:

communications flows may be graphically depicted by displays selected from the group comprising:

a) text-column displays;

b) text-row displays;

c) text-grid displays; and d) full graphic displays.

9. The system according to claim 1, further comprising:

a shared presentation window integrated with said communication and graphical communication flow modules, wherein a presentation can be viewed by computer users connected to the virtual group while the system is simultaneously transmitting and displaying communication flows, wherein the shared presentation window has at least one means selected from the group comprising:

a) means to access a shared document;

b) means to access a virtual chalkboard;

c) means to access a video presentation;

d) means to access an internet website;

e) means to access on-line assessment measures;

f) means to access an on-line workbook;

g) means to access on-line within group ratings module;

h) means to access group prompts; and i) means to access feedback response module.

10. The system according to claim 1, further comprising:

a virtual meeting room module, integrated with the communications and graphical communications flow module, that enables participants in a group meeting to communicate with other people outside of the virtual group by at least one means selected from the group comprising:

a) means to communicate with client computers networked throughout the entire system while continuing to participate in the ongoing virtual meeting;

b) means to access email while continuing to participate in the interaction matrix and view shared presentation materials;

c) means to interact with outsiders through a virtual office door while continuing to participate in the ongoing virtual meeting; and d) means to access telephone and fax communications while continuing to participate in the ongoing virtual meeting.

11. The system according to claim 1, including:

means for enabling users to play a game represented in a simultaneous access window, while the users communicate in an interaction matrix.

12. The system according to claim 1, including:

means for enabling users to play a game in a first window, while communicating in a second window;

wherein the movements of the participants are depicted to show which participants are engaging in activities in the game as the activities are occurring in real-time.

13. The system according to claim 1, including:

means for enabling users to play a game represented in a central area of a display, while the users are graphically represented surrounding the central area, and the users can use the system to communicate while playing the game.

14. A method for providing a web site residing on a host computer and providing a structured communications environment for a plurality of client computers, said method comprising the steps of:

graphically displaying a plurality of virtual meeting rooms, a given virtual meeting room being simultaneously accessible to selected ones of the client computers;

displaying within each virtual meeting room a representation of the client computers accessing said corresponding virtual meeting room;

receiving content from an originating computer and transmitting said content to at least one target computer, with each of the computers being able to function as both an originating computer and a target computer;

providing to each of the computers a graphical representation of a group of networked computers, graphically depicting communication flows showing the originating and target computer users corresponding to each content transmission by the communications module, and having means to graphically depict the communication flows in a manner perceptible to users of all the computers connected to a virtual group; and wherein the graphical depiction of communication flows is facilitated by at least one means selected from the group comprising:

a) means to graphically depict that a communications flow is intended by an originator to target all computer users connected to the group of networked computers who are participating in a virtual meeting of the virtual group;

b) means to graphically depict the intended target of each communication flow occurring between computer users participating in a group meeting;

c) means to graphically depict more than one type of communication occurring between users participating in a group meeting;

d) means to graphically depict the originators and targets of more than one communications flow occurring simultaneously between computer users participating in the group meeting;

e) means to enable the originating users to graphically distinguish between communications flows that they intend to be primary and communications flows that they intend to be secondary;

f) means to enable an originator to transmit a hidden communications flow to only one target, while indicating the originator and target of the hidden communications flow in a manner perceptible to all users participating in the group meeting; and g) means to select at least one type of graphical display of communication flows during the group meeting.

15. The method for providing a web site residing on a host computer and providing a structured communications environment for a plurality of client computers according to claim 14, including the step of:

enabling visitors to the web site to interact with other visitors to the web site by at least one means selected from the group comprising:

a) means to enter into a virtual meeting room with other participants;

b) means to interact with other participants in a chat room;

c) means to create virtual environments;

d) means to interact and move about a selected virtual environment;

e) means to participate in on-line group activities; and f) means to participate in on-line structured group programs.

16. A memory medium storing software for facilitating interpersonal communications over a computer network, comprising:

a communications module receiving content from an originating computer and transmitting said content to at least one target computer, with each of the computers being able to function as both an originating computer and a target computer;

a graphical communication flow module integrated with the communications module and providing to each of the computers a graphical representation of a group of networked computers, said graphical communication flow module graphically depicting communication flows showing the originating and target computer users corresponding to each content transmission by the communications module, and having means to graphically depict the communication flows in a manner perceptible to users of all the computers connected to a virtual group; and wherein the graphical communications flow module has at least one means selected from the group comprising:

a) means to graphically depict that a communications flow is intended by an originator to target all computer users connected to the group of networked computers who are participating in a virtual meeting of the virtual group;

b) means to graphically depict the intended target of each communication flow occurring between computer users participating in a group meeting;

c) means to graphically depict more than one type of communication occurring between users participating in a group meeting;

d) means to graphically depict the originators and targets of more than one communications flow occurring simultaneously between computer users participating in the group meeting;

e) means to enable the originating users to graphically distinguish between communications flows that they intend to be primary and communications flows that they intend to be secondary;

f) means to enable an originator to transmit a hidden communications flow to only one target, while indicating the originator and target of the hidden communications flow in a manner perceptible to all users participating in the group meeting; and g) means to select at least one type of graphical display of communication flows during the group meeting.

17. The memory medium storing software according to claim 16, further comprising:

a virtual meeting room module providing a shared presentation window, integrated with said communication and graphical communication flow modules, that enables the materials being presented to be viewed by computer users connected to the virtual group while simultaneously transmitting and displaying communication flows, wherein the shared presentation window has at least one means selected from the group comprising:

a) means to access a shared document;

b) means to access a virtual chalkboard;

c) means to access a video presentation; and d) means to access an internet website;

e) means to access on-line assessment measures;

f) means to access an on-line workbook;

g) means to access on-line within group ratings module; and h) means to access group prompts; and i) means to access feedback response module.

18. The memory medium storing software according to claim 16, further comprising:

a virtual meeting room module which is integrated with the communications and graphical communications flow module which enables participants in a group meeting to communicate with other people outside of the virtual group by at least one means selected from the group comprising:

a) means to communicate with client computers networked throughout the entire system while continuing to participate in the ongoing group virtual meeting;

b) means to access email while continuing to participate in the interaction matrix and view shared presentation materials;

c) means to interact with outsiders through a virtual office door while continuing to participate in the ongoing virtual meeting; and d) means to access telephone and fax communications while continuing to participate in the ongoing virtual meeting.

19. The memory medium storing software according to claim 16, including:

a virtual environment building module that enables users to construct a desired virtual environment by integrating a graphical interface module, a virtual room module, the communications module and the graphical communications flow module;

said virtual environment builder module enables users to select a virtual floor plan from a plurality of virtual floor plans, and to select virtual furniture and equipment for each room in the selected virtual environment floor plan;

wherein the graphical interface module can display virtual rooms in the selected floor plan, and the selected virtual furniture and equipment for each room, and each of the rooms is simultaneously accessible to a plurality of client computers;

a communications interface module that can receive content from an originating client computer and display said content to at least one destination client computer;

said graphical interface module being able to display within each virtual room a representation of the client computers accessing said corresponding virtual meeting room;

said graphical interface module being able to graphically depict communication flows showing the originating and destination client computer users corresponding to each content transmission by said communications interface, and being able to graphically depict the communication flows in a manner visible to all the computers users in the virtual room.

20. The memory medium storing software according to claim 19, wherein:

users have graphical representations indicating their position in the selected virtual floor plan, and they may move around within the floor plan.

21. The memory medium storing software according to claim 19, wherein:

the virtual environment builder module enables users to set up interaction hot spots in the selected virtual floor plan, with users in each of the hot spots forming a subgroup that communicates via an interaction matrix.

22. The memory medium storing software according to claim 16, including means for enabling users to play a game, said means being selected from the group comprising:

a) means for enabling the users to play a game represented in a simultaneous access window, while the users communicate in an interaction matrix;

b) means for enabling the users to play a game in a first window, while communicating in a second window, and for depicting the movements of the participants to show which participants are engaging in activities on the game board as they are occurring in real-time; and c) means for enabling the users to play a game represented in a central area of a display, while the users are graphically represented surrounding the central area, and the users can use the system to communicate while playing the game.

23. The memory medium storing software according to claim 16, including:

a module for creating structured group programs that can be distributed for use over multiple computer systems, wherein the software has at least one means selected from the group comprising:

means for creating and recording structured group programs;

means for accessing and delivering content materials specific to the subject of a structured program;

means for presentation of the content materials so that they can be viewed simultaneously by a group of users participating in the structured program;

means for the users to communicate about and practice the skills presented in the structured program; and means to assess progress in learning the skills.

24. The memory medium storing software according to claim 16, wherein the software is stored and made available on a tangible medium.

25. The memory medium storing software according to claim 16, wherein the software is made available for download over a network.

* * * * *